(12) United States Patent
Ishii

(10) Patent No.: US 12,089,107 B2
(45) Date of Patent: Sep. 10, 2024

(54) RELEASE OF CONFIGURATIONS FOR CONDITIONAL HANDOVERS BASED ON SECURITY CONFIGURATIONS

(71) Applicant: SHARP KABUSHIKI KAISHA, Sakai (JP)

(72) Inventor: Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 272 days.

(21) Appl. No.: 17/620,620

(22) PCT Filed: Jun. 16, 2020

(86) PCT No.: PCT/JP2020/023649
§ 371 (c)(1),
(2) Date: Dec. 17, 2021

(87) PCT Pub. No.: WO2020/262124
PCT Pub. Date: Dec. 30, 2020

(65) Prior Publication Data
US 2022/0330125 A1    Oct. 13, 2022

Related U.S. Application Data

(60) Provisional application No. 62/865,629, filed on Jun. 24, 2019.

(51) Int. Cl.
*H04W 36/30* (2009.01)
*H04W 36/36* (2009.01)

(52) U.S. Cl.
CPC ......... *H04W 36/305* (2018.08); *H04W 36/36* (2013.01)

(58) Field of Classification Search
CPC ............................ H04W 36/36; H04W 36/30

USPC .......................................................... 370/329
See application file for complete search history.

(56) References Cited

PUBLICATIONS

Ericsson, "Configuration of Conditional handover in NR", R2-1906210 3GPP TSG RAN WG2 #106, Reno, US, May 13-17, 2019.
Ericsson, "Triggering of Conditional Handover in NR", R2-1906211 3GPP TSG RAN WG2 #106, Reno, US, May 13-17, 2019.
Ericsson, "Conditional Handover Execution in NR", R2-1906212 3GPP TSG RAN WG2 #106, Reno, US, May 13-17, 2019.
Ericsson, "Deconfiguration of conditional handover", R2-1906213 https://www.3gpp.org/ftp/tsg_ran/WG2_RL2/TSGR2_106/Tdoclists/TDoc_List_Meeting_RAN2%23106.xlsx.
Ericsson, "Handling of a HO command while UE is monitoring CHO", R2-1906214 3GPP TSG RAN WG2 #106, Reno, US, May 13-17, 2019.

(Continued)

*Primary Examiner* — Angel T Brockman
(74) *Attorney, Agent, or Firm* — ScienBiziP, P.C.

(57) ABSTRACT

A wireless terminal comprises processor circuitry and receiver circuitry. The receiver circuitry is configured to receive a configuration message comprising one or more conditional handover configurations. Each of the one or more conditional handover configurations may comprise at least one identity of a candidate target cell, and at least one triggering condition. The processor circuitry is configured to establish, using a first key set, a first security context with a first wireless access node; to perform a handover to a target cell; to determine validity of the conditional handover configurations, based on whether or not the handover to the target cell is configured with a security configuration, and to use the security configuration to derive a second key set for establishing a second security context with a second wireless access node that serves the target cell.

5 Claims, 32 Drawing Sheets

(56) References Cited

PUBLICATIONS

Ericsson, "Conditional handover failures in NR", R2-1906215 3GPP TSG RAN WG2 #106, Reno, US, May 13-17, 2019.
Ericsson, "Suspend while monitoring CHO in NR", R2-1906216 3GPP TSG RAN WG2 #106, Reno, US, May 13-17, 2019.
Ericsson, "Security implications of Conditional handover in NR", R2-1906217 3GPP TSG RAN WG2 #106, Reno, US, May 13-17, 2019.
Ericsson, "On FR2 impact on CHO", R2-1906218 3GPP TSG RAN WG2 #106, Reno, US, May 13-17, 2019.
Ericsson, "TP to 38.300 on Conditional Handover in NR", R2-1906219 3GPP TSG RAN WG2 #106, Reno, US, May 13-17, 2019.
Ericsson, "Conditional handover performance", R2-1906220 https://www.3gpp.org/ftp/tsg_ran/WG2_RL2/TSGR2_106/Tdoclists/TDoc_List_Meeting_RAN2%23106.xlsx.
Ericsson, "On Validity Timer for Conditional Handover in NR", R2-1906221 3GPP TSG RAN WG2 #106, Reno, USA, May 13-18, 2019.
Lenovo et al., "Conditional handover for NR", R2-1906238 3GPP TSG-RAN WG2 Meeting #106, Reno, USA, May 13-May 17, 2019.
Intel Corporation, "Further consideration on conditional handover", R2-1906285 3GPP TSG RAN WG2 Meeting #106, Reno, USA, May 13 to 17, 2019.
Intel Corporation, "Failure handling on CHO", R2-1906286 3GPP TSG RAN WG2 Meeting #106, Reno, USA, May 13 to 17, 2019.
Intel Corporation, "CHO execution condition", R2-1906287 3GPP TSG RAN WG2 Meeting #106, Reno, USA, May 13 to 17, 2019.
Intel Corporation, "Exit condition for conditional handover", R2-1906288 3GPP TSG RAN WG2 Meeting #106, Reno, USA, May 13 to 17, 2019.
Interdigital Inc., "Details of Conditional Handover Procedure for NR", R2-1906394 3GPP TSG-RAN WG2 Meeting #106, Reno, United States, May 13-17, 2019.
Interdigital Inc., "Triggers for Conditional Handover in NR", R2-1906395 3GPP RAN WG2 Meeting #106, Reno, United States, May 13-May 17, 2019.
Oppo, "Discussion on failure handling of handover for LTE mobility", R2-1905633 3GPP TSG-RAN2 Meeting #106, Reno, USA, May 13-17, 2018.
Oppo, "Discussion on single/dual active protocol stack", R2-1905635 3GPP TSG-RAN2 Meeting #106, Reno, USA, May 13-17, 2018.
Oppo, "Open issues on CHO execution for LTE mobility enhancements", R2-1905636 3GPP TSG-RAN2 Meeting #106, Reno, USA, May 13-17, 2018.
Oppo, "Further details on eMBB-based handover for LTE mobility", R2-1905639 3GPP TSG-RAN WG2 Meeting #106, Reno, US, May 13-May 17, 2019.
Oppo, "Further details on CHO configuration for LTE mobility enhancements", R2-1905641 3GPP TSG-RAN WG2 Meeting #106, Reno, US, May 13-May 17, 2019.
Sharp, "Discussion on conditional handover", R2-1905875 https://www.3gpp.org/ftp/tsg_ran/WG2_RL2/TSGR2_106/Tdoclists/TDoc_List_Meeting_RAN2%23106.xlsx.
Mediatek Inc., "[Draft] LS on data forwarding enhancements to minimize user data interruption during HO", R2-1905894 3GPP TSG RAN WG2 Meeting #106, Reno, USA, May 13-17, 2019.
CMCC, "Remaining Issues of LTE Conditional Handover", R2-1905948 3GPP TSG-RAN WG2 Meeting #106, Reno, USA, May 13-17, 2019.
Vivo, "Signaling procedure for conditional handover", R2-1905965 3GPP TSG-RAN WG2 Meeting #106, Reno, USA, May 13-17, 2019.
Vivo, "Discussion on the number of prepared cells for CHO", R2-1905966 3GPP TSG-RAN WG2 Meeting #106, Reno, USA, May 13-17, 2019.
Vivo, "Discussion on the RLF and HOF for CHO", R2-1905968 3GPP TSG-RAN WG2 Meeting #106, Reno, USA, May 13-17, 2019.
Vivo, "Handover command for conditional handover", R2-1905970 3GPP TSG-RAN WG2 Meeting #106, Reno, USA, May 13-17, 2019.
Vivo, "Conditional handover fall back to normal handover", R2-1905971 3GPP TSG-RAN WG2 Meeting #106, Reno, USA, May 13-17, 2019.
Vivo, "Enhanced RACH-less solution for NR", R2-1905975 3GPP TSG-RAN WG2 Meeting #106, Reno, USA, May13-May 17, 2019.
Vivo, "ROHC procedure for both single and dual active protocol solutions", R2-1905976 3GPP TSG-RAN WG2 Meeting #106, Reno, USA, May 13-May 17, 2019.
Vivo, "Capability coordination between the source and target node", R2-1905977 3GPP TSG-RAN WG2 Meeting #106, Reno, USA, May 13-May 17, 2019.
Vivo, "Consideration on the SRB of the non-split bearer handover", R2-1905978 3GPP TSG-RAN WG2 Meeting #106, Reno, USA, May 13-May 17, 2019.
Vivo, "Solution analysis on the intra-frequency async scenario", R2-1905981 3GPP TSG-RAN WG2 Meeting #106, Reno, USA, May 13-May 17, 2019.
Vivo, "Remaining issues for cell level triggers for conditional handover", R2-1906126 3GPP TSG-RAN WG2 Meeting #106, Reno, USA, May 13-17, 2019.
China Telecom, "Reconfiguration and deconfiguration of CHO", R2-1907139 3GPP TSG-RAN WG2 Meeting #106, Reno, USA, May 13-17, 2019.
China Telecom, "Remaining Stage-2 details of CHO", R2-1907140 3GPP TSG-RAN WG2 Meeting #106, Reno, USA, May 13-17, 2019.
Apple, "Details of Conditional Handover", R2-1907177 3GPP TSG-RAN WG2 Meeting #106, Reno, USA, May 13-17, 2019.
Apple, "Enhancement for Single UL capable UE", R2-1907178 3GPP TSG-RAN WG2 Meeting #106, Reno, USA, May 13-17, 2019.
Nokia et al., "Mobility robustness for two active protocol stacks solution", R2-1907271 3GPP TSG-RAN WG2 Meeting #106, Reno, USA, May 13-17, 2019.
Nokia et al., "Considerations for failure recovery in LTE", R2-1907272 3GPP TSG-RAN WG2 Meeting #106, Reno, USA, May 13-17, 2019.
Nokia et al., "Simultaneous connectivity handover with single uplink operation", R2-1907273 3GPP TSG-RAN WG2 Meeting #106, Reno, USA, May 13-17, 2019.
Nokia et al., "Conditional Handover in E-UTRAN—simple answers to important questions", R2-1907274 3GPP TSG-RAN WG2 Meeting #106, Reno, USA, May 13-17, 2019.
Nokia et al., "Conditional Handover in E-UTRAN—simultaneous expiry, timers and RRC configuration", R2-1907275 3GPP TSG-RAN WG2 Meeting #106, Reno, USA, May 13-17, 2019.
Nokia et al., "Conditional Handover in E-UTRAN—other aspects", R2-1907276 3GPP TSG-RAN WG2 Meeting #106, Reno, USA, May 13-17, 2019.
Nokia et al., "Enhanced signalling for single active protocol stack solution", R2-1907277 3GPP TSG-RAN WG2 Meeting #106, Reno, USA, May 13-17, 2019.
Nokia et al., "Mobility robustness for single active protocol stack solution", R2-1907278 3GPP TSG-RAN WG2 Meeting #106, Reno, USA, May 13-17, 2019.
Ericsson, "User plane aspects of Make-Before-Break for dual active protocol stacks", R2-1907305 3GPP TSG-RAN WG2#106, Reno, Nevada, USA, May 13-17, 2019.
Ericsson, "Enhancements to Make-Before-Break for single active protocol stack", R2-1907306 3GPP TSG-RAN WG2#106, Reno, Nevada, USA, May 13-17, 2019.
Ericsson, "User plane aspects of Make-Before-Break for single active protocol stack", R2-1907307 3GPP TSG-RAN WG2#106, Reno, Nevada, USA, May 13-17, 2019.
Ericsson, "Comparison of interruption time in single and dual active protocol stack solution", R2-1907308 3GPP TSG-RAN WG2#106, Reno, Nevada, US, May 13-17, 2019.
Ericsson, "Data forwarding at reduced handover interruption", R2-1907309 3GPP TSG-RAN WG2#106, Reno, Nevada, USA, May 13-17, 2019.

(56) References Cited

PUBLICATIONS

Ericsson, "Enhancements to Make-Before-Break for dual active protocol stacks", R2-1907310 3GPP TSG-RAN WG2#106, Reno, Nevada, USA, May 13-17, 2019.
LG Electronics Inc., "Discussion on PDCP impact for feMOB", R2-1907556 3GPP TSG-RAN WG2 #106, Reno, USA, May 13-17, 2019.
Huawei et al., "Considerations on data forwarding aspect", R2-1907645 3GPP TSG-RAN WG2 Meeting #106, Reno, USA, May 13-17, 2019.
Huawei et al., "Considerations on detaching aspect", R2-1907646 3GPP TSG-RAN WG2 Meeting #106, Reno, USA, May 13-17, 2019.
Huawei et al., "Considerations on single and dual active protocol stacks", R2-1907647 3GPP TSG-RAN WG2 Meeting #106, Reno, USA, May 13-17, 2019.
Huawei et al., "Further consideration on reply LSs from RAN1 and RAN4", R2-1907648 3GPP TSG-RAN WG2 Meeting #106, Reno, USA, May 13-17, 2019.
Huawei et al., "Preamble gap design for one uplink path", R2-1907649 3GPP TSG-RAN WG2 Meeting #106, Reno, USA, May 13-17, 2019.
Huawei et al., "Single uplink feedback for dual downlink data transmission", R2-1907650 3GPP TSG-RAN WG2 Meeting #106, Reno, USA, May 13-17, 2019.
Huawei, "[Draft] LS on data forwarding procedure of non-split bearer solution", R2-1907651 3GPP TSG-RAN WG2 Meeting #106, Reno, USA, May 13-17, 2019.
Huawei et al., "Draft CR for 36.323 on supporting non-split bearer solution", R2-1907652 3GPP TSG-RAN WG2 Meeting # 106, Reno, USA, May 13-17, 2019.
Huawei et al., "Considerations on UL data handling in receiver side", R2-1907653 3GPP TSG-RAN WG2 Meeting #106, Reno, USA, May 13-17, 2019.
Huawei et al., "Considerations on signaling flow of CHO", R2-1907666 3GPP TSG-RAN WG2 Meeting #106, Reno, Nevada, USA, May 13-17, 2019.
Huawei et al., "Considerations on triggering and HO execution of CHO", R2-1907667 3GPP TSG-RAN WG2 Meeting #106, Reno, Nevada, USA, May 13-17, 2019.
Huawei et al., "Considerations on configurations of CHO target cells", R2-1907668 3GPP TSG-RAN WG2 Meeting #106, Reno, Nevada, USA, May 13-17, 2019.
Huawei et al., "Considerations on timer based deconfiguration solution", R2-1907669 3GPP TSG-RAN WG2 Meeting #106, Reno, Nevada, USA, May 13-17, 2019.
Huawei et al., "Considerations on relations between CHO and legacy handover", R2-1907670 3GPP TSG-RAN WG2 Meeting #106, Reno, Nevada, USA, May 13-17, 2019.
Huawei et al., "Considerations on failure handling for CHO", R2-1907671 3GPP TSG-RAN WG2 Meeting #106, Reno, Nevada, USA, May 13-17, 2019.
Huawei et al., "Considerations on modification of CHO configurations by RRC signalling", R2-1907672 3GPP TSG-RAN WG2 Meeting #106, Reno, Nevada, USA, May 13-17, 2019.
Huawei et al., "Considerations the decision of the triggering conditions", R2-1907673 3GPP TSG-RAN WG2 Meeting #106, Reno, Nevada, USA, May 13-17, 2019.
Huawei et al., "Considerations on FFSs on UE behaviours during CHO execution phase", R2-1907674 3GPP TSG-RAN WG2 Meeting #106, Reno, Nevada, USA, May 13-17, 2019.
Huawei et al., "Considerations on maximum number of CHO candidate cells", R2-1907675 3GPP TSG-RAN WG2 Meeting #106, Reno, Nevada, USA, May 13-17, 2019.
ETRI, "Data Forwarding and Service Interruption in CHO", R2-1906561=R2-1906562 3GPP TSG-RAN WG2 Meeting #106, Reno, USA, May 13-17, 2019.
ETRI, "FFS in Preparation Phase of CHO", R2-1906563=R2-1906564 3GPP TSG-RAN WG2 Meeting #106, Reno, USA, May 13-17, 2019.

ETRI, "FFS in Execution Phase of CHO", R2-1906565=R2-1906566 3GPP TSG-RAN WG2 Meeting #106, Reno, USA, May 13-17, 2019.
ETRI, "Signalling Overhead Reduction for CHO", R2-1906567 3GPP TSG-RAN WG2 Meeting #106, Reno, USA, May 13-17, 2019.
CATT, "Consideration on the UE Capability of Supporting CHO", R2-1906646 3GPP TSG RAN WG2 Meeting #106, Reno, USA, May 13-17, 2019.
CATT, "Further Consideration on Conditional Handover in NR", R2-1906647 3GPP TSG-RAN WG2 Meeting #106, Reno, USA, May 13-17, 2019.
CATT, "FFS Issues on CHO Execution Condition in NR", R2-1906648 3GPP TSG-RAN WG2 Meeting #106, Reno, USA, May 13-17, 2019.
CATT, "Handling of Conditional Handover Failure in NR", R2-1906649 3GPP TSG-RAN WG2 Meeting #106, Reno, USA, May 13-17, 2019.
CATT, "Aspects for Multiple Candidate Cell Supports", R2-1906650 3GPP TSG-RAN WG2 Meeting #106, Reno, USA, May 13-17, 2019.
ZTE Corporation et al., "Discussion on the configuration of CHO candidates", R2-1907089 3GPP TSG RAN WG2 Meeting #106, Reno, USA, May 13-17, 2019.
ZTE Corporation et al., "Discussion on the deconfiguration of CHO candidates", R2-1907090 3GPP TSG RAN WG2 Meeting #106, Reno, USA, May 13-17, 2019.
ZTE Corporation et al., "Discussion on the configuration of CHO execution conditions", R2-1907091 3GPP TSG RAN WG2 Meeting #106, Reno, USA, May 13-17, 2019.
ZTE Corporation et al., "Discussion on the RRC handling during CHO execution", R2-1907092 3GPP TSG RAN WG2 Meeting #106, Reno, USA, May 13-17, 2019.
ZTE Corporation et al., "Stage-3 signalling for CHO", R2-1907093 3GPP TSG RAN WG2 Meeting #106, Reno, USA, May 13-17, 2019.
Nokia et al., "CFRA resources update for Conditional HO", R2-1907262 3GPP TSG-RAN WG2 Meeting #106, Reno, USA, May 13-17, 2019.
Nokia et al., "Robustness through SRB duplication for split bearer solution in NR", R2-1907263 3GPP TSG-RAN WG2 Meeting #106, Reno, USA, May 13-17, 2019.
Nokia et al., "Closing the open issues on NR Conditional Handover preparation phase", R2-1907268 3GPP TSG-RAN WG2 Meeting #106, Reno, USA, May 13-17, 2019.
Nokia et al., "Closing the open issues on NR Conditional Handover execution phase", R2-1907269 3GPP TSG-RAN WG2 Meeting #106, Reno, USA, May 13-17, 2019.
Huawei et al., "Discussion on CHO trigger condition", R2-1907431 3GPP TSG-RAN WG2 #106, Reno, USA, May 13-17, 2019.
Huawei et al., "Discussion on de-configuration for CHO", R2-1907432 3GPP TSG-RAN WG2 #106, Reno, USA, May 13-17, 2019.
Huawei et al., "Discussion on data forwarding for CHO", R2-1907433 3GPP TSG-RAN WG2 #106, Reno, USA, May 13-17, 2019.
Huawei et al., "Triggering conditions for CHO", R2-1907436 3GPP TSG RAN WG2 Meeting #106, Reno, USA, May 13-17, 2019.
Huawei et al., "Discussion on CHO configuration", R2-1907437 3GPP TSG RAN WG2 Meeting #106, Reno, USA, May 13-17, 2019.
LG Electronics Inc., "Aspects of CHO Configuration in NR", R2-1907995 3GPP TSG-RAN WG2 Meeting #106, Reno, USA, May 13-17, 2019.
NTT Docomo, Inc., "Support of Conditional PSCell addition/change", R2-1908013 3GPP TSG-RAN WG2 Meeting #106, Reno, USA, May 13-17, 2019.
NTT Docomo, Inc, "[DRAFT] LS on Conditional PSCell addition/change", R2-1908015 3GPP TSG-RAN WG2 Meeting #106, Reno, USA, May 13-17, 2019.
ETRI, "FFS in Preparation Phase of CHO", R2-1908095=R2-1908096 3GPP TSG-RAN WG2 Meeting #106, Reno, USA, May 13-17, 2019.

(56) References Cited

PUBLICATIONS

Intel Corporation, "Summary of mobility robustness agreements from LTE mobility", R2-1908417 3GPP TSG RAN WG2 Meeting #106, Reno, USA, May 13-17, 2019.
China Telecom, "[Offline Discussion-081] summary of NR agreements that could be 'imported' to LTE", R2-1908431 3GPP TSG-RAN WG2 Meeting #106, Reno, USA, May 13-17, 2019.
3GPP TS 38.300 V15.5.0 (May 2019) 3rd Generation Partnership Project; Technical Specification Group Radio Access Network; NR; NR and NG-RAN Overall Description; Stage 2 (Release 15).
TDoc_List_Meeting_RAN2#106, https://www.3gpp.org/ftp/tsg_ran/WG2_RL2/TSGR2_106/Tdoclists/TDoc_List_Meeting_RAN2%23106.xlsx.
Nokia et al., "Improved Uplink Power Boosting During Handover", R2-1906184 3GPP TSG-RAN WG2 Meeting #106, Reno, USA, May 13-17, 2019.
Ericsson, "Stage-2 aspects of Conditional Handover in LTE", R2-1906194 3GPP TSG RAN WG2 #106, Reno, US, May 13-17, 2019.
Ericsson, "Configuration of Conditional handover in LTE", R2-1906195 3GPP TSG RAN WG2 #106, Reno, US, May 13-17, 2019.
Ericsson, "Triggering of Conditional Handover in LTE", R2-1906196 3GPP TSG RAN WG2 #106, Reno, US, May 13-17, 2019.
Ericsson, "Conditional Handover Execution in LTE", R2-1906197 3GPP TSG RAN WG2 #106, Reno, US, May 13-17, 2019.
Ericsson, "Deconfiguration of conditional handover in LTE", R2-1906198 https://www.3gpp.org/ftp/tsg_ran/WG2_RL2/TSGR2_106/Tdoclists/TDoc_List_Meeting_RAN2%23106.xlsx.
Ericsson, "Conditional handover failures in LTE", R2-1906199 3GPP TSG RAN WG2 #106, Reno, US, May 13-17, 2019.
Ericsson, "Suspend while monitoring CHO in LTE", R2-1906200 3GPP TSG RAN WG2 #106, Reno, US, May 13-17, 2019.
Ericsson, "On Validity Timer for Conditional Handover in LTE", R2-1906201 3GPP TSG RAN WG2 #106, Reno, USA, May 13-18, 2019.
Ericsson, "Security implications of Conditional handover in LTE", R2-1906202 3GPP TSG RAN WG2 #106, Reno, US, May 13-17, 2019.
Ericsson, "Fast RLF triggering based on timer T312", R2-1906203 3GPP TSG RAN WG2 #106, Reno, US, May 13-17, 2019.
Ericsson, "Repetition of RRC messages at handover", R2-1906204 3GPP TSG RAN WG2 #106, Reno, US, May 13-17, 2019.
Ericsson, "RRC connection re-establishment for handover failure recovery", R2-1906205 3GPP TSG RAN WG2 #106, Reno, US, May 13-17, 2019.
Ericsson, "Measurement reporting overhead reduction based on enhanced event triggering", R2-1906206 3GPP TSG-RAN WG2 #106, Reno, US, May 13-17, 2019.
Ericsson, "RACH-less handover robustness", Tdoc R2-1906207 3GPP TSG-RAN WG2#106, Reno, USA, May 13-17, 2019.
Lenovo et al., "LTE conditional handover", R2-1906237 3GPP TSG-RAN WG2 Meeting #106, Reno, USA, May 13-May 17, 2019.
Intel Corporation, "User plane handling for non-split bearer solution", R2-1906289 3GPP TSG RAN WG2 Meeting #106, Reno, USA, May 13-17, 2019.
Intel Corporation, "Control plane consideration on simultaneous connectivity", R2-1906290 3GPP TSG RAN WG2 Meeting #106, Reno, USA, May 13-17, 2019.
Intel Corporation, "Further consideration on conditional handover", R2-1906291 3GPP TSG RAN WG2 Meeting #106, Reno, USA, May 13-17, 2019.
Huawei et al., "Dual L3 filters for Conditional handover", R2-1907676 3GPP TSG-RAN WG2 Meeting #106, Reno, Nevada, USA, May 13-17, 2019.
Huawei et al., "Cell selection criteria for the combination of eMBB and CHO", R2-1907677 3GPP TSG-RAN WG2 Meeting #106, Reno, Nevada, USA, May 13-17, 2019.
Huawei et al., "Enhancements to RACH-less solution", R2-1907678 3GPP TSG-RAN WG2 Meeting #106, Reno, Nevada, USA, May 13-17, 2019.
Huawei et al., "Considerations on failure handlings", R2-1907679 3GPP TSG-RAN WG2 Meeting #106, Reno, Nevada, USA, May 13-17, 2019.
Samsung, "Discussion on RLM in LTE FeMOB", R2-1907978 3GPP TSG-RAN WG2 Meeting #106, Reno, Nevada, USA, May 13-17, 2019.
LG Electronics Inc., "Consideration on UE Behaviour while Executing CHO", R2-1907996 3GPP TSG-RAN WG2 Meeting #106, Reno, USA, May 13-17, 2019.
LG Electronics Inc., "Aspects of CHO Configuration in LTE", R2-1907997 3GPP TSG-RAN WG2 Meeting #106, Reno, USA, May 13-17, 2019.
LG Electronics Inc., "Consideration on CHO Failure", R2-1907998 3GPP TSG-RAN WG2 Meeting #106, Reno, USA, May 13-17, 2019.
LG Electronics Inc., "HO Duration and RA Problem of CHO", R2-1907999 3GPP TSG-RAN WG2 Meeting #106, Reno, USA, May 13-17, 2019.
LG Electronics Inc., "RLM Handling of Enhanced MBB HO", R2-1908000 3GPP TSG-RAN WG2 Meeting #106, Reno, USA, May 13-17, 2019.
Sharp, "Consideration for protocol stack and UL data handling", R2-1908051 3GPP TSG RAN WG2 #106, Reno, USA, May 13-17, 2019.
China Telecom, "Running CR for introduction of even further mobility enhancement in E-UTRAN", R2-1908271 3GPP TSG-RAN WG2 #106, Reno, USA, May 13-17, 2019.
Oppo, "Open issues on CHO execution for NR mobility enhancements", R2-1905637 3GPP TSG-RAN2 Meeting #106, Reno, USA, May 13-17, 2018.
Oppo, "Further details on CHO configuration for NR mobility enhancements", R2-1905640 3GPP TSG-RAN WG2 Meeting #106, Reno, US, May 13-May 17, 2019.
Sharp, "Discussion on conditional handover", R2-1905876, https://www.3gpp.org/ftp/tsg_ran/WG2_RL2/TSGR2_106/Tdoclists/TDoc_List_Meeting_RAN2%23106.xlsx.
CMCC, "Consideration of Beamforming for NR Conditional Handover", R2-1905949 3GPP TSG-RAN WG2 Meeting #106, Reno, USA, May 13-17, 2019.
Vivo, "Beam level trigger for conditional handover", R2-1906092 3GPP TSG-RAN WG2 Meeting #106, Reno, USA, May 13-17, 2019.
Ericsson, "Stage-2 aspects of Conditional Handover in NR", R2-1906209 3GPP TSG RAN WG2 #106, Reno, US, May 13-17, 2019.
Intel Corporation, "Failure handling on CHO", R2-1906292 3GPP TSG RAN WG2 Meeting #106, Reno, USA, May 13-17, 2019.
Intel Corporation, "CHO execution condition", R2-1906293 3GPP TSG RAN WG2 Meeting #106, Reno, USA, May 13-17, 2019.
Intel Corporation, "Exit condition for conditional handover", R2-1906294 3GPP TSG RAN WG2 Meeting #106, Reno, USA, May 13-17, 2019.
Qualcomm Incorporated, "LTE Conditional HO design considerations", R2-1906375 3GPP TSG-RAN WG2 Meeting #106, Reno, USA, May 13-17, 2019.
Qualcomm Incorporated, "Lossless enhanced Make-Before-Break (MBB) HO support for low latency, high reliability services", R2-1906377 3GPP TSG-RAN WG2 Meeting #106, Reno, USA, May 13-17, 2019.
Qualcomm Incorporated, "LTE mobility enhancements for eMBB HO using dual active protocol stack", R2-1906378 3GPP TSG-RAN WG2 Meeting #106, Reno, USA, May 13-17, 2019.
Qualcomm Incorporated, "LTE Mobility Robustness Enhancements", R2-1906379 3GPP TSG-RAN WG2 Meeting #106, Reno, USA, May 13-17, 2019.
Qualcomm Incorporated, "UE RF chain requirements to reduce LTE eMBB HO interruption time close to 0ms", R2-1906380 3GPP TSG-RAN WG2 Meeting #106, Reno, USA, May 13-17, 2019.
Qualcomm Incorporated, "RRM, RLM and RLF handling during LTE enhanced MBB HO", R2-1906381 3GPP TSG-RAN WG2 Meeting #106, Reno, USA, May 13-17, 2019.

(56) References Cited

PUBLICATIONS

Charter Communications, "On Maximum Number of CHO Candidate Targets", R2-1906382 3GPP TSG-RAN WG2 Meeting #106, Reno, Nevada, USA May 13-May 17, 2019.
Interdigital Inc., "Reducing User Data Interruption during Handover in LTE", R2-1906392 3GPP RAN WG2 Meeting #106, Reno, United States, May 13-May 17, 2019.
Interdigital Inc., "Triggers for Conditional Handover in LTE", R2-1906393 3GPP RAN WG2 Meeting #106, Reno, United States, May 13-May 17, 2019.
Interdigital Inc., "Details of Conditional Handover procedure for LTE", R2-1906396 3GPP TSG-RAN WG2 Meeting #105bis, Reno, United States, May 13-17, 2019.
Nokia, "LS on Maximum Number of Candidate Target Cells for Conditional Handover in E-UTRAN", R2-1906399 3GPP TSG-RAN WG2 Meeting #106, Reno, Nevada, USA May 13-May 17, 2019.
Charter Communications, "CHO "Bye" Indication on the source link", R2-1906400 3GPP TSG-RAN WG2 Meeting #106, Reno, Nevada, USA May 13-May 17, 2019.
ETRI, "Data Forwarding Options and Interruption Time", R2-1906557= R2-1906558 3GPP TSG-RAN WG2 Meeting #106, Reno, USA, May 13-17, 2019.
ETRI, "Common Single and Dual Active eMBB Solution", R2-1906559=R2-1906560 3GPP TSG-RAN WG2 Meeting #106, Reno, USA, May 13-17, 2019.
CATT, "Further Consideration of Non-split Bearer Option", R2-1906640 3GPP TSG RAN WG2 Meeting #106, Reno, USA, May 13-17, 2019.
CATT, "Consideration on UL New Data Transmission for Single PDCP Entity", R2-1906641 3GPP TSG-RAN WG2 Meeting #106, Reno, USA, May 13-17, 2019.
CATT, "Further Consideration on CHO Execution and Setting of CHO Execution Condition", R2-1906642 3GPP TSG-RAN WG2 Meeting #106, Reno, USA, May 13-17, 2019.
CATT, "FFS Issues While Executing CHO Command", R2-1906643 3GPP TSG-RAN WG2 Meeting #106, Reno, USA, May 13-17, 2019.
CATT, "Handling of Conditional Handover Failure", R2-1906644 3GPP TSG-RAN WG2 Meeting #106, Reno, USA, May 13-17, 2019.
CATT, "Discussion on UE Behavior When More than One Candidate Cell Meets the Condition", R2-1906645 3GPP TSG-RAN WG2 Meeting #106, Reno, USA, May 13-17, 2019.
Qualcomm Incorporated, "LTE Conditional HO failure handling", R2-1906662 3GPP TSG-RAN WG2 Meeting #106, Reno, USA, May 13-17, 2019.
NEC, "Further considerations on conditions and CHO command", R2-1906752 3GPP TSG-RAN WG2 #106, Reno, USA, May 13-17, 2019.
NEC, "Source cell signalling during CHO execution", R2-1906753 3GPP TSG-RAN WG2 #106, Reno, USA, May 13-17, 2019.
ZTE Corporation et al., "Way forward on minimization of HO interruption time", R2-1907105 3GPP TSG RAN WG2 Meeting #106, Reno, NV, USA, May 13-17, 2019.
ZTE Corporation et al., "Discussion on the configuration of CHO candidates", R2-1907106 3GPP TSG RAN WG2 Meeting #106, Reno, USA, May 13-17, 2019.
ZTE Corporation et al., "Discussion on the deconfiguration of CHO candidates", R2-1907107 3GPP TSG RAN WG2 Meeting #106, Reno, USA, May 13-17, 2019.
ZTE Corporation et al., "Discussion on the configuration of CHO execution conditions", R2-1907108 3GPP TSG RAN WG2 Meeting #106, Reno, USA, May 13-17, 2019.
ZTE Corporation et al., "Discussion on the RRC handling during CHO execution", R2-1907109 3GPP TSG RAN WG2 Meeting #106, Reno, USA, May 13-17, 2019.
ZTE Corporation et al., "Stage-3 signalling for CHO", R2-1907110 3GPP TSG RAN WG2 Meeting #106, Reno, USA, May 13-17, 2019.
ITRI, "UP issue on conditional handover", R2-1907132 3GPP TSG RAN WG2#106, Reno, USA, May 13-17, 2019.
China Telecom, "Running CR for introduction of even further mobility enhancement in E-UTRAN", R2-1907137 3GPP TSG-RAN WG2 #106, Reno, USA, May 13-17, 2019.
China Telecom, "User plane details for non-split dual active protocol stacks solution", R2-1907138 3GPP TSG RAN WG2 Meeting #106, Reno, USA, May 13-17, 2019.

| MEASUREMENT CONFIGURATION | | | |
|---|---|---|---|
| MEASUREMENT OBJECTS (MO) | REPORTING CONFIGURATIONS | MEASUREMENT IDENTITIES | QUANTITY CONFIGURATIONS | MEASUREMENT GAPS |

*Fig. 4*

| measId | BEST NEIGHBORING CELLS | CELLS THAT TRIGGERED REPORTING EVENT(S) | MEASURING RESULTS OF SERVING CELLS |
|---|---|---|---|
| | | | |

MEASUREMENT REPORT MESSAGE

*Fig. 5*

| CONDITIONAL HANDOVER CONFIGURATION MESSAGE | | | | |
|---|---|---|---|---|
| REF SIGNAL TYPE | IDENTITY(IES) OF CANDIDATE TARGETES | HANDOVER CONDITIONS | MEASUREMENT INSTRUCTIONS | PERIODIC VALUE | LEAVING CONDITIONS |

Fig. 8

| SECOND SECURITY CONFIGURATION | | |
|---|---|---|
| SECURITY ALGORITHM TO BE USED | NEXT HOP CHAINING COUNT | INDICATION OF NEED TO GENERATE FRESH ACCESS STRATUM KEY SET |

Fig. 22

RELEASE OF CONFIGURATIONS FOR CONDITIONAL HANDOVERS BASED ON SECURITY CONFIGURATIONS

CROSS REFERENCE

This Nonprovisional application claims priority under 35 U.S.C. § 119 on provisional Application No. 62/865,629 on Jun. 24, 2019, the entire contents of which are hereby incorporated by reference.

TECHNICAL FIELD

The technology relates to wireless communications, and particularly to conditional handovers in a radio access network.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. An NG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In typical cellular mobile communication systems, handover (HO) procedures are adopted to manage the mobility of a wireless terminal (e.g. User Equipment, UE). In general, there are two types of handovers: (1) make after break and (2) make before break. In make after break HO, a connection between a wireless terminal and a current (source) base station is temporarily disconnected before establishing a new connection between the wireless terminal and a target base station. In contrast, in make before break HO the new connection is prepared before breaking the connection with the current base station.

3GPP has completed the basic feature for new radio (NR) systems in Release 15 specification. 3GPP Release 15 describes only basic handover, i.e., make after break. The basic make after break handover described in 3GPP Release 15 is mainly based on LTE handover mechanism in which the network controls UE mobility based on UE measurement reporting. In the basic make after break handover described in 3GPP Release 15, similar to LTE, a source gNB triggers handover by sending a HO request to target gNB. After receiving an acknowledgement, ACK, from the target gNB, the source gNB initiates handover by sending a HO command to the UE, the HO command including the target cell configuration. The UE then performs an initial access to the target cell in order to establish a connection with the with target cell.

In 3GPP Release 16, standardization of several HO improvements is ongoing. Conditional handover (CHO) is one of such 3GPP Release 16 improvement aimed for in-creasing reliability and robustness of handovers. In CHO, the gNB of the source cell provides CHO configuration parameters including candidate target cells and triggering conditions to the UE in RRC_CONNECTED state. After receipt of the CHO configuration parameters, the UE may perform measurements of radio signals from the source cell as well as the candidate target cells, and may autonomously initiate a handover to one of the candidate cells whose triggering conditions are met.

What is needed, therefore, are apparatus, methods, and procedures to efficiently and effectively implement conditional handover and associated security configurations.

SUMMARY OF INVENTION

In one example, a wireless terminal comprising: receiver circuitry configured to receive a reconfiguration message comprising one or more conditional handover configurations, each of the one or more conditional handover configurations comprising an identity of a candidate target cell, and at least one triggering condition; processor circuitry configured: to detect a radio link failure, and; to initiate, based on the radio link failure, a cell selection to select a cell; transmitter circuitry configured to transmit, upon selecting the cell, a re-establishment request message; wherein in a case that the identity of the cell is not included in the one or more conditional handover configurations, the one or more conditional handover configurations are released.

In one example, a wireless access node comprising: processor circuitry configured to generate a reconfiguration message comprising one or more conditional handover configurations, each of the one or more conditional handover configurations comprising an identity of a candidate target cell, and at least one triggering condition, and; transmitter circuitry configured to transmit, to a wireless terminal, the reconfiguration message; wherein in a case that a cell selection to select a cell, whose identity is not included in the one or more conditional handover configurations, is performed by the wireless terminal after detecting a radio link failure, the one or more conditional handover configurations are released by the wireless terminal.

In one example, a method for a wireless terminal comprising: receiving a reconfiguration message comprising one or more conditional handover configurations, each of the one or more conditional handover configurations comprising an identity of a candidate target cell, and at least one triggering condition; detecting a radio link failure; initiating, based on the radio link failure, a cell selection to select a cell; transmitting, upon selecting the cell, a re-establishment request message; wherein in a case that the identity of the cell is not included in the one or more conditional handover configurations, the one or more conditional handover configurations are released.

In one example, a method for a wireless access node comprising: generating a reconfiguration message comprising one or more conditional handover configurations, each of the one or more conditional handover configurations comprising at least one identity of a candidate target cell, and at least one triggering condition; transmitting, to a wireless terminal, the reconfiguration message; wherein in a case that a cell selection to select a cell, whose identity is not included in the one or more conditional handover configurations, is performed by the wireless terminal after detecting a radio link failure, the one or more conditional handover configurations are released by the wireless terminal.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 4 is a diagrammatic view showing example parameters of a measurement configuration which may be provided by a source node of a radio access network.

FIG. 5 is a diagrammatic view showing example information elements of an example MeasurementReport message.

FIG. 8 is a diagrammatic view showing example generic contents of an example conditional handover configuration message for the example embodiment of FIG. 6.

FIG. 22 is a diagrammatic view showing example generic contents of a second security configuration information element for the example embodiment of FIG. 19.

DESCRIPTION OF EMBODIMENTS

Figure 1:
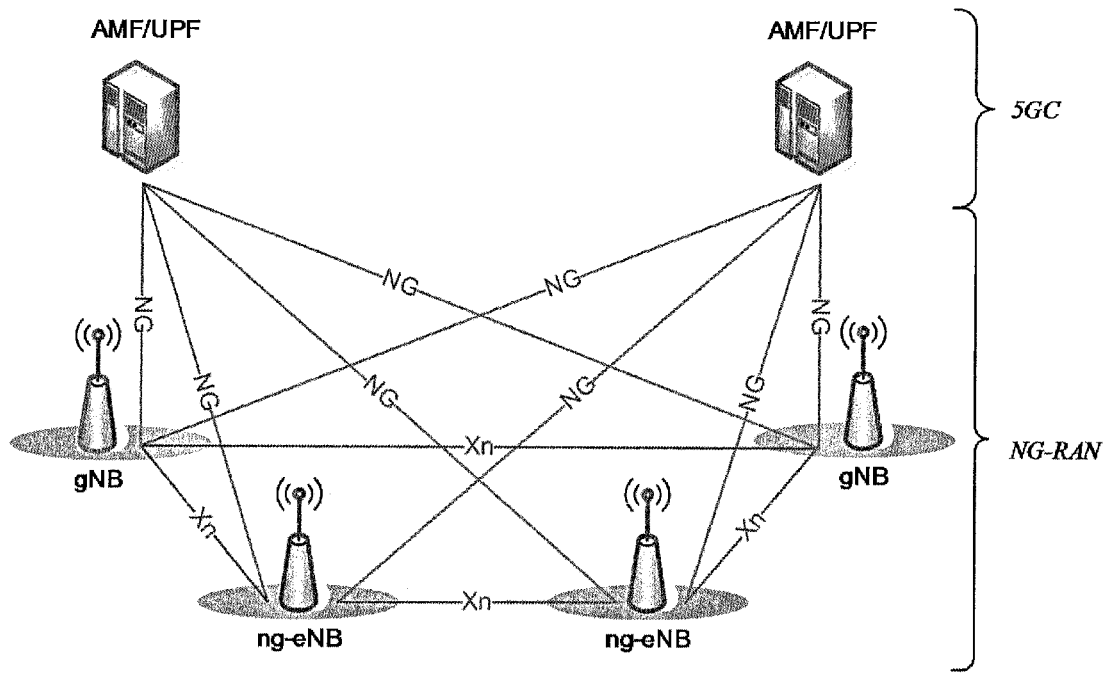
FIG. 1 is a diagrammatic view of overall architecture for a 5G New Radio system.

In one of its example embodiments and modes the technology disclosed herein concerns a wireless that communicates with an access node of a radio access network. The terminal comprises receiver circuitry and processor circuitry. The receiver circuitry is configured to receive a configuration message comprising one or more conditional handover configurations, each of the one or more conditional handover configurations comprising at least one identity of a candidate target cell, and at least one triggering condition. The processor circuitry is configured to establish, using a first key set, a first security context with a first wireless access node; to perform a conditional handover to a candidate target cell configured by one of the one or more conditional handover configurations, in a case that the at least one triggering condition associated with the candidate target cell is met; and to establish a second security context with a second wireless access node that serves the candidate target cell, based on whether or not a security configuration associated with the candidate target cell is configured by the configuration message.

In another of its example embodiments and modes the technology disclosed herein concerns a method of operating a wireless that communicates with an access node of a radio access network. In a basic mode the method comprises establishing, using a first key set, a first security context with a first wireless access node; receiving a configuration message comprising one or more conditional handover configurations, each of the one or more conditional handover configurations comprising at least one identity of a candidate target cell, and at least one triggering condition; performing a conditional handover to a candidate target cell configured by one of the one or more conditional handover configurations, in a case that the at least one triggering condition associated with the candidate target cell is met; and establishing a second security context with a second wireless access node that serves the candidate target cell, based on whether or not a security configuration associated with the candidate target cell is configured by the configuration message.

In yet another of its example embodiments and modes the technology disclosed herein concerns an access node of a radio access network. The access node comprises processor circuitry and transmitter circuitry. The processor circuitry is configured to establish a first security context with a wireless terminal using a first key set. The transmitter circuitry is configured to transmit a configuration message comprising one or more conditional handover configurations, each of the one or more conditional handover configurations comprising at least one identity of a candidate target cell, and at least one triggering condition. The processor circuitry is further configured: to determine, upon the wireless terminal performing a handover to a target cell, validity of the conditional handover configurations, based on whether or not the handover to the target cell is configured with a security configuration, and to use the security configuration to derive a second key set for establishing a second security context between the wireless terminal and a second wireless access node that serves the target cell.

In still another of its example embodiments and modes the technology disclosed herein concerns a method of operating an access node of a radio access network. In a basic mode the method comprises establishing, using a first key set, a first security context with a wireless terminal; using processor circuitry to generate a configuration message; and transmitting the configuration message to the wireless terminal. The configuration message is configured to comprise one or more conditional handover configurations, each of the one or more conditional handover configurations comprising at least one identity of a candidate target cell, and at least one triggering condition; and an indication, by whether or not one of the one or more conditional handover configurations is configured with a security configuration, of a key set to be used by a wireless terminal to establish a second security context upon or after a handover configured by the each of the one or more conditional handover configurations.

In another of its example embodiments and modes the technology disclosed herein concerns a wireless terminal which comprises processor circuitry and receiver circuitry. The processor circuitry configured to establish, using a first key set, a first security context with a first wireless access node. The receiver circuitry is configured to receive a configuration message comprising one or more conditional handover configurations. Each of the one or more conditional handover configurations comprising at least one identity of a candidate target cell, and at least one triggering condition. The processor circuitry is further configured to perform a handover to a target cell; to determine validity of the conditional handover configurations, based on whether or not the handover to the target cell is configured with a security configuration, and to use the security configuration to derive a second key set for establishing a second security context with a second wireless access node that serves the target cell.

In another of its example embodiments and modes the technology disclosed herein concerns a method in a wireless terminal. In a basic mode the method comprises establishing, using a first key set, a first security context with a first wireless access node; receiving a configuration message comprising one or more conditional handover configurations, each of the one or more conditional handover configurations comprising at least one identity of a candidate target cell, and at least one triggering condition; performing a handover to a target cell; determining validity of the conditional handover configurations, based on whether or not the handover to the target cell is configured with a security configuration, and; using the security configuration to derive a second key set for establishing a second security context with a second wireless access node that serves the target cell.

In yet another of its example embodiments and modes the technology disclosed herein concerns wireless access node comprising processor circuitry and transmitter circuitry. The processor circuitry is configured to establish a first security context with a wireless terminal using a first key set. The transmitter circuitry is configured to transmit a configuration message comprising one or more conditional handover configurations, each of the one or more conditional handover configurations comprising at least one identity of a candidate target cell, and at least one triggering condition. The processor circuitry is further configured: to determine, upon the wireless terminal performing a handover to a target cell, validity of the conditional handover configurations, based on whether or not the handover to the target cell is configured with a security configuration, and to use the security configuration to derive a second key set for establishing a second security context between the wireless terminal and a second wireless access node that serves the target cell.

In still another of its example aspects the technology disclosed herein concerns a method in a wireless access node. In a basic example mode the method comprises establishing a first security context with a wireless terminal using a first key set; transmitting a configuration message comprising one or more conditional handover configurations, each of the one or more conditional handover configurations comprising at least one identity of a candidate target cell, and at least one triggering condition; determining, upon the wireless terminal performing a handover to a target cell, validity of the conditional handover configurations, based on whether or not the handover to the target cell is configured with a security configuration, and; using the security configuration to derive a second key set for establishing a second security context between the wireless terminal and a second wireless access node that serves the target cell.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMT Advanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. A frame, which may have both downlink portion(s) and uplink portion(s), is communicated between the base station and the wireless terminal. Each frame may comprise plural subframes, and a subframe may be divided into slots. The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and 1 are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural sub-carriers and plural symbols (e.g., plural resource elements (RE)) and is called a resource block (RB). A resource block may comprise, for example, 84 resource elements, i.e., 12 sub-carriers and 7 symbols, in case of normal cyclic prefix.

Figure 2:
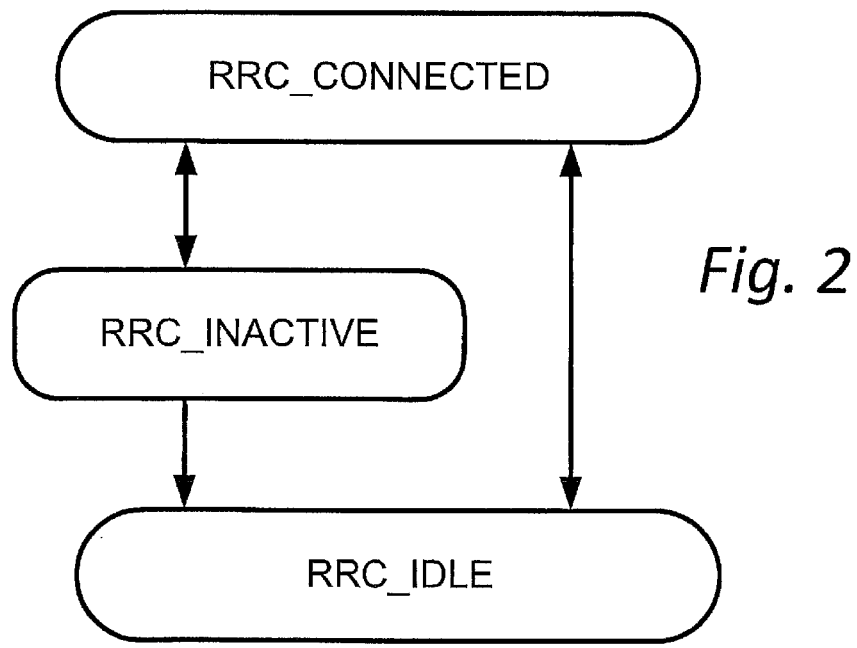
FIG. 2 is a diagrammatic view showing transition states of a Radio Resource Control RRC state machine.

As described herein, both an access node and a wireless terminal may manage respective Radio Resource Control (RRC) state machines. The RRC state machines transition between several RRC states including RRC_IDLE, RRC_INACTIVE and RRC_CONNECTED. FIG. 2 depicts the state transition diagram of the RRC states. From the vantage point of a wireless terminal e.g., user equipment (UE), the RRC states may be briefly characterized as follows:

RRC_IDLE:
  A UE specific DRX (discontinuous reception) may be configured by upper layers;
  UE controlled mobility based on network configuration;
  The UE:
    Monitors a Paging channel;
    Performs neighboring cell measurements and cell (re-) selection;
    Acquires system information.

RRC_INACTIVE:
  A UE specific DRX may be configured by upper layers or by RRC layer;
  UE controlled mobility based on network configuration;
  The UE stores the Access Stratum (AS) context;
  The UE:
    Monitors a Paging channel;
    Performs neighboring cell measurements and cell (re-) selection;
    Performs RAN-based notification area updates when moving outside the RAN-based notification area;
    Acquires system information.

RRC_CONNECTED:
  The UE stores the AS context.
  Transfer of unicast data to/from UE.
  At lower layers, the UE may be configured with a UE specific DRX;
  Network controlled mobility, i.e. handover within NR and to/from E-UTRAN;
  The UE:
    Monitors a Paging channel;
    Monitors control channels associated with the shared data channel to determine if data is scheduled for it;
    Provides channel quality and feedback information;
    Performs neighboring cell measurements and measurement reporting;
    Acquires system information.

Figure 3:
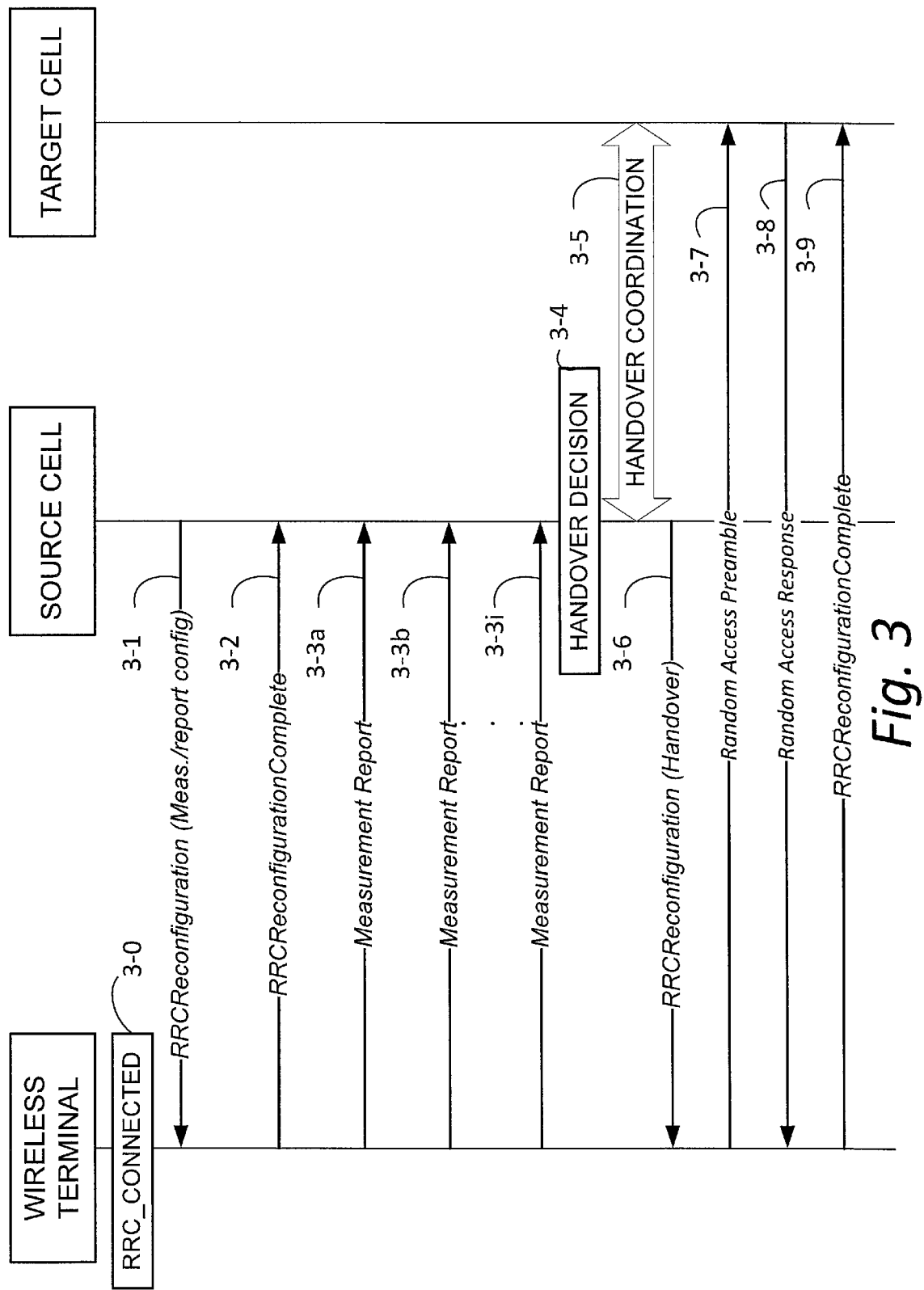
FIG. 3 is a diagrammatic view of showing signaling and messages of a procedure/scenario of a basic handover in an example cellular communications system.

FIG. 3 shows a procedure/scenario of a basic handover in a cellular communication system. During RRC_CONNECTED state, depicted by act 3-0, as act 3-1 the wireless terminal, e.g., UE, may receive RRCReconfiguration message from the gNB of the current serving cell (source cell). The RRCReconfiguration message of act 3-1 may comprise configuration parameters (a) for radio signal measurements and (b) reporting of measurement results (measurement configuration). The RRCReconfiguration message of act 3-1 may be acknowledged with an RRCReconfigurationComplete message, as shown by act 3-2. Thereafter, the UE may start measurements and, as shown by act 3-3a, act 3-3b, and act 3-3i, may transmit the results of the measurements to the gNB of the source cell based on the configuration parameters which were received in the RRCReconfiguration message of act 3-1. The configuration parameters may include radio resources (frequencies, sub-carrier spacing, etc.) for measurements and conditions to trigger reporting. Upon receiving one of the measurement reports of acts 3-3x, as act 3-4 the gNB of the source cell may determine whether or not to handover the UE to another cell. For example, when the measurement report indicates that signal quality from a neighbor cell (Target cell in FIG. 3) is better than the one from the source cell, the gNB of the source cell may initiate a handover to the target cell. As shown by act 3-5, the gNB may then conduct a coordination procedure to the gNB of the target cell. After the coordination depicted by act 3-5 is completed, as shown by act 3-6 the gNB may send to the UE a RRCReconfiguration message. The RRCReconfiguration message of act 3-6 may include a command to handover to the target cell. Upon receiving RRCReconfiguration message of act 3-6 with the handover command, the UE may start an initial access to the target cell by sending Random Access Preamble as shown by act 3-7. In response to it sending of the Random Access Preamble as shown by act 3-7, the UE should receive a Random Access Response message as shown by act 3-8. The handover procedure is then completed by the UE sending a RRCReconfiguration-Complete message to the gNB of the target cell, as shown by act 3-9.

In one configuration, the measurement configuration, which may be realized by the parameters of the RRCReconfiguration message of act 3-1, may comprise the parameters which are illustrated in FIG. 4 as "measurement objects", "reporting configurations", "measurement identities", "quantity configurations", and "measurement gaps", each of which are described below.

1. Measurement objects: A list of objects on which the UE shall perform the measurements.
  For intra-frequency and inter-frequency measurements a measurement object (MO) indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations where there can be one or multiple reporting configurations per measurement object. Each reporting configuration may comprise the following:

Reporting criterion: The criterion that triggers the UE to send a measurement report. This can either be periodical or a single event description.

Reference Signal (RS) type: The RS that the UE uses for beam and cell measurement results (synchronization signal SS/Physical Broadcast Channel PBCH block or Channel State Information-Reference Signal CSI-RS).

Reporting format: The quantities per cell and per beam that the UE includes in the measurement report, e.g. received signal received power, RSRP and other associated information such as the maximum number of cells and the maximum number beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter co-efficients can be configured for different measurement quantities, for different RS types, and for measurements per cell and per beam.

5. Measurement gaps: Periods that the UE may use to perform measurements.

A UE in RRC_CONNECTED state may maintain a measurement object list, a reporting configuration list, and a measurement identities list. The measurement object list may possibly include New Radio, NR, measurement object(s) and inter-RAT objects. Similarly, the reporting configuration list may include NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures may distinguish the three types of cells: the serving cell(s), the listed cell(s), and the detected cell(s). The listed cells are cells listed within the measurement object(s). The detected cells are cells that are not listed within the measurement object(s) but are detected by the UE on the synchronization signal block, SSB, frequency(ies) and subcarrier spacing(s) indicated by the measurement object(s).

For measurement object(s), the UE measures and reports on the serving cell(s), listed cells and/or detected cells. For inter-RAT measurements object(s) of E-UTRA, the UE measures and reports on listed cells and detected cells.

Listing 1 shows an example implementation of the measurement configuration, per 3GPP TS 38.331 v15.5.1.

| Listing 1 |
| --- |

```
MeasConfig ::=                              SEQUENCE {
    measObjectToRemoveList                  MeasObjectToRemoveList
    OPTIONAL,  -- Need N
    measObjectToAddModList                  MeasObjectToAddModList
    OPTIONAL,  -- Need N
    reportConfigToRemoveList
ReportConfigToRemoveList
    OPTIONAL,  -- Need N
    reportConfigToAddModList
ReportConfigToAddModList
    OPTIONAL,  -- Need N
    measIdToRemoveList                      MeasIdToRemoveList
    OPTIONAL,  -- Need N
    measIdToAddModList                      MeasIdToAddModList
    OPTIONAL,  -- Need N
    s-MeasureConfig                         CHOICE {
        ssb-RSRP                                RSRP-Range,
        csi-RSRP                                RSRP-Range
    }
    OPTIONAL,  -- Need M
    quantityConfig                          QuantityConfig
    OPTIONAL,  -- Need M
    measGapConfig                           MeasGapConfig
    OPTIONAL,  -- Need M
    measGapSharingConfig                    MeasGapSharingConfig
    OPTIONAL,  -- Need M
    ...
}
MeasObjectToRemoveList ::=                  SEQUENCE (SIZE
(1..maxNrofObjectId)) OF MeasObjectId
MeasIdToRemoveList ::=                      SEQUENCE (SIZE
(1..maxNrofMeasId)) OF MeasId
ReportConfigToRemoveList ::=                SEQUENCE (SIZE
(1..maxReportConfigId)) OF ReportConfigId
MeasIdToAddModList ::=                      SEQUENCE (SIZE
(1..maxNrofMeasId)) OF MeasIdToAddMod
MeasIdToAddMod ::=                          SEQUENCE {
    measId                                  MeasId,
    measObjectId                            MeasObjectId,
    reportConfigId                          ReportConfigId
}
MeasObjectNR ::=                            SEQUENCE {
    ssbFrequency                            ARFCN-ValueNR
    OPTIONAL,  -- Cond SSBorAssociatedSSB
    ssbSubcarrierSpacing                    SubcarrierSpacing
    OPTIONAL,  -- Cond SSBorAssociatedSSB
    smtc1                                   SSB-MTC
    OPTIONAL,  -- Cond SSBorAssociatedSSB
    smtc2                                   SSB-MTC2
    OPTIONAL,  -- Cond IntraFreqConnected
    refFreqCSI-RS                           ARFCN-ValueNR
    OPTIONAL,  -- Cond CSI-RS
    referenceSignalConfig                   ReferenceSignalConfig,
    absThreshSS-BlocksConsolidation         ThresholdNR
    OPTIONAL,  -- Need R
    absThreshCSI-RS-Consolidation           ThresholdNR
    OPTIONAL,  -- Need R
    nrofSS-BlocksToAverage                  INTEGER
(2..maxNrofSS-BlocksToAverage)              OPTIONAL, Need R
    nrofCSI-RS-ResourcesToAverage           INTEGER
```

Listing 1

```
  (2..maxNrofCSI-RS-ResourcesToAverage)
OPTIONAL, -- Need R
    quantityConfigIndex              INTEGER
(1..maxNrofQuantityConfig),
    offsetMO                         Q-OffsetRangeList,
    cellsToRemoveList                PCI-List
OPTIONAL, -- Need N
    cellsToAddModList                CellsToAddModList
OPTIONAL, -- Need N
    blackCellsToRemoveList           PCI-RangeIndexList
OPTIONAL, -- Need N
    blackCellsToAddModList SEQUENCE (SIZE (1..maxNrofPCI-
Ranges)) OF PCI-RangeElement
OPTIONAL, -- Need N
    whiteCellsToRemoveList           PCI-RangeIndexList
OPTIONAL, -- Need N
    whiteCellsToAddModList           SEQUENCE (SIZE
(1..maxNrofPCI-Ranges)) OF PCI-RangeElement
OPTIONAL, -- Need N
    ... ,
    [[
    freqBandIndicatorNR-v1530        FreqBandIndicatorNR
OPTIONAL, -- Need R
    measCycleSCell-v1530             ENUMERATED
{sf160, sf256, sf320, sf512, sf640, sf1024, sf1280}
OPTIONAL -- Need R
    ]]
}
CellsToAddModList ::=                SEQUENCE (SIZE
(1..maxNrofCellMeas)) OF CellsToAddMod
CellsToAddMod ::=                    SEQUENCE {
    physCellId                       PhysCellId,
    cellIndividualOffset             Q-OffsetRangeList
}
ReportConfigToAddModList ::=         SEQUENCE (SIZE
(1..maxReportConfigId)) OF ReportConfigToAddMod
ReportConfigToAddMod ::=             SEQUENCE {
    reportConfigId                   ReportConfigId,
    reportConfig                     CHOICE {
      reportConfigNR                 ReportConfigNR,
      ...,
      reportConfigInterRAT
ReportConfigInterRAT
    }
}
ReportConfigNR ::=                   SEQUENCE {
    reportType                       CHOICE {
      periodical
PeriodicalReportConfig,
      eventTriggered
EventTriggerConfig,
      ...,
      reportCGI                      ReportCGI
    }
}
ReportCGI ::=                        SEQUENCE {
    cellForWhichToReportCGI          PhysCellId,
    ...
}
EventTriggerConfig ::=               SEQUENCE {
    eventId                          CHOICE {
      eventA1                        SEQUENCE {
        a1-Threshold
MeasTriggerQuantity,
        reportOnLeave
BOOLEAN,
        hysteresis
Hysteresis,
        timeToTrigger
TimeToTrigger
      },
      eventA2                        SEQUENCE {
        a2-Threshold
MeasTriggerQuantity,
        reportOnLeave
BOOLEAN,
        hysteresis
Hysteresis,
        timeToTrigger
TimeToTrigger
      },
      eventA3                        SEQUENCE {
        a3-Offset
MeasTriggerQuantityOffset,
        reportOnLeave
BOOLEAN,
        hysteresis
Hysteresis,
        timeToTrigger
TimeToTrigger,
        useWhiteCellList             BOOLEAN
      },
      eventA4                        SEQUENCE {
        a4-Threshold
MeasTriggerQuantity,
        reportOnLeave
BOOLEAN,
        hysteresis
Hysteresis,
        timeToTrigger
TimeToTrigger,
        useWhiteCellList             BOOLEAN
      },
      eventA5                        SEQUENCE {
        a5-Threshold1
MeasTriggerQuantity,
        a5-Threshold2
MeasTriggerQuantity,
        reportOnLeave
BOOLEAN,
        hysteresis
Hysteresis,
        timeToTrigger
TimeToTrigger,
        useWhiteCellList             BOOLEAN
      },
      eventA6                        SEQUENCE {
        a6-Offset
MeasTriggerQuantityOffset,
        reportOnLeave
BOOLEAN,
        hysteresis
Hysteresis,
        timeToTrigger
TimeToTrigger,
        useWhiteCellList             BOOLEAN
      },
      ...
    },
    rsType                           NR-RS-Type,
    reportInterval                   ReportInterval,
    reportAmount                     ENUMERATED {r1,
r2, r4, r8, r16, r32, r64, infinity},
    reportQuantityCell
MeasReportQuantity,
    maxReportCells                   INTEGER
(1..maxCellReport),
    reportQuantityRS-Indexes
MeasReportQuantity
OPTIONAL, -- Need R
    maxNrofRS-IndexesToReport        INTEGER
(1..maxNrofIndexesToReport)      OPTIONAL, -- Need R
    includeBeamMeasurements          BOOLEAN,
    reportAddNeighMeas               ENUMERATED
{setup}                              OPTIONAL,
-- Need R
    ...
}
PeriodicalReportConfig ::=           SEQUENCE {
    rsType                           NR-RS-Type,
    reportInterval                   ReportInterval,
    reportAmount                     ENUMERATED {r1,
r2, r4, r8, r16, r32, r54, infinity},
    reportQuantityCell
```

Listing 1

```
MeasReportQuantity,
    maxReportCells              INTEGER
(1..maxCellReport) ,
    reportQuantityRS-Indexes
MeasReportQuantity
OPTIONAL,   -- Need R
    maxNrofRS-IndexesToReport   INTEGER
(1..maxNrofIndexesToReport)     OPTIONAL,  -- Need R
    includeBeamMeasurements     BOOLEAN,
    useWhiteCellList            BOOLEAN,
    ...
}
NR-RS-Type ::=                  ENUMERATED {ssb,
csi-rs}
MeasTriggerQuantity ::=         CHOICE {
    rsrp                        RSRP-Range,
    rsrq                        RSRQ-Range,
    sinr                        SINR-Range
}
MeasTriggerQuantityOffset ::=   CHOICE {
    rsrp                        INTEGER (-
30..30),
    rsrq                        INTEGER (-
30..30),
    sinr                        INTEGER (-
30..30)
}
MeasReportQuantity ::=          SEQUENCE {
    rsrp                        BOOLEAN,
    rsrq                        BOOLEAN,
    sinr                        BOOLEAN
}
MeasIdToAddModList ::=          SEQUENCE (SIZE
(1..maxNrofMeasId)) OF MeasIdToAddMod
MeasIdToAddMod ::=              SEQUENCE {
    measId                      MeasId,
    measObjectId                MeasObjectId,
    reportConfigId              ReportConfigId
}
```

Listing 2 shows an example procedure of measurement report triggering.

Listing 2

```
Event A1: Serving becomes better than absolute threshold;
Event A2: Serving becomes worse than absolute threshold;
Event A3: Neighbour becomes amount of offset better than
    PCell/PSCell;
Event A4 : Neighbour becomes better than absolute
    threshold;
Event A5: PCell/PSCell becomes worse than absolute
    threshold1 AND Neighbour/SCell becomes better than another
    absolute threshold2;
Event A6: Neighbour becomes amount of offset better than
    SCell.
1>  for each measId included in the measIdList within
    VarMeasConfig:
    2>  if the corresponding reportConfig includes a
        reportType set to eventTriggered or periodical:
        3>  if the corresponding measObject concerns NR:
            4>  if the eventA1 or eventA2 is configured in the
                corresponding reportConfig:
                5>  consider only the serving cell to be applicable;
            4>  if the eventA3 or eventA5 is configured in the
                corresponding reportConfig;
                5>  if a serving cell is associated with a
                    measObjectNR and neighbours are associated with
                    another measObjectNR, consider any serving cell
                    associated with the other measObjectNR to be a
                    neighbouring cell as well;
            4>  for measurement events other than eventA1 or eventA2:
                5>  if useWhiteCellList is set to true:
                    6>  consider any neighbouring cell detected based on
                        parameters in the associated measObjectNR to be
                        applicable when the concerned cell is included in
                        the whiteCellsToAddModList defined within the
                        VarMeasConfig for this measId;
                    5>  else:
                        6>  consider any neighbouring cell detected based on
                            parameters in the associated measObjectNR to be
                            applicable when the concerned cell is not
                            included in the blackCellsToAddModList defined
                            within the VarMeasConfig for this measId;
        3>  else if the corresponding measObject concerns E-UTRA:
            4>  consider any neighbouring cell detected on the
                associated frequency to be applicable when the
                concerned cell is not included in the
                blackCellsToAddModListEUTRAN defined within the
                VarMeasConfig for this measId;
    2>  else if the corresponding reportConfig includes a
        reportType set to reportCGI:
        3>  consider the cell detected on the associated
            measObject which has a physical cell identity matching
            the value of the cellForWhichToReportCGI included in
            the corresponding reportConfig within the VarMeasConfig
            to be applicable;
    2>  if the reportType is set to eventTriggered and if the
        entry condition applicable for this event, i.e. the event
        corresponding with the eventId of the corresponding
        reportConfig within VarMeasConfig, is fulfilled for one
        or more applicable cells for all measurements after layer
        3 filtering taken during timeToTrigger defined for this
        event within the VarMeasConfig, while the
        VarMeasReportList does not include a measurement
        reporting entry for this measId (a first cell triggers
        the event):
        3>  include a measurement reporting entry within the
            VarMeasReportList for this measId;
        3>  set the numberOfReportsSent defined within the
            VarMeasReportList for this measId to 0;
        3>  include the concerned cell(s) in the
            cellsTriggeredList defined within the VarMeasReportList
            for this measId;
        3>  initiate the measurement reporting procedure;
    2>  else if the reportType is set to eventTriggered and
        if the entry condition applicable for this event, i.e.
        the event corresponding with the eventId of the
        corresponding reportConfig within VarMeasConfig, is
        fulfilled for one or more applicable cells not included
        in the cellsTriggeredList for all measurements after
        layer 3 filtering taken during timeToTrigger defined for
        this event within the VarMeasConfig (a subsequent cell
        triggers the event):
        3>  set the numberOfReportsSent defined within the
            VarMeasReportList for this measId to 0;
        3>  include the concerned cell(s) in the
            cellsTriggeredList defined within the VarMeasReportList
            for this measId;
        3>  initiate the measurement reporting procedure;
    2>  else if the reportType is set to eventTriggered and
        if the leaving condition applicable for this event is
        fulfilled for one or more of the cells included in the
        cellsTriggeredList defined within the VarMeasReportList
        for this measId for all measurements after layer 3
        filtering taken during timeToTrigger defined within the
        VarMeasConfig for this event:
        3>  remove the concerned cell(s) in the
            cellsTriggeredList defined within the VarMeasReportList
            for this measId;
        3>  if reportOnLeave is set to true for the corresponding
            reporting configuration:
            4>  initiate the measurement reporting procedure;
        3>  if the cellsTriggeredList defined within the
            VarMeasReportList for this measId is empty:
            4>  remove the measurement reporting entry within the
                VarMeasReportList for this measId;
            4>  stop the periodical reporting timer for this measId,
                if running;
    2>  if reportType is set to periodical and if a (first)
        measurement result is available:
```

Listing 2

```
3>      include a measurement reporting entry within the
        VarMeasReportList for this measId;
3>      set the numberOfReportsSent defined within the
        VarMeasReportList for this measId to 0;
3>      if the reportAmount exceeds 1:
    4>      initiate the measurement reporting procedure, as
            specified in 5.5.5, immediately after the quantity to
            be reported becomes available for the NR SpCell;
3>      else (i.e. the reportAmount is equal to 1):
    4>      initiate the measurement reporting procedure,
            immediately after the quantity to be reported becomes
            available for the NR SpCell and for the strongest
            cell among the applicable cells;
2>  upon expiry of the periodical reporting timer for
    this measId:
    3>  initiate the measurement reporting procedure.
2>  if reportType is set to reportCGI:
    3>  if the UE acquired the SIB1 or
        SystemInformationBlockType1 for the requested cell; or
    3>  if the UE detects that the requested NR cell is not
        transmitting SIB1 (see TS 38.213 [13], clause 13):
        4>  stop timer T321;
        4>  include a measurement reporting entry within the
            VarMeasReportList for this measId;
        4>  set the numberOfReportsSent defined within the
            VarMeasReportList for this measId to 0;
        4>  initiate the measurement reporting procedure;
    2>  upon the expiry of T321 for this measId;
        3>  include a measurement reporting entry within the
            VarMeasReportList for this measId;
        3>  set the numberOfReportsSent defined within the
            VarMeasReportList for this measId to 0;
        3>  initiate the measurement reporting procedure.
```

In the measurement reporting procedure described above, the UE may transmit the MeasurementReport message to the gNB of the serving cell (source cell). The MeasurementReport message may comprise measId that triggered the measurement reporting, measurement result(s) of serving cell(s), best neighboring cells, and/or cells that triggered reporting event(s), as illustrated by way of example in FIG. 5. It should be noted that for event-driven (eventTriggered) reporting, there are two conditions: entry condition and leaving condition. The entry condition is met when a specific event occurs, whereas the leaving condition is met when the condition of the specific event no longer exists. In addition, a parameter for hysteresis may be involved in determining the entry/leaving conditions to avoid ping-pong effects. For example, for Event A1, the entry condition is met when the signal strength of the serving cell is better than a1-threshold + hysteresis, whereas the leaving condition is met when the signal strength is lower than a1-threshold − hysteresis. When the entry condition is met, the UE may generate and send MeasurementReport. On the other hand, when the leaving condition is met, whether or not to send MeasurementReport may depend on the parameter reportOnLeave associated with a concerned event.

Listing 3 shows an example implementation of a MeasurementReport.

Listing 3

```
MeasurementReport ::=               SEQUENCE {
    criticalExtensions                  CHOICE {
        measurementReport                   MeasurementReport-IEs,
        criticalExtensionsFuture            SEQUENCE { }
    }
}
MeasurementReport-IEs ::=           SEQUENCE {
```

Listing 3

```
    measResults                         MeasResults,
    lateNonCriticalExtension            OCTET STRING
OPTIONAL,
    nonCriticalExtension                SEQUENCE{ }
OPTIONAL
}
MeasResults ::=                     SEQUENCE {
    measId                              MeasId,
    measResultServingMOList             MeasResultServMOList,
    measResultNeighCells                CHOICE {
        measResultListNR                    MeasResultListNR,
        ...,
        measResultListEUTRA                 MeasResultListEUTRA
    }
OPTIONAL,
    ...
}
MeasResultServMOList ::=    SEQUENCE (SIZE
(1..maxNrofServingCells)) OF MeasResultServMO
MeasResultServMO ::=        SEQUENCE {
    servCellId                          ServCellIndex,
    measResultServingCell               MeasResultNR,
    measResultBestNeighCell             MeasResultNR
OPTIONAL,
    ...
}
MeasResultListNR ::= SEQUENCE (SIZE (1..maxCellReport)) OF
MeasResultNR
MeasResultNR ::=                    SEQUENCE {
    physCellId                          PhysCellId
OPTIONAL,
    measResult                          SEQUENCE {
        cellResults                         SEQUENCE{
            resultsSSB-Cell                     MeasQuantityResults
OPTIONAL,
            resultsCSI-RS-Cell                  MeasQuantityResults
OPTIONAL
        },
        rsIndexResults                      SEQUENCE{
            resultsSSB-Indexes                  ResultsPerSSB-IndexList
OPTIONAL,
            resultSCSI-RS-Indexes               ResultsPerCSI-RS-IndexList
OPTIONAL
        }
OPTIONAL
    },
    ...,
    [[
    cgi-Info                            CGI-Info
OPTIONAL
    ]]
}
...
```

Five basic example embodiments and modes of conditional handover configurations and techniques according to the technology disclosed herein are described below in general, non-limiting fashion.

1: Conditional Handover Configurations and Reporting

Figure 6:
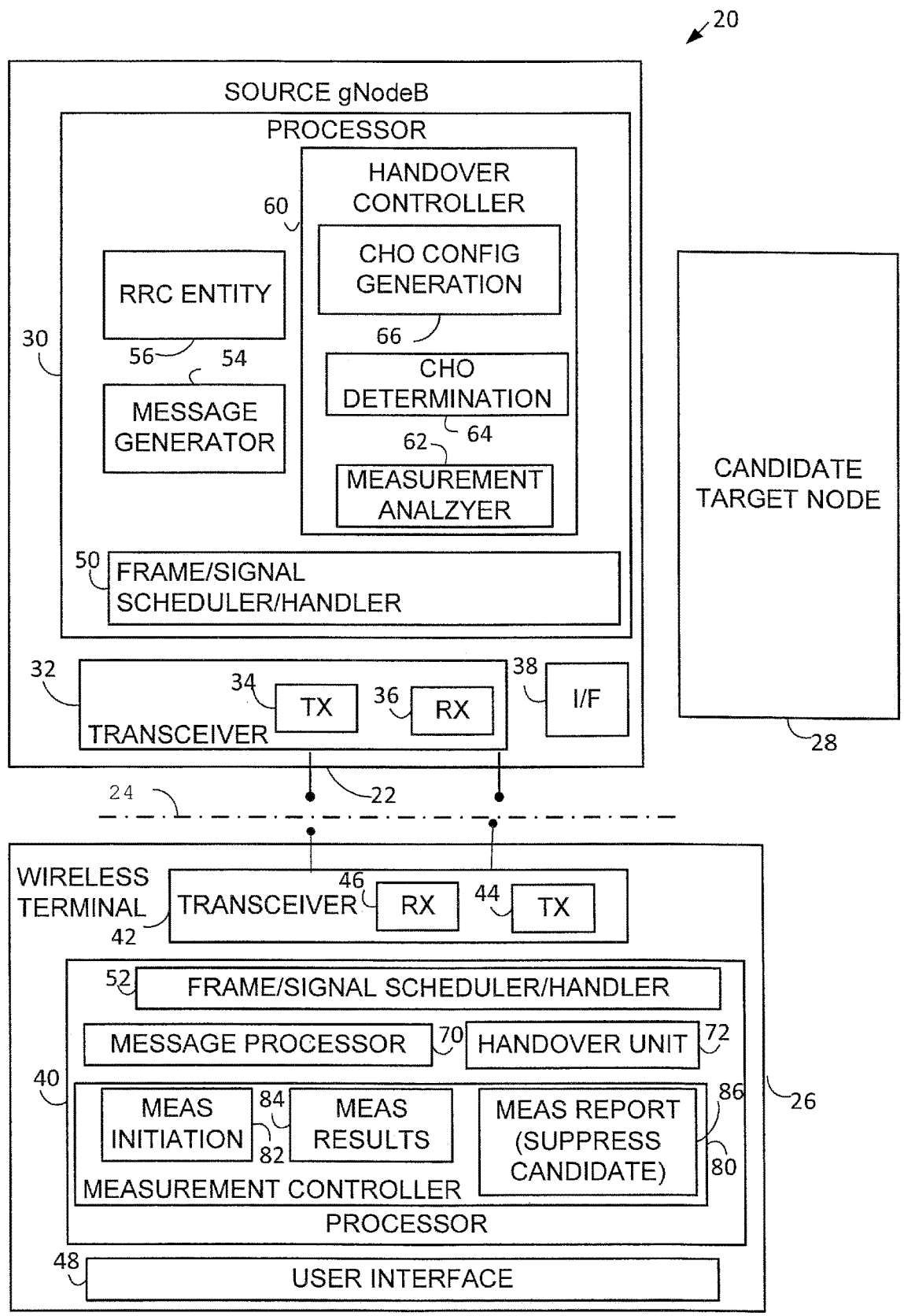
FIG. 6 is a schematic view of an example communications system comprising a source gNodeB which provides a wireless terminal with conditional handover configuration information which the wireless terminal may use for controlling generation and/or content of measurement reports.

FIG. 6 shows an example communications system 20 wherein a source radio access node 22 communicates over air or radio interface 24 (e.g., Uu interface) with wireless terminal 26. The source radio access node may also communication with a target radio access node 28 over an appropriate interface, such as either the radio interface 24 in the case of a backhaul configuration or $X_n$ interface in the manner shown in FIG. 1.

As mentioned above, the radio access node 22 may be any suitable node for communicating with the wireless terminal 26, such as a base station node, gNodeB ("gNB") or eNodeB ("eNB"), for example. For sake of simplicity, the source radio access node 22 may herein briefly be referred to as the source node 22, or source gNodeB 22, or source gNB 22.

Similarly, the target radio access node 28 may herein briefly be referred to as the target node 28, or target gNodeB 28, or target gNB 28.

The source gNodeB 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively. In addition, source gNodeB 22 may comprise inter-node interface circuitry 38 for communicating with target gNodeB 28. Although not shown as such, it should be understood that the target gNodeB 28 may similarly have its own node processor 30, node transceiver circuitry 32, and inter-node interface circuitry 38.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The respective transmitter circuits 36 and 46 may comprise, e.g., amplifier(s), modulation circuitry and other conventional transmission equipment. The respective receiver circuits 34 and 44 may comprise, e.g., amplifiers, demodulation circuitry, and other conventional receiver equipment.

In general operation, source gNodeB 22 and wireless terminal 26 communicate with each other across radio interface 24 using predefined configurations of information. By way of non-limiting example, the source gNodeB 22 and wireless terminal 26 may communicate over radio interface 24 using "frames" of information that may be configured to include various channels. For example, a frame, which may have both downlink portion(s) and uplink portion(s), may comprise plural subframes, with each subframe in turn being divided into slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between source gNodeB 22 and wireless terminal 26 over radio interface 24, the node processor 30 and terminal processor 40 of FIG. 6 are shown as comprising respective information handlers. For an example implementation in which the information is communicated via frames, the information handler for source gNodeB 22 is shown as node frame/signal scheduler/handler 50, while the information handler for wireless terminal 26 is shown as terminal frame/signal handler 52.

The node processor 30 of source gNodeB 22 also includes message generator 54, RRC state machine 56, and handover controller 60. The RRC state machine 56 may operate in a manner understood from FIG. 2, and may interact with message generator 54 for the generation of RRC messages such as RRCReconfiguration messages, for example. The handover controller 60 may comprise measurement analyzer 62, conditional handover (CHO) determination unit 64, and conditional handover configuration information generator 66.

The terminal processor 40 of wireless terminal 26 also includes message processor 70, handover unit 72, and measurement controller 80. The measurement controller 80 in turn further comprises measurement initiation unit 82; measurement results unit 84; and measurement report control unit 86.

Figure 7:
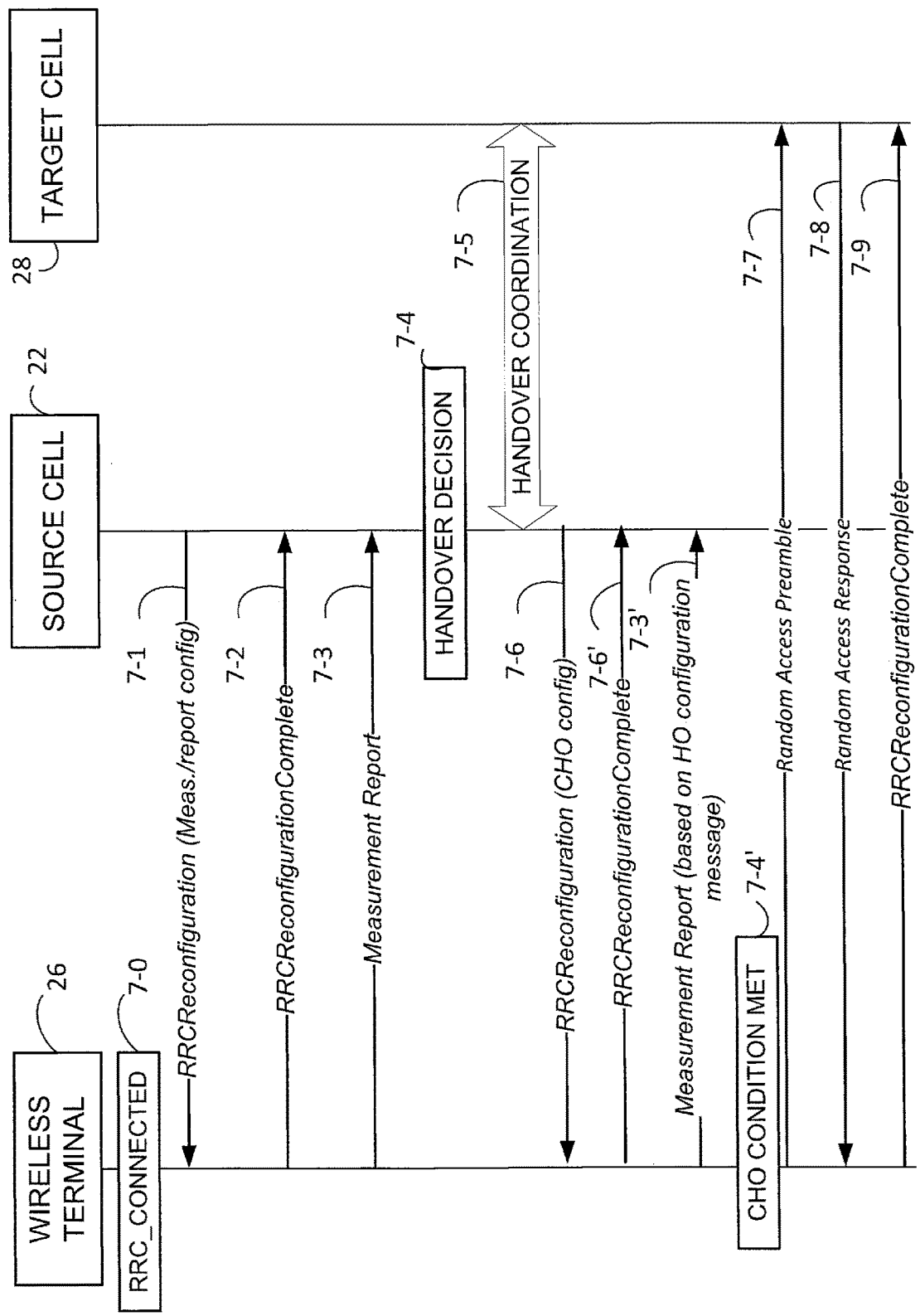
FIG. 7 is a diagrammatic view showing signaling and messages involved in measurement report in a conditional handover situation for the example cellular communications system of FIG. 6.

FIG. 7 illustrates an example scenario in which the communications system of FIG. 6 may execute a conditional handover. Some acts of FIG. 7 which are similar to those of FIG. 3 have similar suffixed act numbers, for example, act 7-0, like act 2-0 shows that the UE is in RRC_CONNECTED state. Similarly, act 7-1, like act 3-1, shows that the wireless terminal 26 may be configured by the gNB 22 of the serving cell (source cell) with the measurement configuration. The measurement configuration of act 7-1 may be similar to the measurement configuration of Listing 1. Based on the measurement configuration received in act 7-1, the wireless terminal 26 may send measurement reports 7-3. The timing of the measurements made by wireless terminal 26 may be governed by measurement initiation unit 82, the measurement results analysed by measurement results unit 84, and the measurement reports may be generated by 86. The measurement reports may be similar to the example implementation shown in Listing 3. Example logic for triggering the decision of act 7-4, e.g., a procedure for measurement report triggering, may be understood with reference to Listing 1.

FIG. 7 further shows that, in this particular scenario, as act 7-4 the gNB 22 makes a decision to send the conditional handover (CHO) configuration to the wireless terminal 26. The decision of act 7-4, which may be made by conditional handover (CHO) determination unit 64, is triggered by the measurement result(s) of the target cell, i.e., a measurement report 7-3, as assessed by measurement analyzer 62. Act 7-5 shows a handover coordination procedure which is performed after the decision of act 7-4. The handover coordination procedure of act 7-5 is performed to prepare both source gNodeB 22 and target gNodeB 28 for the possibility of the handover. The communications involved in the handover coordination procedure of act 7-5 may be transmitted over the inter-node interface 34.

In one example implementation, after the handover decision of act 7-4 and the handover coordination procedure of act 7-5, as shown by act 7-6 a message may be sent to wireless terminal 26 to carry the conditional handover CHO configuration information. The conditional handover configuration information for the message of act 7-6 may be generated by conditional handover configuration information generator 66. In one example implementation the message of act 7-6 may be an RRCReconfiguration message. In another example implementation (not illustrated), another suitable message (e.g., RRCCHOConfiguration) may be used to send the conditional handover configuration information. Upon successful receipt of the message of act 7-6, i.e., the message that includes and sends the conditional handover configuration information to wireless terminal 26, a response or acknowledgement message is returned to source gNodeB 22 as shown by act 7-6'.

In an example implementation, the message used for act 7-6, e.g., the message that includes the CHO configuration information, may comprise the following parameters:
- Identification(s) of candidate target cell(s)
- Event(s) to trigger execution of CHO
- RACH configuration(s) of the candidate target cell(s)
- UL/DL configuration(s) of the candidate target cell(s)
- New UE identity(ies) (e.g. RNTI) to be used for the candidate target cell(s).

FIG. 8 generically shows various general information elements or types of information that may be included in the conditional handover configuration message of act 7-6, including but not limited to: reference signal type (e.g. SSB or CSI-RS); identifier(s) of candidate target nodes; handover conditions; measurement instructions; periodic values for periodic reporting, and leaving conditions. The last three aforementioned information elements may be optional and may be discussed in conjunction with other example embodiments and modes.

Listing 4 shows an information element CHOConfig, which is an example implementation of an information element (IE) to be included in the message of act 7-6 which is used for the CHO configuration. In this example implementation, the condition(s) to trigger measurement report (EventTriggerConfigCHO) may be configured separately from the conditions included in measConfig (EventTriggerConfig).

Listing 4

```
CHOConfig ::=                                    SEQUENCE {
    CHOConfigToRemoveList                        CHOConfigToRemoveList
OPTIONAL,             -- Need N
    CHOConfigToAddModList                        CHOConfigToAddModList
OPTIONAL,             -- Need N
}
OPTIONAL,             -- Need M
CHOConfigToRemoveList ::= SEQUENCE (SIZE
(1..maxNrofCHOConfigId)) OF CHOConfigId
ReportConfigToAddModList ::= SEQUENCE (SIZE
(1..maxCHOConfigId)) OF CHOConfigToAddMod
CHOConfigToAddMod ::=         SEQUENCE {
    choConfigId                                  CHOConfigId,
    reportConfig                                 CHOICE {
        choConfigNR                                  CHOConfigNR,
        ...,
        choConfigInterRAT                            choConfigInterRAT
    }
}
CHOConfigNR ::=                                  SEQUENCE {
    CHOConditionList              SEQUENCE (SIZE
(1..maxCHOConditionList)) OF CHOCondition
}
CHOCondition                                     SEQUENCE {
    candidateCellIDList                          SEQUENCE (SIZE
(1..maxCandidateCellIDList)) OF PhysCellId eventTriggered
EventTriggerConfigCHO,
        ...,
        reportCGI                                    ReportCGI
}
    spCellConfigCommon                           ServingCellConfigCommon
OPTIONAL,             -- Need M
    newUE-Identity                               RNTI-Value,
    validity                      ENUMERATED {ms50, ms100, ms150, ms200,
ns500, ms1000, ms2000, ms10000},
    rach-ConfigDedicated                         CHOICE {
        uplink                                       RACH-ConfigDedicated,
        supplementaryUplink                          RACH-ConfigDedicated
    }
OPTIONAL,             -- Need N
}
EventTriggerConfigCHO::=                         SEQUENCE {
    eventId                                      CHOICE {
        eventA1                                      SEQUENCE {
                        a1-Threshold                     MeasTriggerQuantity,
        },
        eventA2                                      SEQUENCE {
                        a2-Threshold                     MeasTriggerQuantity,
        },
        eventA3                                      SEQUENCE {
                        a3-Offset
MeasTriggerQuantityOffset,
        },
        eventA4                                      SEQUENCE {
                        a4-Threshold                     MeasTriggerQuantity,
        },
        eventA5                                      SEQUENCE {
                        a5-Threshold1                    MeasTriggerQuantity,
                        a5-Threshold2                    MeasTriggerQuantity,
        },
```

-continued

Listing 4

```
    eventA6                SEQUENCE {
              a6-Offset        MeasTriggerQuantityOffset,
    },
    ...
},
    rsType                 NR-RS-Type
...
}
```

After receiving the CHO configuration in the message of act 7-6 of FIG. 7, the wireless terminal 26 could, as in previous practice, continue the measurement procedure based on the measurement configuration received earlier, e.g., the measurement configuration received in act 7-1 before the handover decision of act 7-4. The earlier measurement configuration, e.g., the pre-conditional measurement configuration information, may include a measurement object that includes the measurement parameters covering the candidate target cell(s). Additionally, the measurement object of the pre-conditional measurement configuration information may also include the candidate target cell(s) in the whitelisted cells. In such a case, the measurement object could trigger a measurement report based on the associated (linked) report configuration. However, the serving cell, e.g., source gNodeB 22, has already negotiated with each of the candidate target cell(s), and the wireless terminal 26 is allowed to autonomously execute a handover to one of the candidate target cell(s) as long as the CHO configuration remains valid. Therefore, once the CHO configuration is provided in the message of act 7-5, it may be wasteful to send a measurement report with regard to any of the candidate target cell(s).

In view of the foregoing, as one of its features and advantages, the wireless terminal 26 of FIG. 6 may suppress measurement reports with regard to a candidate target cell included in the CHO configuration, when the measurement result of the signal from the candidate target cell satisfies the reporting condition specified in the corresponding reporting configuration. In other words, the wireless terminal 26 may transmit a measurement report when the measurement results available in the UE include the result(s) from cell(s) other than the one(s) configured as candidate target cell(s). Accordingly, the measurement report control unit 86 of wireless terminal 26 is labeled as a measurement report control unit 86 which may suppress the reporting of measurements for candidate target gNodeBs.

To reflect the foregoing, FIG. 7 shows as act 7-3' the wireless terminal 26 sending a measurement report which is based on the conditional handover configuration. For example, assume that one measurement object is linked to an event-triggered reporting configuration. If the measurement with regard to this measurement object results in finding a cell that meets the triggering condition in the reporting configuration, the wireless terminal 26 of FIG. 6 may send a measurement report if the identification of the found cell (e.g. physical cell ID) is for none of the candidate target cell(s) in the CHO configuration. Otherwise the UE may determine not to send the measurement report. If measurement results for cells other than the candidate target cell(s) are available, the wireless terminal 26 may be allowed to include in the measurement report the results from the candidate target cell(s) along with the results from the cells other than the candidate target cells.

Act 7-4' shows that the wireless terminal 26 may make a determination that the conditional handover conditions of the conditional handover configuration information are satisfied, and that a handover to a candidate target gNodeB 28 should occur. The determination of act 7-4' may be made by handover unit 72 of wireless terminal 26. Thereafter, the wireless terminal 26 may seek access to target gNodeB 28 by engaging in a random access procedure, as shown by act 7-7 and act 7-8. Act 7-7 comprises wireless terminal 26 sending a Random Access Preamble to target gNodeB 28. Upon successful receipt and recognition by target gNodeB 28 of the Random Access Preamble of act 7-7, the wireless terminal 26 should receive a Random Access Response message as shown by act 7-8. The handover procedure is then completed by the wireless terminal 26 sending an RRCReconfigurationComplete message to the target gNodeB 28, as shown by act 7-9.

Figure 9:
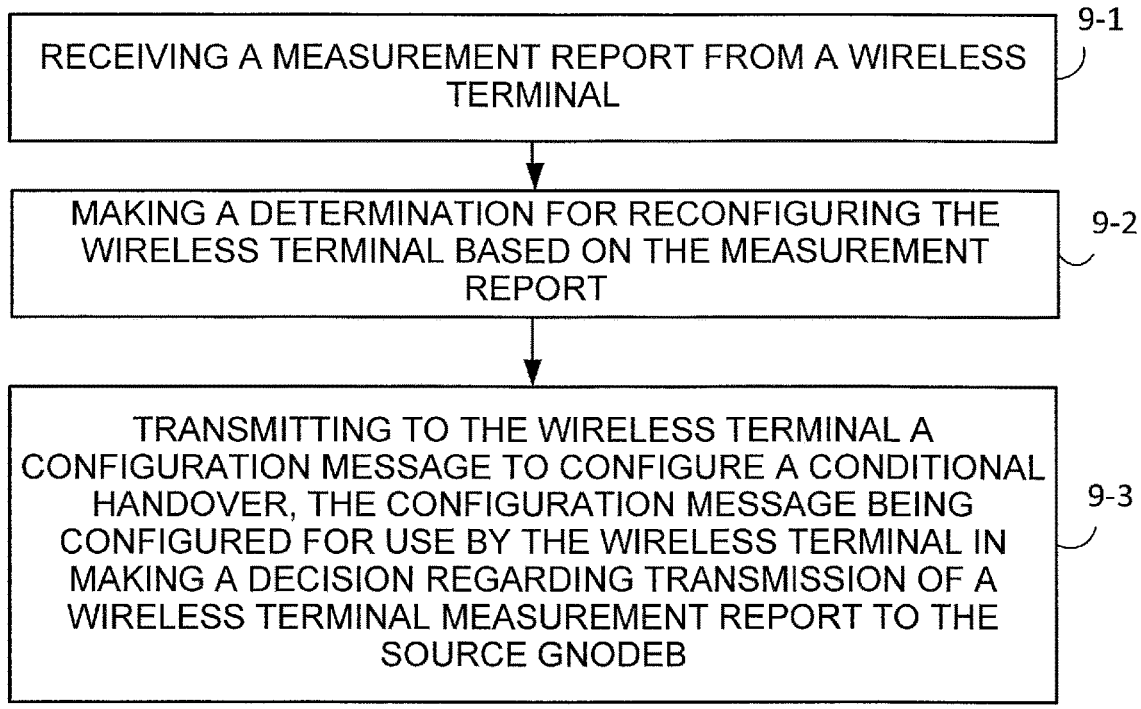
FIG. 9 is a flowchart showing example, basic, representative steps or acts performed by a source node of the system of FIG. 6.

The source gNodeB 22 of FIG. 6 thus provides wireless terminal 26 with conditional handover configuration information which the wireless terminal 26 may use for controlling generation and/or content of measurement reports. Example, representative, basic acts performed by source gNodeB 22 of FIG. 6 are shown in FIG. 9. Act 9-1 comprises receiving a measurement report from a wireless terminal. The measurement report of act 9-1 may be a report message such as message 7-3 of FIG. 7. Act 9-2 comprises making a determination for reconfiguring the wireless terminal based on the measurement report. The determination of act 9-2 may be made by conditional handover (CHO) determination unit 64 of source gNodeB 22, and may further be reflected by act 7-4 of FIG. 7. Act 9-3 comprises transmitting to the wireless terminal a configuration message to configure a conditional handover, the configuration message being configured for use by the wireless terminal in making a decision regarding transmission of a wireless terminal measurement report to the source gNodeB 22.

Figure 10:
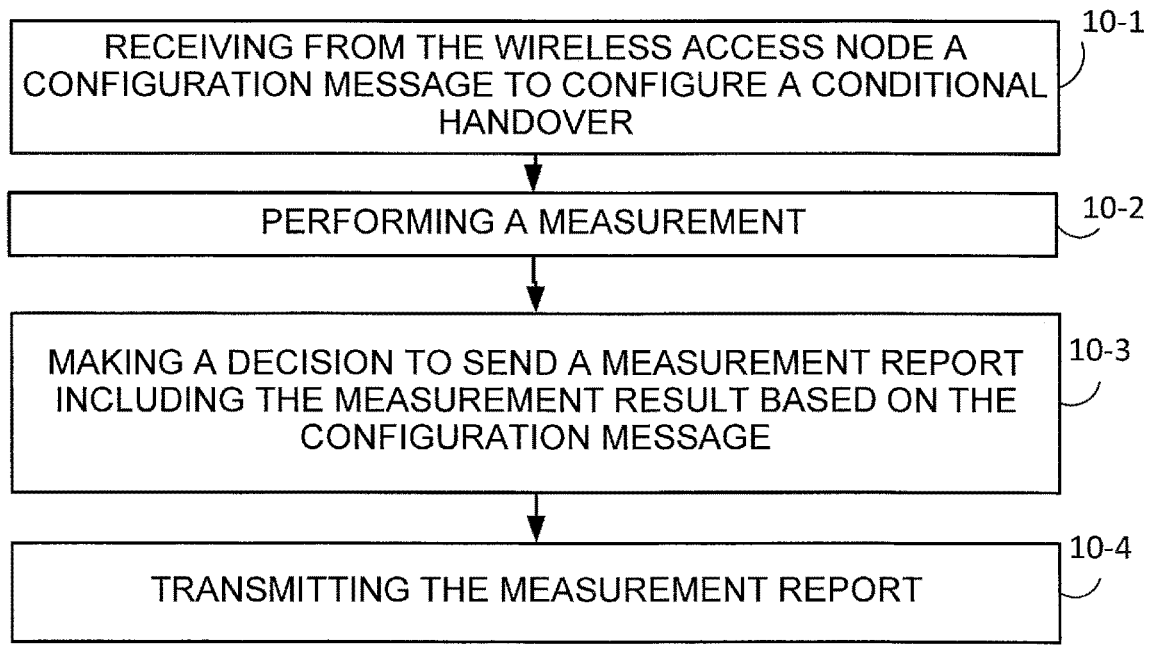
FIG. 10 is a flowchart showing example, basic, representative steps or acts performed by a wireless terminal of the system of FIG. 6.

Example, representative, basic acts performed by wireless terminal 26 of FIG. 6 are shown in FIG. 10. Act 10-1 comprises receiving from the wireless access node a configuration message to configure a conditional handover. The conditional handover configuration message of act 10-1 may be the message of act 7-5 as described above. Act 10-2 comprises the wireless terminal 26 performing a measurement. The measurement may be initiated by measurement initiation unit 82 of wireless terminal 26. Act 10-3 comprises the wireless terminal 26 making a decision, based on the configuration message of act 10-2, to send a measurement report including the measurement result. Act 10-4 comprises transmitting the measurement report to source gNodeB 22.

Listing 5 is an example procedure of measurement report triggering, based on Listing 2 with revisions for supporting the embodiment and mode of FIG. 6 and FIG. 7 marked as bold text.

Listing 5

```
1>  for each measId included in the measIdList within
    VarMeasConfig:
  2>    if the corresponding reportConfig includes a
        reportType set to eventTriggered or periodical:
    3>    if the corresponding measObject concerns NR:
      4>    if the eventA1 or eventA2 is configured in the
            corresponding reportConfig:
        5>    consider only the serving cell to be
              applicable;
      4>    if the eventA3 or eventA5 is configured in the
            corresponding reportConfig:
        5>    if a serving cell is associated with a
              measObjectNR and neighbours are associated with
              another measObjectNR, consider any serving cell
              associated with the other measObjectNR to be a
              neighbouring cell as well;
      4>    for measurement events other than eventA1 or
            eventA2:
        5>    if useWhiteCellList is set to true:
          6>    consider any neighbouring cell detected based
                on parameters in the associated measObjectNR to
                be applicable when the concerned cell is
                included in the whiteCellsToAddModList defined
                within the VarMeasConfig for this measId;
        5>    else:
          6>    consider any neighbouring cell detected based
                on parameters in the associated measObjectNR to
                be applicable when the concerned cell is not
                included in the blackCellsToAddModList defined
                within the VarMeasConfig for this measId;
    3>    else if the corresponding measObject concerns E-
          UTRA:
      4>    consider any neighbouring cell detected on the
            associated frequency to be applicable when the
            concerned cell is not included in the
            blackCellsToAddModListEUTRAN defined within the
            VarMeasConfig for this measId;
  2>    else if the corresponding reportConfig includes a
        reportType set to reportCGI:
    3>    consider the cell detected on the associated
          measObject which has a physical cell identity matching
          the value of the cellForWhichToReportCGI included in
          the corresponding reportConfig within the
          VarMeasConfig to be applicable;
  2>    if the reportType is set to eventTriggered and if
        the entry condition applicable for this event, i.e. the
        event corresponding with the eventId of the
        corresponding reportConfig within VarMeasConfig, is
        fulfilled for one or more applicable cells for all
        measurements after layer 3 filtering taken during
        timeToTrigger defined for this event within the
        VarMeasConfig, while the VarMeasReportList does not
        include a measurement reporting entry for this measId (a
        first cell triggers the event):
    3>    include a measurement reporting entry within the
          VarMeasReportList for this measId;
    3>    set the numberOfReportsSent defined within the
          VarMeasReportList for this measId to 0;
    3>    include the concerned cell(s) in the
          cellsTriggeredList defined within the
          VarMeasReportList for this measId;
    3>    if cellsTriggeredList includes cells other than the
          candidate target cell(s) configured by CHOConfig;
      4>    initiate the measurement reporting procedure;
  2>    else if the reportType is set to eventTriggered and
        if the entry condition applicable for this event, i.e.
        the event corresponding with the eventId of the
        corresponding reportConfig within VarMeasConfig, is
        fulfilled for one or more applicable cells not included
        in the cellsTriggeredList for all measurements after
        layer 3 filtering taken during timeToTrigger defined for
        this event within the VarMeasConfig (a subsequent cell
        triggers the event):
    3>    set the numberOfReportsSent defined within the
          VarMeasReportList for this measId to 0;
    3>    include the concerned cell(s) in the
          cellsTriggeredList defined within the
          VarMeasReportList for this measId;
    3>    if cellsTriggeredList includes cells other than the
          candidate target cell(s) configured by CHOConfig;
      4>    initiate the measurement reporting procedure;
  2>    else if the reportType is set to eventTriggered and
        if the leaving condition applicable for this event is
        fulfilled for one or more of the cells included in the
        cellsTriggeredList defined within the VarMeasReportList
        for this measId for all measurements after layer 3
        filtering taken during timeToTrigger defined within the
        VarMeasConfig for this event:
    3>    remove the concerned cell(s) in the
          cellsTriggeredList defined within the
          VarMeasReportList for this measId;
    3>    if reportOnLeave is set to true for the
          corresponding reporting configuration:
      4>    initiate the measurement reporting procedure;
    3>    if the cellsTriggeredList defined within the
          VarMeasReportList for this measId is empty:
      4>    remove the measurement reporting entry within the
            VarMeasReportList for this measId;
      4>    stop the periodical reporting timer for this measId,
            if running;
  2>    if reportType is set to periodical and if a (first)
        measurement result is available:
    3>    include a measurement reporting entry within the
          VarMeasReportList for this measId;
    3>    set the numberOfReportsSent defined within the
          VarMeasReportList for this measId to 0;
    3>    if the reportAmount exceeds 1:
      4>    initiate the measurement reporting procedure, as
            specified in 5.5.5, immediately after the quantity
            to be reported becomes available for the NR SpCell;
    3>    else (i.e. the reportAmount is equal to 1):
      4>    initiate the measurement reporting procedure,
            immediately after the quantity to be reported
            becomes available for the NR SpCell and for the
            strongest cell among the applicable cells;
  2>    upon expiry of the periodical reporting timer for
        this measId:
    3>    initiate the measurement reporting procedure.
  2>    if reportType is set to reportCGI:
    3>    if the UE acquired the SIB1 or
          SystemInformationBlockType1 for the requested cell; or
    3>    if the UE detects that the requested NR cell is not
          transmitting SIB1 (see TS 38.213 [13], clause 13):
      4>    stop timer T321;
      4>    include a measurement reporting entry within the
            VarMeasReportList for this measId;
      4>    set the numberOfReportsSent defined within the
            VarMeasReportList for this measId to 0;
      4>    initiate the measurement reporting procedure;
  2>    upon the expiry of T321 for this measId:
    3>    include a measurement reporting entry within the
          VarMeasReportList for this measId;
    3>    set the numberOfReportsSent defined within the
          VarMeasReportList for this measId to 0;
    3>    initiate the measurement reporting procedure.
```

2: Measurement Reporting after Conditional Handover Configuration

Figure 11:
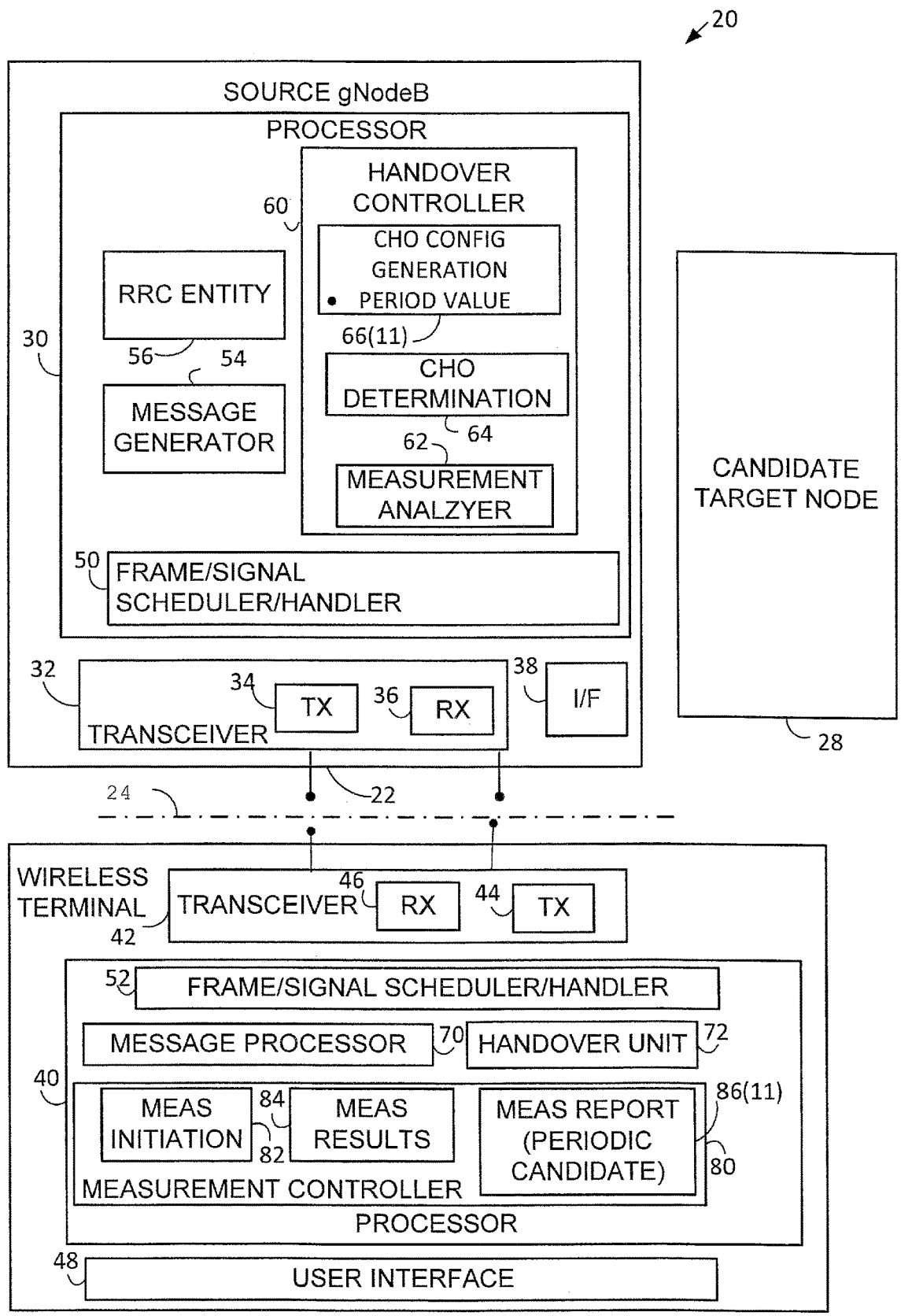
FIG. 11 is a schematic view of an example communications system comprising a source gNodeB which provides a wireless terminal with conditional handover configuration information which permits the wireless terminal to periodically report measurement results for a candidate target gNodeB(s).

In the example embodiment and mode of FIG. 11, the wireless terminal 26 may be permitted to periodically transmit a measurement report for the configured candidate target cell(s). One reason for permitting the wireless terminal 26 to transmit a measurement report on a periodic basis is that the source cell, the serving cell of source gNodeB 22, may use this measurement report to determine whether or not to release the CHO configuration. Since each of the candidate target cell(s), such as target gNodeB 28, reserves radio resources for a potential CHO, the radio access network may not desire to maintain the reserved resources forever. Therefore, the radio access network may force the wireless terminal 26 to continue reporting the measurement results of the candidate target cells.

The source gNodeB 22, wireless terminal 26, and node processor 30 of the communications system 20 of FIG. 11 are similar to those of FIG. 6, with like units and functionalities having like reference numbers. As shown in FIG. 11, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, and handover controller 60, with the handover controller 60 in turn comprising measurement analyzer 62, conditional handover (CHO) determination unit 64, and conditional handover configuration information generator 66(11). A difference between the example embodiment of FIG. 6 and the example embodiment and mode of FIG. 11 is that the conditional handover configuration information generator 66(11) includes in the conditional handover configuration information a conditional handover instruction which, rather than suppressing the reporting of measurements for candidate target gNodeBs, instead permits periodic reporting of the measurements for candidate target gNodeBs. The instruction of the conditional handover configuration information that permits the periodic reporting of the measurement results for the candidate target gNodeBs may be included in the "measurements instruction" information element, shown as the fourth information element of the conditional handover configuration message of FIG. 8, for example. Moreover, a value of the periodicity for the permitted reporting of the measurement results for the candidate target gNodeBs may be included in the "periodic value" information element, shown as the fifth information element of the conditional handover configuration message of FIG. 8, for example.

As in the FIG. 6 example embodiment and mode, the wireless terminal 26 of the example embodiment and mode of FIG. 11 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80, with the measurement controller 80 in turn comprising measurement initiation unit 82, measurement results unit 84, and measurement report control unit 86. Since, in the example embodiment and mode of FIG. 11, the wireless terminal 26 is permitted to periodically transmit the measurement results for a candidate target gNodeB, the measurement report control unit 86 of FIG. 11 is labeled for periodic candidate reporting.

Figure 12:
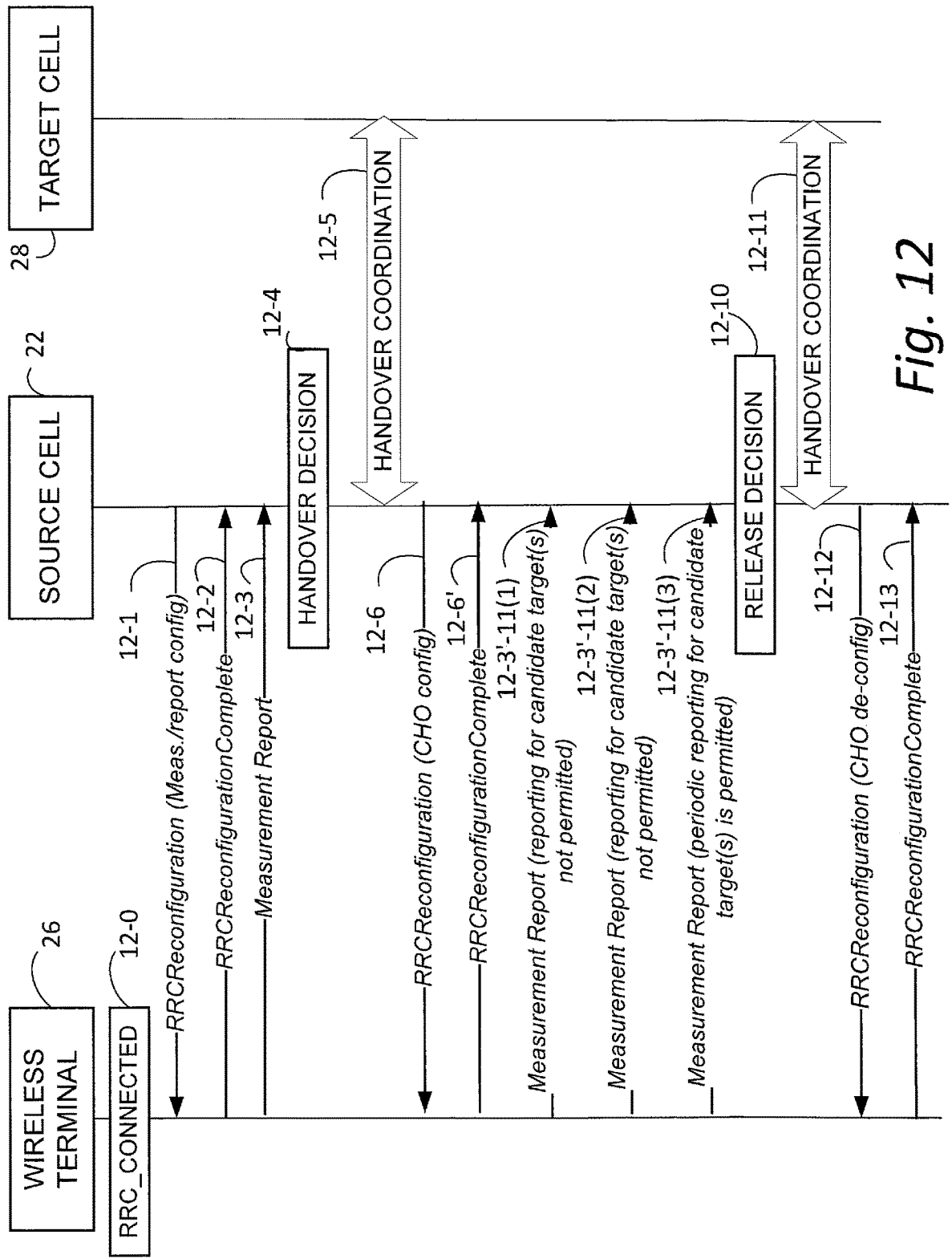
FIG. 12 is a diagrammatic view showing signaling and messages involved in measurement report in a conditional handover situation for the example cellular communications system of FIG. 11.

FIG. 12 illustrates an example scenario of the example embodiment and mode of FIG. 11, wherein after receiving the CHO configuration the wireless terminal 26 may periodically transmit the measurement report including the measurement results of some or all of the candidate target cell(s). The acts of FIG. 12 which are similar to those of FIG. 7 have similar suffixes, e.g., act 12-0 of FIG. 12 is similar to act 7-0 of FIG. 7, act 12-1 of FIG. 12 is similar to act 7-1 of FIG. 7, and so forth. A difference in the example embodiment and mode of FIG. 11 and FIG. 12 is that, after the conditional handover coordination of act 12-5, periodic reporting of measurement results for the candidate target gNodeB(s) is permitted. For example, FIG. 12 shows that the reporting of measurement results for the candidate target gNodeB(s) does not occur in the first two measurement reporting messages 12-3'-11(1) and 12-3'-11(2), but does occur in the third measurement reporting message 12-3'-11(3).

In the example situation shown in FIG. 12, it may occur as a result of the third measurement reporting message 12-3'-11(3) that as act 12-10 the network, e.g., source gNodeB 22, determines that the conditional handover configuration, which resulted from the conditional handover decision of act 12-4, should be released. Such determination may be made by conditional handover (CHO) determination unit 64, for example. After the conditional handover release decision of act 12-10, as act 12-11 the source gNodeB 22 may engage in a handover release operation with target gNodeB 28, as reflected by act 12-11. In other words, as act 12-10 the source cell 22 may decide to release the CHO configuration, and in accordance with such decision may as act 12-11 negotiate with the candidate target cell(s), such as target gNodeB 28, to release the reserved resources. Thereafter as act 12-12 the source gNodeB 22 may send a conditional handover de-configuration message to the wireless terminal 26. Upon successful receipt of the conditional handover de-configuration message, as act 12-13 the wireless terminal 26 replies to source gNodeB 22 with a RRCReconfigurationComplete message.

Figure 13:
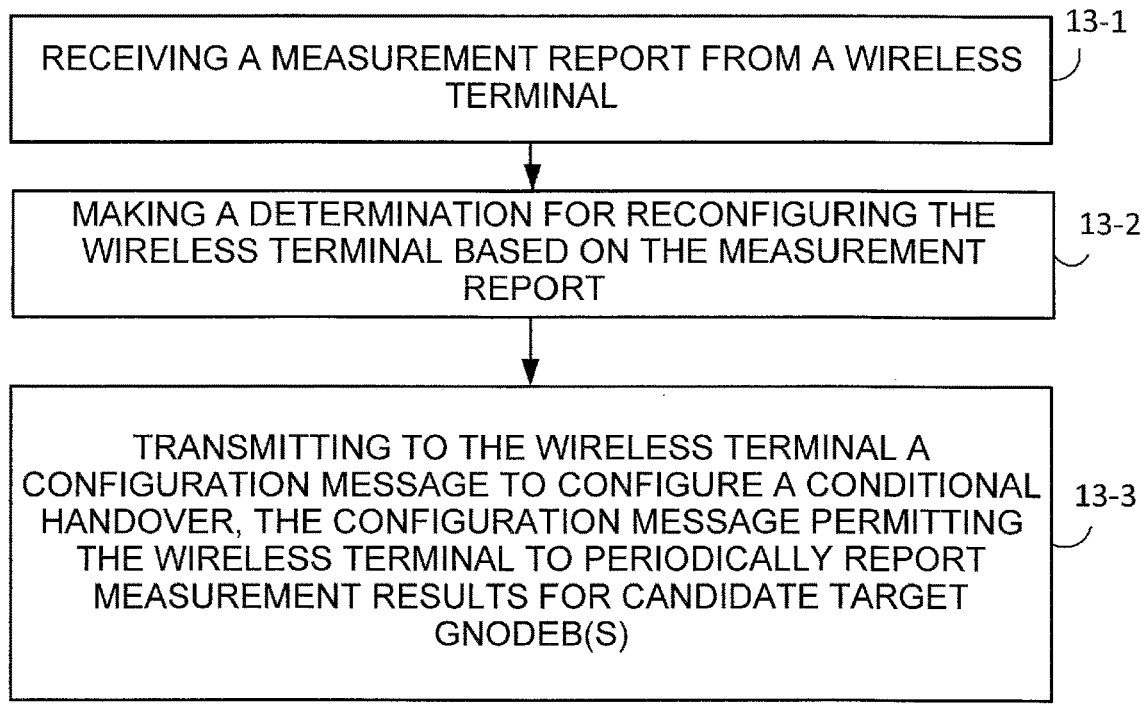
FIG. 13 is a flowchart showing example, basic, representative steps or acts performed by a source node of the system of FIG. 11.

The source gNodeB 22 of FIG. 11 thus permits the wireless terminal 26 to periodically report measurement results for the candidate target gNodeB(s). Example, representative, basic acts performed by source gNodeB 22 of FIG. 11 are shown in FIG. 13. Act 13-1 comprises receiving a measurement report from a wireless terminal. Act 13-2 comprises making a determination for reconfiguring the wireless terminal based on the measurement report. The determination of act 13-2 may be made by conditional handover (CHO) determination unit 64 of source gNodeB 22, and may further be reflected by act 12-4 of FIG. 12. Act 13-3 comprises transmitting to the wireless terminal a configuration message to configure a conditional handover, the configuration message being configured to permit periodic reporting of measurement results for a candidate target gNodeB(s).

Figure 14:
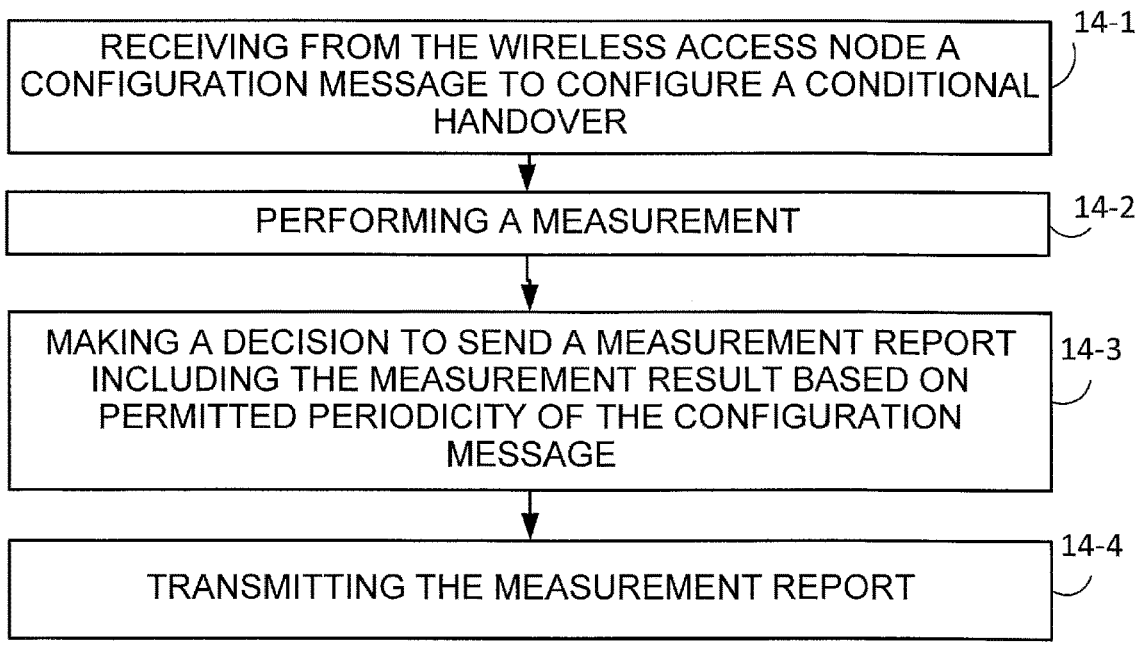
FIG. 14 is a flowchart showing example, basic, representative steps or acts performed by a wireless terminal of the system of FIG. 11.

Example, representative, basic acts performed by wireless terminal 26 of FIG. 11 are shown in FIG. 14. Act 14-1 comprises receiving from the wireless access node a configuration message to configure a conditional handover. The conditional handover configuration message of act 14-1 may be the message of act 12-6 as described above. Act 14-2 comprises the wireless terminal 26 performing a measurement. The measurement may be initiated by measurement initiation unit 82 of wireless terminal 26. Act 14-3 comprises the wireless terminal 26 making a decision, based on the configuration message of act 14-2 and permitted periodicity, to send a measurement report including the measurement result. Act 14-4 comprises transmitting the measurement report to source gNodeB 22.

In one example implementation, the CHO configuration may indicate if the wireless terminal 26 is required to transmit the measurement report for some or all of the candidate target cell(s), and the periodicity of the reporting. Listing 6 shows an example format of the CHO configuration based on Listing 4, where an optional field reportPeriodicity, configured separately from the reporting configuration, indicates the periodicity of the reporting of the concerned target cell(s). The presence of this optional field may indicate that the UE is forced to periodically transmit the measurement report, whereas the absence of this field may indicate that the UE should suppress the measurement report as disclosed in the first example embodiment and mode. The reportPeriodicity field may correspond to the period value information element shown in FIG. 8.

Listing 6

```
CHOConfig ::=                           SEQUENCE {
  CHOConfigToRemoveList                 CHOConfigToRemoveList
OPTIONAL,              -- Need N
  CHOConfigToAddModList                 CHOConfigToAddModList
OPTIONAL,              -- Need N
}
OPTIONAL,              -- Need M
CHOConfigToRemoveList ::= SEQUENCE (SIZE
(1..maxNrofCHOConfigId)) OF CHOConfigId
ReportConfigToAddModList ::=            SEQUENCE (SIZE
(1..maxCHOConfigId)) OF CHOConfigToAddMod
CHOConfigToAddMod ::=     SEQUENCE {
  choConfigId                 CHOConfigId,
  reportConfig                CHOICE {
    choConfigNR               CHOConfigNR,
    ...,
    choConfigInterRAT         choConfigInterRAT
  }
}
CHOConfigNR ::=            SEQUENCE {
  CHOConditionList                      SEQUENCE (SIZE
(1..maxCHOConditionList)) OF CHOCondition
}
CHOCondition                            SEQUENCE {
  candidateCellIDList                   SEQUENCE (SIZE
(1..maxCandidateCellIDList)) OF PhysCellId eventTriggered
EventTriggerConfigCHO,
  ...,
  reportCGI                             ReportCGI
}
  spCellConfigCommon          ServingCellConfigCommon
OPTIONAL,              -- Need M
  newUE-Identity                        RNTI-Value,
  reportPeriodicity                     ENUMERATED {ms50, ms100, ms150,
ms200, ms500, ms1000, ms2000, ms10000}
OPTIONAL,
  validity                              ENUMERATED (ms50, ms100, ms150,
ms200, ms500, ms1000, ms2000, ms10000},
  rach-ConfigDedicated        CHOICE {
    uplink                    RACH-ConfigDedicated,
    supplementaryUplink       RACH-ConfigDedicated
  }
OPTIONAL,              -- Need N
}
EventTriggerConfigCHO::=                SEQUENCE {
  eventId                               CHOICE {
    eventA1                             SEQUENCE {
           a1-Threshold     MeasTriggerQuantity,
    },
    eventA2                             SEQUENCE {
           a2-Threshold     MeasTriggerQuantity,
    },
    eventA3                             SEQUENCE {
           a3-Offset
MeasTriggerQuantityOffset,
    },
    eventA4                             SEQUENCE {
           a4-Threshold
MeasTriggerQuantity,
    },
    eventA5                             SEQUENCE {
           a5-Threshold1
MeasTriggerQuantity,
           a5-Threshold2
MeasTriggerQuantity,
    },
    eventA6                             SEQUENCE {
           a6-Offset
MeasTriggerQuantityOffset,
    },
    ...
  },
  ...
```

Listing 7 is an example procedure of measurement report triggering, based on Listing 2 with revisions for supporting the present embodiment marked as bold text.

Listing 7

```
1>   for each measId included in the measIdList within
     VarMeasConfig:
2>      if the corresponding reportConfig includes a
        reportType set to eventTriggered or periodical:
3>         if the corresponding measObject concerns NR:
4>            if the eventA1 or eventA2 is configured in the
              corresponding reportConfig:
5>               consider only the serving cell to be applicable;
4>            if the eventA3 or eventA5 is configured in the
              corresponding reportConfig:
5>               if a serving cell is associated with a
                 measObjectNR and neighbours are associated with
                 another measObjectNR, consider any serving cell
                 associated with the other measObjectNR to be a
                 neighbouring cell as well;
4>            for measurement events other than eventA1 or eventA2:
5>               if useWhiteCellList is set to true:
6>                  consider any neighbouring cell detected based on
                    parameters in the associated measObjectNR to be
                    applicable when the concerned cell is included in
                    the whiteCellsToAddModList defined within the
                    VarMeasConfig for this measId;
5>               else:
6>                  consider any neighbouring cell detected based on
                    parameters in the associated measObjectNR to be
                    applicable when the concerned cell is not
                    included in the blackCellsToAddModList defined
                    within the VarMeasConfig for this measId;
3>         else if the corresponding measObject concerns E-UTRA:
4>            consider any neighbouring cell detected on the
              associated frequency to be applicable when the
              concerned cell is not included in the
              blackCellsToAddModListEUTRAN defined within the
              VarMeasConfig for this measId;
2>      else if the corresponding reportConfig includes a
        reportType set to reportCGI;
3>         consider the cell detected on the associated
           measObject which has a physical cell identity matching
           the value of the cellForWhichToReportCGI included in
           the corresponding reportConfig within the VarMeasConfig
           to be applicable;
2>      if the reportType is set to eventTriggered and if the
        entry condition applicable for this event, i.e. the event
        corresponding with the eventId of the corresponding
        reportConfig within VarMeasConfig, is fulfilled for one
        or more applicable cells for all measurements after layer
        3 filtering taken during timeToTrigger defined for this
        event within the VarMeasConfig, while the
        VarMeasReportList does not include a measurement
        reporting entry for this measId (a first cell triggers
        the event):
3>         include a measurement reporting entry within the
           VarMeasReportList for this measId;
3>         set the numberOfReportsSent defined within the
           VarMeasReportList for this measId to 0;
3>         include the concerned cell(s) in the
           cellsTriggeredList defined within the VarMeasReportList
           for this measId;
3>         initiate the measurement reporting procedure;
2>      else if the reportType is set to eventTriggered and
        if the entry condition applicable for this event, i.e.
        the event corresponding with the eventId of the
        corresponding reportConfig within VarMeasConfig, is
        fulfilled for one or more applicable cells not included
        in the cellsTriggeredList for all measurements after
        layer 3 filtering taken during timeToTrigger defined for
        this event within the VarMeasConfig (a subsequent cell
        triggers the event):
3>         set the numberOfReportsSent defined within the
           VarMeasReportList for this measId to 0;
3>         include the concerned cell(s) in the
           cellsTriggeredList defined within the VarMeasReportList
           for this measId;
4>         initiate the measurement reporting procedure;
2>      else if the reportType is set to eventTriggered and
        if the leaving condition applicable for this event is
        fulfilled for one or more of the cells included in the
        cellsTriggeredList defined within the VarMeasReportList
        for this measId for all measurements after layer 3
        filtering taken during timeToTrigger defined within the
        VarMeasConfig for this event:
3>         remove the concerned cell(s) in the
           cellsTriggeredList defined within the VarMeasReportList
           for this measId;
3>         if reportOnLeave is set to true for the corresponding
           reporting configuration:
4>            initiate the measurement reporting procedure;
3>         if the cellsTriggeredList defined within the
           VarMeasReportList for this measId is empty:
4>            remove the measurement reporting entry within the
              VarMeasReportList for this measId;
4>            stop the periodical reporting timer for this measId,
              if running;
2>      if reportType is set to periodical and if a (first)
        measurement result is available, or:
2>      if a measurement result is available for one of the
        candidate target cell(s) configured by CHOConfig, and
        reportPeriodicity is included in CHOConfig:
3>         include a measurement reporting entry within the
           VarMeasReportList for this measId;
3>         set the numberOfReportsSent defined within the
           VarMeasReportList for this measId to 0;
3>         if the reportAmount exceeds 1:
4>            initiate the measurement reporting procedure, as
              specified in 5.5.5, immediately after the quantity to
              be reported becomes available for the NR SpCell;
3>         else (i.e. the reportAmount is equal to 1):
4>            initiate the measurement reporting procedure,
              immediately after the quantity to be reported becomes
              available for the NR SpCell and for the strongest
              cell among the applicable cells;
2>      upon expiry of the periodical reporting timer for
        this measId, or:
2>      upon expiry of reportPeriodicity included in
        CHOConfig:
3>         initiate the measurement reporting procedure.
2>      if reportType is set to reportCGI:
3>         if the UE acquired the SIB1 or
           SystemInformationBlockType1 for the requested cell; or
3>         if the UE detects that the requested NR cell is not
           transmitting SIB1 (see TS 38.213 [13], clause 13):
4>            stop timer T321;
4>            include a measurement reporting entry within the
              VarMeasReportList for this measId;
4>            set the numberOfReportsSent defined within the
              VarMeasReportList for this measId to 0;
4>            initiate the measurement reporting procedure;
2>      upon the expiry of T321 for this measId:
3>         include a measurement reporting entry within the
           VarMeasReportList for this measId;
3>         set the numberOfReportsSent defined within the
           VarMeasReportList for this measId to 0;
3>         initiate the measurement reporting procedure.
```

In another example implementation, the indication in the CHO configuration indicating if the wireless terminal 26 is required to transmit the measurement report for some or all of the candidate target cell(s) may be a Boolean type field (or a present/absence type field), associated with no designated periodicity. In this case, after receiving the CHO configuration, the wireless terminal may send a measurement report (even for candidate target cell(s)) in accordance with the reporting configuration in the pre-conditional measurement configuration if the Boolean type field is set to true (or false) (or the presence/absence type field is present (or absent)), otherwise, the wireless terminal may suppress measurement reports with regard to the candidate target cell(s) in accordance with the previous embodiment.

3: Leaving Condition for Conditional Handover Configuration

Figure 15:
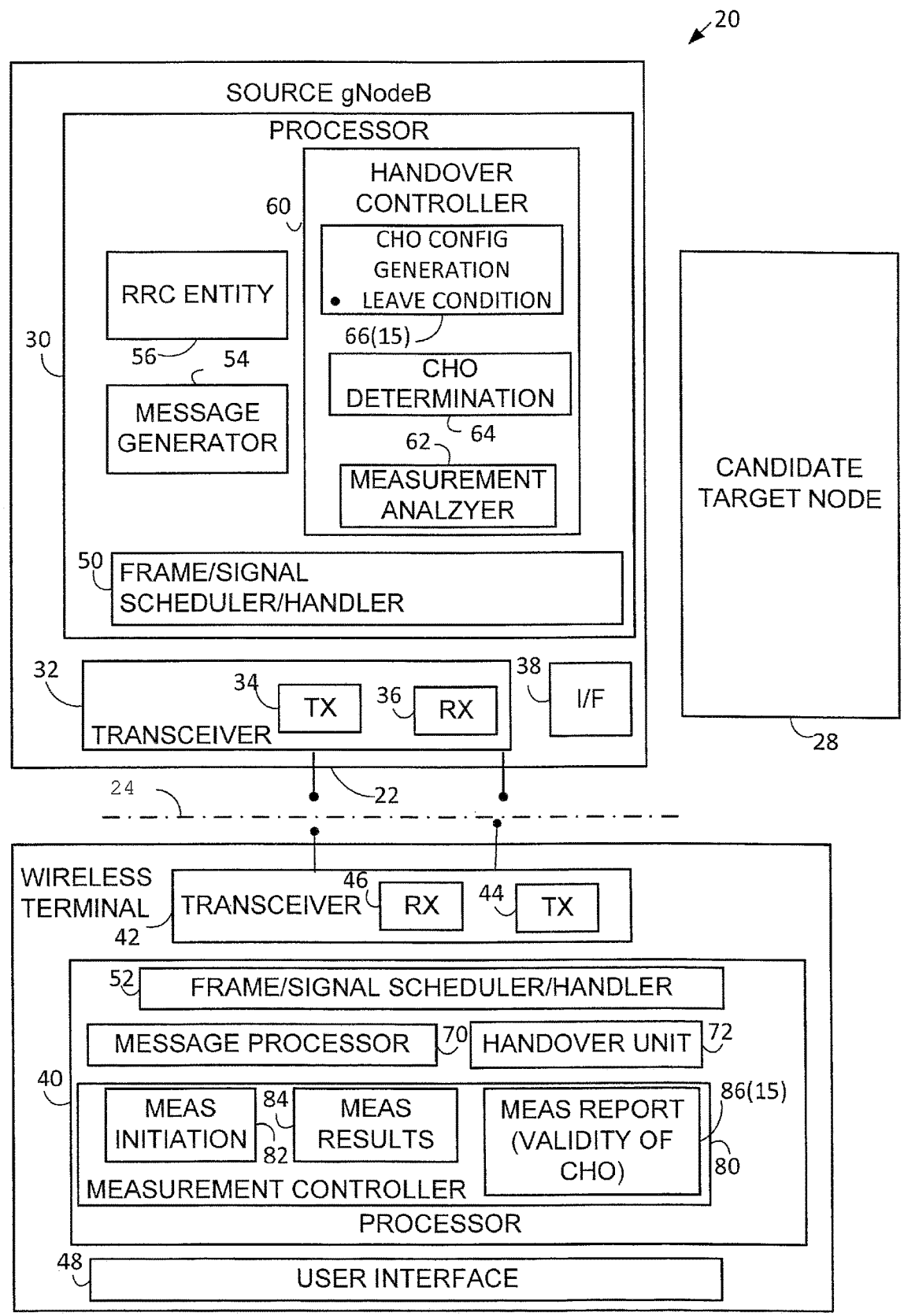
FIG. 15 is a schematic view of an example communications system comprising a source gNodeB which provides a wireless terminal with conditional handover configuration information which notifies the wireless terminal of conditions for leaving the conditional handover.

In the example embodiment and mode of FIG. 15, the source gNodeB 22 may provide the wireless terminal 26 with validity information, or conversely invalidity information, that informs the wireless terminal 26 of the validity or currency of the conditional handover configuration information that the wireless terminal 26 receives from the source gNodeB 22 One reason for providing the wireless terminal 26 with such (in)validity information is to preclude continued pendency of aged conditional handover configuration information, and/or to force the wireless terminal 26 to report measurement results for a candidate target gNodeB upon occurrence of one or more leave condition(s).

The source gNodeB 22, wireless terminal 26, and node processor 30 of the communications system 20 of FIG. 15 are similar to those of FIG. 6 and FIG. 11, with like units and functionalities having like reference numbers. As shown in FIG. 15, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, and handover controller 60, with the handover controller 60 in turn comprising measurement analyzer 62, conditional handover (CHO) determination unit 64, and conditional handover configuration information generator 66(15). A difference between the previous example embodiments and the example embodiment and mode of FIG. 15 is that the conditional handover configuration information generator 66(15) includes, in the conditional handover configuration information, (in)validity information, also known as "leave condition(s)", which may be used by wireless terminal 26 to assess how long the conditional handover condition is to be in effect or when the conditional handover condition is to be exited. By way of non-limiting example, the leaving conditions may be provided in the last illustrated information element, "leaving conditions", of the conditional handover configuration message of FIG. 8.

As in the preceding example embodiments and modes, the wireless terminal 26 of the example embodiment and mode of FIG. 15 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80, with the measurement controller 80 in turn comprising measurement initiation unit 82, measurement results unit 84, and measurement report control unit 86. In the example embodiment and mode of FIG. 15, the wireless terminal 26 is provided with information which specifies the (in)validity of or leaving conditions for the conditional handover. Accordingly, the measurement report control unit 86(15) of FIG. 15 functions to determine, using the (in)validity information and/or leaving conditions, whether the measurement results for the candidate target gNodeB(s) are to be reported.

The example embodiment of FIG. 15 discloses validity of CHO configurations that wireless terminal 26 has previously received and associated reporting. In one example implementation, the validity of a CHO configuration may be valid until the wireless terminal 26 actually executes a handover. In another example implementation, the validity may terminate upon the source cell explicitly de-configuring the CHO configuration by sending a message to the UE (as in the example embodiment and mode of FIG. 11). In yet another example implementation, the validity may be managed by at least one timer. In this timer implementation, the wireless terminal 26 may release the CHO configuration at the expiry of the timer, while the radio network (the source/candidate target cells) may release the reserved radio resources at the expiry.

In the FIG. 15 example embodiment, de-configuring CHO configurations may be based on one or more leaving conditions. The leaving conditions may specify events upon which the UE leaves from the CHO configuration.

Figure 16:
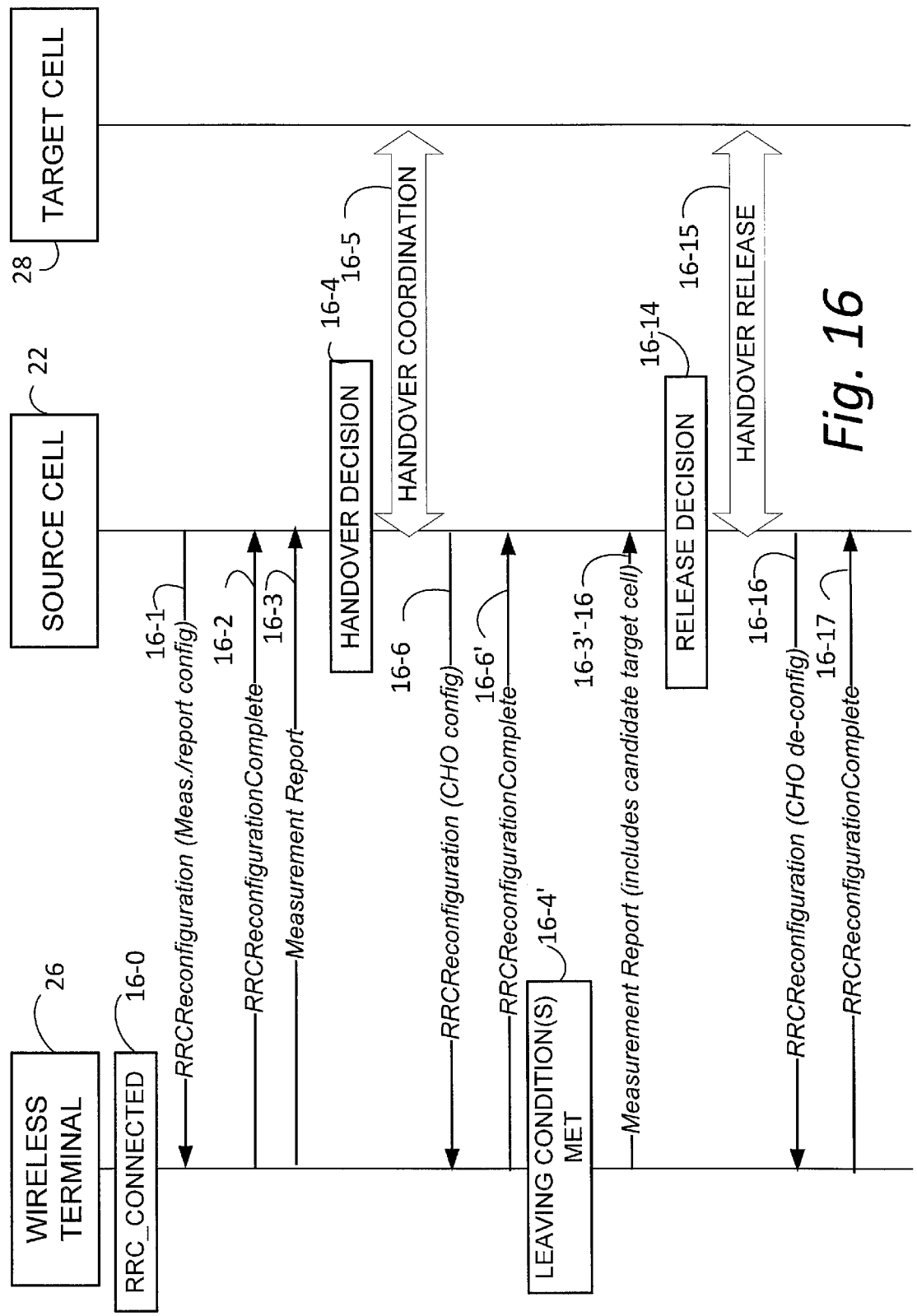
FIG. 16 is a diagrammatic view showing signaling and messages involved in measurement report in a conditional handover situation for the example cellular communications system of FIG. 15.

FIG. 16 illustrates an example scenario which may be performed by the system 20 of FIG. 15. In one example implementation shown in FIG. 16, the UE wireless terminal 26 may use EventTriggeringConfig configured with MeasConfig. Accordingly, the UE may continue the measuring procedure based on the information element measIds in MeasConfig. For each measId, if the UE detects that one of the candidate target cell meets the leaving condition/event (e.g. measurement result<threshold−hysteresis) specified in the corresponding reportConfig, the wireless terminal 26 may send a measurement report including the measurement result of the candidate target cell, based on a flag reportOnLeave associated with the condition/event. The source cell may release the handover coordination with the candidate target cell and may further send a message for CHO de-configuration. This scenario is illustrated in FIG. 16.

The acts of FIG. 16 which are similar to those of FIG. 7 and FIG. 12, have similar suffixes, e.g., act 16-0 of FIG. 16 is similar to act 7-0 of FIG. 7, act 16-1 of FIG. 16 is similar to act 7-1 of FIG. 7, and so forth. A difference in the example embodiment and mode of FIG. 16 relative to previous example embodiments and modes is that, after the conditional handover coordination of act 16-5, the wireless terminal 26 continues to check if the invalidity or leave conditions specified in the conditional handover configuration information of message 16-5 is satisfied. If the invalidity or leave conditions specified in the conditional handover configuration information of message 16-5 are not satisfied, then the measurement report control unit 86 of wireless terminal 26 continues to suppress the measurement reporting of the measurement results of the candidate target eNode(s), in a manner similar to that of the example embodiment of FIG. 6 and FIG. 7. In other words, measurement reports such as those of act 7-3' of FIG. 6, which suppress the reporting of measurement results for the candidate target eNode(s), may be transmitted. However, in the example scenario of FIG. 16, as act 16-4' the wireless terminal 26 detects that the invalidity or leaving conditions specified in the conditional handover configuration information are met. Upon making the determination of act 16-4 that the invalidity or leaving conditions specified in the conditional handover configuration information are met by current conditions and/or events, thereafter the wireless terminal 26 sends measurement reports which include the candidate target cell, as reflected by act 16-3'-16. Based on the receipt of the un-suppressed measurement report of act 16-3'-16 or other information, as act 16-14 the source gNodeB 22 makes a decision to release the conditional handover. Accordingly, a conditional handover release procedure is performed between source gNodeB 22 and the target gNodeB 28, as shown by act 16-15. Thereafter as act 16-16 the source gNodeB 22 may send a conditional handover de-configuration message to the wireless terminal 26. Upon successful receipt of the conditional handover de-configuration message, as act 16-17 the wireless terminal 26 replies to source gNodeB 22 with a RRCReconfigurationComplete message.

Figure 17:
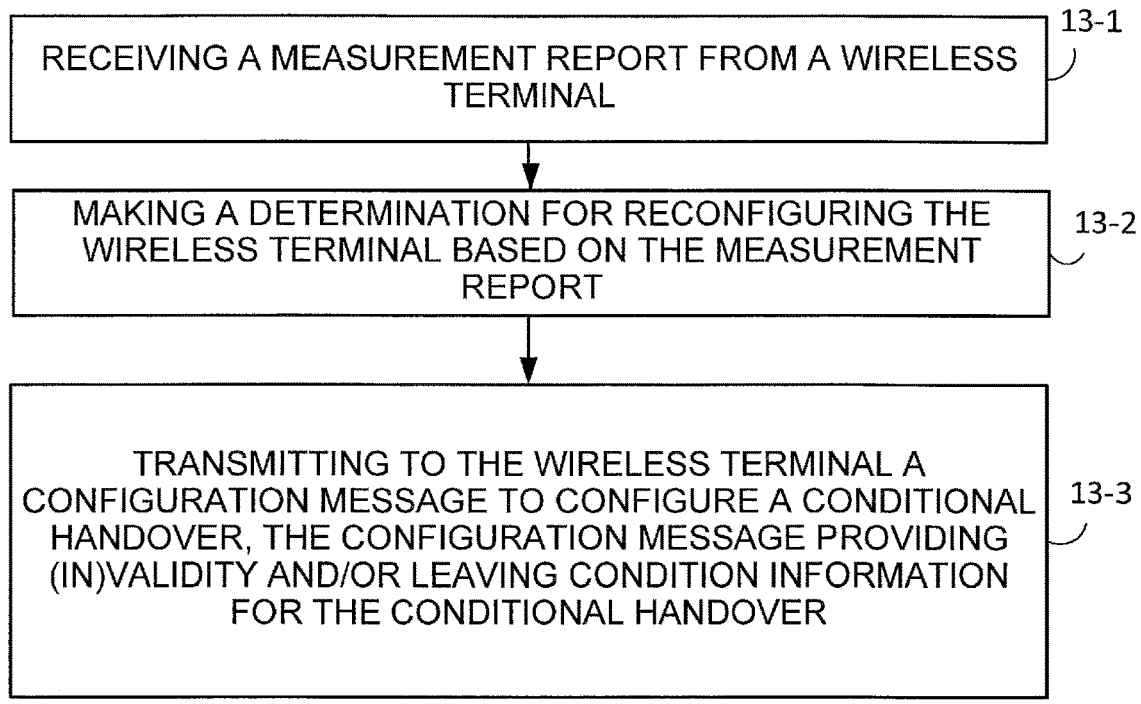
FIG. 17 is a flowchart showing example, basic, representative steps or acts performed by a source node of the system of FIG. 15.

The source gNodeB 22 of FIG. 15 thus provides the wireless terminal 26 with certain (in)validity information or leaving condition information to apprise the wireless terminal 26 how long reports of measurement results for the candidate target gNodeB(s) should be suppressed, if the report suppression is configured as described in the previous embodiment. Example, representative, basic acts performed by source gNodeB 22 of FIG. 15 are shown in FIG. 17. Act 17-1 comprises receiving a measurement report from a wireless terminal. Act 17-2 comprises making a determination for reconfiguring the wireless terminal based on the measurement report. The determination of act 17-2 may be made by conditional handover (CHO) determination unit 64 of source gNodeB 22, and may further be reflected by act 16-4 of FIG. 16. Act 17-3 comprises transmitting to the wireless terminal a configuration message to configure a conditional handover, the configuration message being configured to provide (in)validity or leaving condition information for a conditional handover.

Figure 18:
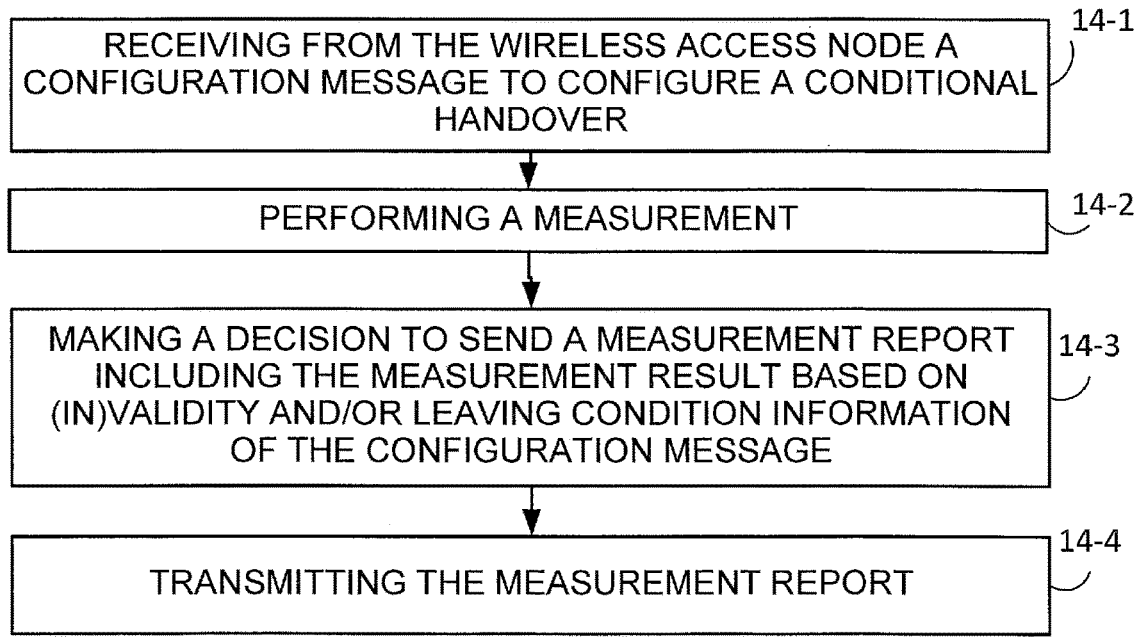
FIG. 18 is a flowchart showing example, basic, representative steps or acts performed by a wireless terminal of the system of FIG. 15.

Example, representative, basic acts performed by wireless terminal 26 of FIG. 15 are shown in FIG. 18. Act 18-1 comprises receiving from the wireless access node a configuration message to configure a conditional handover. The conditional handover configuration message of act 18-1 may be the message of act 16-6 as described above. Act 18-2 comprises the wireless terminal 26 performing a measurement. The measurement may be initiated by measurement initiation unit 82 of wireless terminal 26. Act 18-3 comprises the wireless terminal 26 making a decision, based on the configuration message of act 14-2 and the (in)validity and/or leaving condition information, whether to send a measurement report including the measurement result for a candidate target gNodeB(s). Act 18-4 comprises transmitting the measurement report to source gNodeB 22.

In another example implementation, the CHO configuration may include one or more leaving condition(s), separately from the condition(s) configured in MeasConfig. For example, the CHO configuration may include leaving offset(s) for each condition/event as shown in Listing 8. The wireless terminal 26 may consider that the leaving condition is met when the measurement result of the concerned candidate target cell goes below ax_Threshold−ax_LeavingOffset, where ax is one of A1, A2, A3, A4, A5 and A6 or any other events (not specified). Similar to the previous implementation, each condition may be associated with reportOnLeave, instructing the UE whether to transmit a measurement report when the leaving condition is met.

|  | Listing 8 |
|---|---|
| CHOConfig ::= | SEQUENCE { |
|     CHOConfigToRemoveList | CHOConfigToRemoveList |
| OPTIONAL,     -- Need N | |
|     CHOConfigToAddModList | CHOConfigToAddModList |
| OPTIONAL,     -- Need N | |
|     } | |
| OPTIONAL,     -- Need M | |
| CHOConfigToRemoveList ::= | SEQUENCE (SIZE |
| (1..maxNrofCHOConfigId)) OF CHOConfigId | |
| ReportConfigToAddModList ::= | SEQUENCE (SIZE |
| (1..maxCHOConfigId)) OF CHOConfigToAddMod | |
| CHOConfigToAddMod ::= | SEQUENCE { |
|     choConfigId | CHOConfigId, |
|     reportConfig | CHOICE { |
|       choConfigNR | CHOConfigNR, |
|       ...., | |
|       choConfigInterRAT | choConfigInterRAT |
|     } | |
| } | |
| CHOConfigNR ::= | SEQUENCE { |
|     CHOConditionList | SEQUENCE (SIZE |
| (1..maxCHOConditionList)) OF CHOCondition | |
| } | |
| CHOCondition | SEQUENCE { |
|     candidateCellIDList | SEQUENCE (SIZE |
| (1..maxCandidateCellIDList)) OF PhysCellId eventTriggered | |
| EventTriggerConfigCHO, | |
|     ...., | |
|     reportCGI | ReportCGI |
| } | |
|     spCellConfigCommon | ServingCellConfigCommon |
| OPTIONAL,     -- Need M | |
|     newUE-Identity | RNTI-Value, |
|     reportPeriodicity | ENUMERATED {ms50, ms100, ms150, |
| ms200, ms500, ms1000, ms2000, ms10000} OPTIONAL, | |
|     validity | ENUMERATED {ms50, |
| ms100, ms150, ms200, ms500, ms1000, ms2000, ms10000}, | |
|     rach-ConfigDedicated | CHOICE { |
|     uplink | RACH-ConfigDedicated, |
|       supplementaryUplink | RACH-ConfigDedicated |
|     } | |
| OPTIONAL,     -- Need N | |
| } | |
| EventTriggerConfigCHO::= | SEQUENCE { |
|     eventId | CHOICE { |
|       eventA1 | SEQUENCE { |
|         a1-Threshold | MeasTriggerQuantity, |
|         a1-LeavingOffset | MeasTriggerQuantityOffset |

Listing 8

```
OPTIONAL,
    reportOnLeave            BOOLEAN           OPTIONAL,
},
    eventA2                  SEQUENCE {
           a2-Threshold          MeasTriggerQuantity,
           a2-LeavingOffset      MeasTriggerQuantityOffset
OPTIONAL,
    reportOnLeave            BOOLEAN
OPTIONAL,
},
    eventA3                  SEQUENCE {
           a3-Offset             MeasTriggerQuantityOffset,
           a3-LeavingOffset      MeasTriggerQuantityOffset
OPTIONAL,
    reportOnLeave                                 BOOLEAN
OPTIONAL,
},
    eventA4                  SEQUENCE {
           a4-Threshold          MeasTriggerQuantity,
           a4-LeavingOffset      MeasTriggerQuantityOffset
OPTIONAL,
           reportOnLeave         BOOLEAN           OPTIONAL,
},
    eventA5          SEQUENCE {
       a5-Threshold1             MeasTriggerQuantity,
       a5-Threshold2             MeasTriggerQuantity,
       a5-LeavingOffset1         MeasTriggerQuantityOffset
OPTIONAL,
       a5-LeavingOffset2         MeasTriggerQuantityOffset
OPTIONAL,
    reportOnLeave      BOOLEAN              OPTIONAL,
},
    eventA6              SEQUENCE {
           a6-Offset             MeasTriggerQuantityOffset,
           a6-LeavingOffset      MeasTriggerQuantityOffset
OPTIONAL,
    reportOnLeave              BOOLEAN         OPTIONAL,
},
    ...
},
...
```

4: Security Configurations for Conditional Handover Configurations

Typical wireless systems may be required to protect user/signalling data from security attacks by applying encryptions and integrity protections. For this purpose, security contexts may be established among terminals and network entities. In general, a security context is a secure relationship between two or more entities using one or more keys. In the LTE/5G systems, the UE establishes an Access Stratum (AS) security context with eNB(s) and/or gNB(s). The AS security context may be setup in conjunction with a Non-Access Stratum (NAS) security context (established with Mobility Management Entity (MME) for LTE, or Access and Mobility management Function (AMF) for 5G). The security contexts may comprise one or more security keys derived from some shared secrets stored in the UE and a network entity. The AS security context may be firstly established immediately after an RRC connection establishment (i.e. Initial AS security context), while the NAS security context may be firstly established during a registration process.

Figure 19:
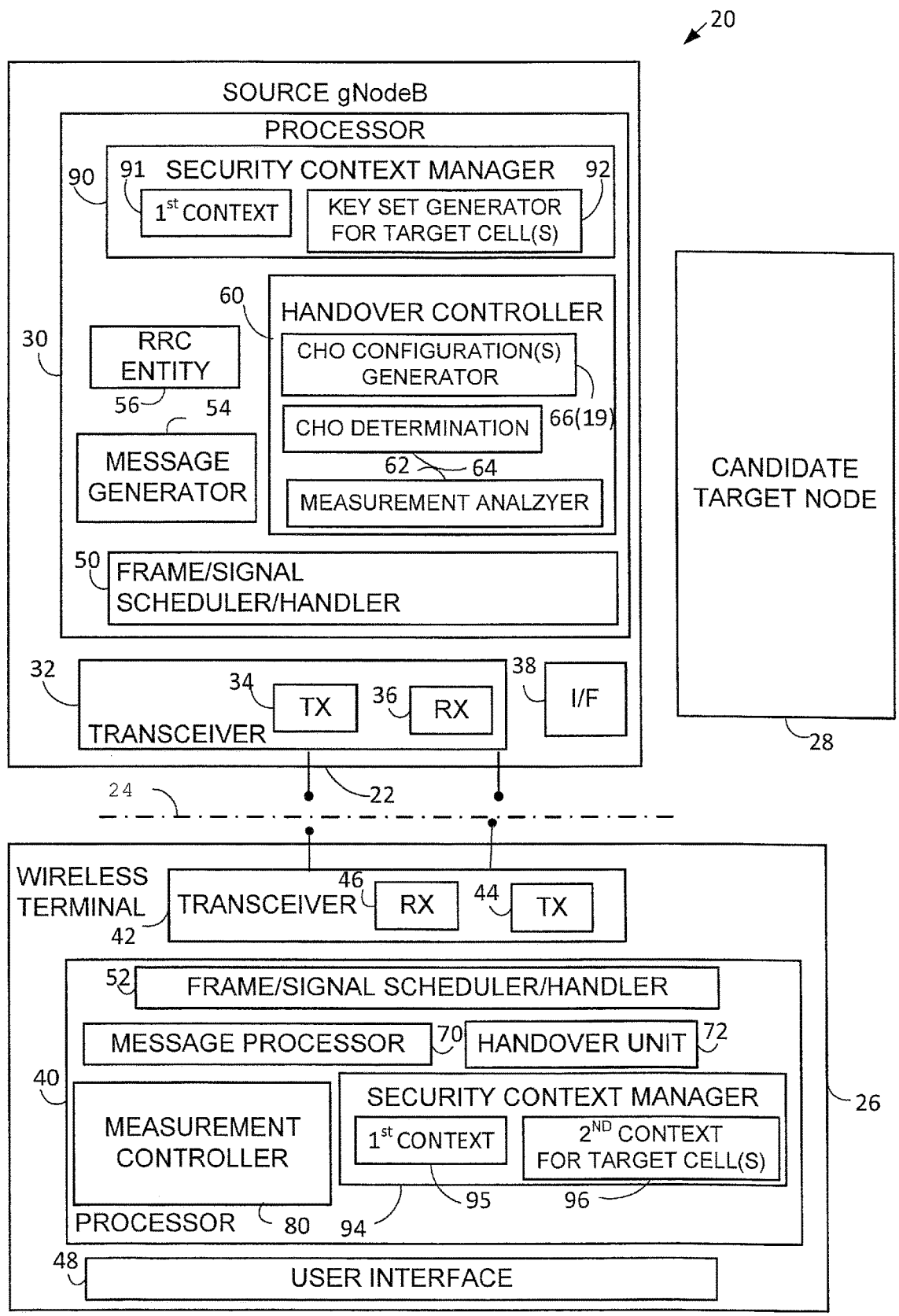
FIG. 19 is a schematic view of an example communications system comprising a source gNodeB which provides a wireless terminal with conditional handover configuration information including security configuration(s).

FIG. 19 shows an example communications system 20 wherein security contexts may be employed in conjunction with handovers. FIG. 19 shows system 20 as comprising source gNodeB 22, wireless terminal 26, and candidate target node 28. The source gNodeB 22, wireless terminal 26, and node processor 30 of the communications system 20 of FIG. 19 are similar to those of FIG. 6, FIG. 11, and FIG. 15, with like units and functionalities having like reference numbers. As shown in FIG. 19, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, and handover controller 60, with the handover controller 60 in turn comprising measurement analyzer 62, conditional handover (CHO) determination unit 64, and conditional handover configuration information generator 66(19). A difference between the previous example embodiments and the example embodiment and mode of FIG. 19 is that node processor 30 further comprises source node security context manager 90. The security context manager 90 in turn comprises first security context generator 91 and key set generator 92 for target cell(s).

As in the preceding example embodiments and modes, the wireless terminal 26 of the example embodiment and mode of FIG. 19 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80. Although not specifically shown in FIG. 19, it should be understood that, in like manner with FIG. 15, measurement controller 80 may in turn comprises a measurement initiation unit, a measurement results unit, and a measurement report control unit. In addition, the terminal processor 40 of FIG. 19 is shown as comprising terminal security context manager 94. The terminal security context manager 94 comprises terminal first context generator 95 and terminal second context generator 96 for target cell(s).

The example embodiment and mode of FIG. 19 takes into consideration various aspects of context generation and handling in conjunction with handovers. For example, the example embodiment and mode of FIG. 19 takes into consideration that, in some conditions, such as upon a handover, the security context may be altered/updated. A handover, either conditional or non-conditional, may be categorized into one of the following types:

Inter-gNB handover: the target cell is controlled by a gNB different from the gNB that controls the currently serving cell.

Intra-gNB handover: the target cell is controlled by the same gNB that controls the currently serving cell.

Intra-cell handover: some configuration parameter changes while the UE stays in the currently serving cell. This may be considered as a handover without mobility.

A non-conditional handover herein refers to a conventional (regular) handover, wherein the UE immediately attempts to access to a target cell once directed to do so. On the other hand, a conditional handover is a handover configured prospectively, e.g., for which the wireless terminal is configured for a potential handover in advance of an actual handover trigger or event, as explained in the previous embodiments.

While the UE stays in RRC_CONNECTED (or possibly in RRC_INACTIVE), the AS security context may have to be updated due to the UE's mobility or some other reasons. The AS security context update may be triggered by the Radio Access Network (RAN). When triggered, the UE and the currently serving gNB (source gNB) may generate a fresh set of security keys. If the UE performs a handover to a target cell, the fresh set of security keys may be shared by the target gNB controlling the target cell. Herein a set of parameters or information used for generating the security keys used for a non-conditional handover may be referred as a first security configuration. In some example configurations, the first security configuration may be provided to the UE by a handover command upon directing a handover or anytime the security keys need to be updated.

In a non-conditional handover, the currently serving gNB may send a handover command to the UE. In one configuration, RRCReconfiguration may be used to trigger the non-conditional handover. Listing 9 shows an example format of RRCReconfiguration used for the non-conditional handover.

| Listing 9 |
|---|

```
RRCReconfiguration ::=                    SEQUENCE {
    rrc-TransactionIdentifier                 RRC-TransactionIdentifier,
    criticalExtensions                        CHOICE {
        rrcReconfiguration                        RRCReconfiguration-IEs,
        criticalExtensionsFuture                  SEQUENCE { }
    }
}
RRCReconfiguration-IEs ::=                SEQUENCE {
    radioBearerConfig                         RadioBearerConfig
        OPTIONAL, -- Need M
    secondaryCellGroup                                OCTET STRING (CONTAINING CellGroupConfig)
        OPTIONAL, -- Need M
    measConfig                                MeasConfig
        OPTIONAL, -- Need M
    lateNonCriticalExtension                          OCTET STRING
        OPTIONAL,
    nonCriticalExtension                              RRCReconfiguration-v1530-IEs
        OPTIONAL
}
RRCReconfiguration-v1530-IEs ::=                  SEQUENCE {
    masterCellGroup                                   OCTET STRING (CONTAINING CellGroupConfig)
        OPTIONAL, -- Need M
    fullConfig                                ENUMERATED {true}
        OPTIONAL, -- Cond FullConfig
    dedicatedNAS-MessageList          SEQUENCE (SIZE(1..maxDRB)) OF DedicatedNAS-Message
        OPTIONAL, -- Cond nonHO
    masterKeyUpdate                           MasterKeyUpdate
        OPTIONAL, -- Cond MasterKeyChange
    dedicatedSIB1-Delivery                            OCTET STRING (CONTAINING SIB1)
        OPTIONAL, -- Need N
    dedicatedSystemInformationDelivery OCTET STRING (CONTAINING SystemInformation)
        OPTIONAL, -- Need N
    otherConfig                               OtherConfig
        OPTIONAL, -- Need M
    nonCriticalExtension                              RRCReconfiguration-v1540-IEs
        OPTIONAL
}
RRCReconfiguration-v1540-IEs ::=                  SEQUENCE {
    otherConfig-v1540                         OtherConfig-v1540          OPTIONAL, -- Need M
    nonCriticalExtension                      SEQUENCE { }               OPTIONAL
}
MasterKeyUpdate ::=                       SEQUENCE {
    keySetChangeIndicator                     BOOLEAN,
    nextHopChainingCount                              NextHopChainingCount,
    nas-Container                                     OCTET STRING
        OPTIONAL,            -- Cond securityNASC
```

-continued

| Listing 9 |
|---|

```
...
}
CellGroupConfig ::=            SEQUENCE {
    cellGroupId                    CellGroupId,
    rlc-BearerToAddModList         SEQUENCE (SIZE(1..maxLC-ID)) OF RLC-BearerConfig
OPTIONAL,           -- Need N
    rlc-BearerToReleaseList        SEQUENCE (SIZE(1..maxLC-ID)) OF LogicalChannelIdentity
OPTIONAL,           -- Need N
    mac-CellGroupConfig                                         MAC-CellGroupConfig
OPTIONAL,           -- Need M
    physicalCellGroupConfig                                     PhysicalCellGroupConfig
OPTIONAL,           -- Need M
    spCellConfig                   SpCellConfig
OPTIONAL,           -- Need M
    sCellToAddModList              SEQUENCE (SIZE (1..maxNrofSCells)) OF SCellConfig
OPTIONAL,           -- Need N
    sCellToReleaseList             SEQUENCE (SIZE (1..maxNrofSCells)) OF SCellIndex
OPTIONAL,           -- Need N
    ...,
    [[
    reportUplinkTxDirectCurrent-v1530                           ENUMERATED {true}
OPTIONAL            -- Cond BWP-Reconfig
    ]]
}
-- Serving cell specific MAC and PHY parameters for a SpCell:
SpCellConfig ::=               SEQUENCE {
    servCellIndex                  ServCellIndex
OPTIONAL,           -- Cond SCG
    reconfigurationWithSync        ReconfigurationWithSync
OPTIONAL,           -- Cond ReconfWithSync
    rlf-TimersAndConstants         SetupRelease { RLF-TimersAndConstants }
OPTIONAL,           -- Need M
    rlmInSyncOutOfSyncThreshold    ENUMERATED {n1}
OPTIONAL,           -- Need S
    spCellConfigDedicated          ServingCellConfig
OPTIONAL,           -- Need M
    ...
}
ReconfigurationWithSync ::=    SEQUENCE {
    spCellConfigCommon             ServingCellConfigCommon
OPTIONAL,           -- Need M
    newUE-Identity         RNTI-Value,
    t304                   ENUMERATED {ms50, ms100, ms150, ms200, ms500, ms1000, ms2000,
ms10000},
    rach-ConfigDedicated           CHOICE {
        uplink                 RACH-ConfigDedicated,
        supplementaryUplink    RACH-ConfigDedicated
    }
OPTIONAL,               -- Need N
    ...,
    [[
    smtc           SSB-MTC                                 OPTIONAL   -- Need
S
    ]]
}
RadioBearerConfig ::=          SEQUENCE {
    srb-ToAddModList               SRB-ToAddModList
OPTIONAL,           -- Cond HO-Conn
    srb3-ToRelease                 ENUMERATED {true}
OPTIONAL,           -- Need N
    drb-ToAddModList               DRB-ToAddModList
OPTIONAL,           -- Cond HO-toNR
    drb-ToReleaseList              DRB-ToReleaseList       OPTIONAL,
-- Need N
    securityConfig                 SecurityConfig          OPTIONAL,  --
Need M
    ...
}
SecurityConfig ::=             SEQUENCE {
    securityAlgorithmConfig        SecurityAlgorithmConfig
OPTIONAL,           -- Cond RBTermChange
    keyToUse                       ENUMERATED{master, secondary}
OPTIONAL,           -- Cond RBTermChange
    ...
}
```

When receiving RRCReconfiguration as shown by way of example in Listing 9 above, the UE may perform the a procedure as specified in 3GPP TS 38.331 and shown, at least in part, in Listing 10.

LISTING 10

```
1>:
  2>  if the nas-Container is included in the received masterKeyUpdate:
    3>  forward the nas-Container to the upper layers;
  2>  if the keySetChangeIndicator is set to true:
    3>  derive or update the K_gNB key based on the K_AMF key, as specified in TS 33.501
        [11];
  2>  else:
    3>  derive or update the K_gNB key based on the current K_gNB key or the NH, using the
        nextHopChainingCount value indicated in the received masterKeyUpdate, as
        specified in TS 33.501 [11];
  2>  store the nextHopChainingCount value;
  2>  derive the keys associated with the K_gNB key as follows:
    3>  if the securityAlgorithmConfig is included in SecurityConfig:
      4>  derive the K_RRCenc and K_UPenc keys associated with the cipheringAlgorithm
          indicated in the securityAlgorithmConfig, as specified in TS 33.501 [11];
      4>  derive the K_RRCint and K_UPint keys associated with the integrityProtAlgorithm
          indicated in the securityAlgorithmConfig, as specified in TS 33.501 [11];
    3>  else:
      4>  derive the K_RRCenc and K_UPenc keys associated with the current
          cipheringAlgorithm, as specified in TS 33.501 [11];
      4>  derive the K_RRCint and K_UPint keys associated with the current
          integrityProtAlgorithm, as specified in TS 33.501 [11].
```

In one configuration, the MasterKeyUpdate information element (IE) (and possibly combined with securityAlgorithmConfig IE) shown by way of example in Listing 10 may be considered to be one example implementation of the first security configuration. In addition, the ReconfigurationWithSync IE may comprise RACH configurations, indicating that this handover involves mobility (cell change and/or gNB change).

Figure 20:
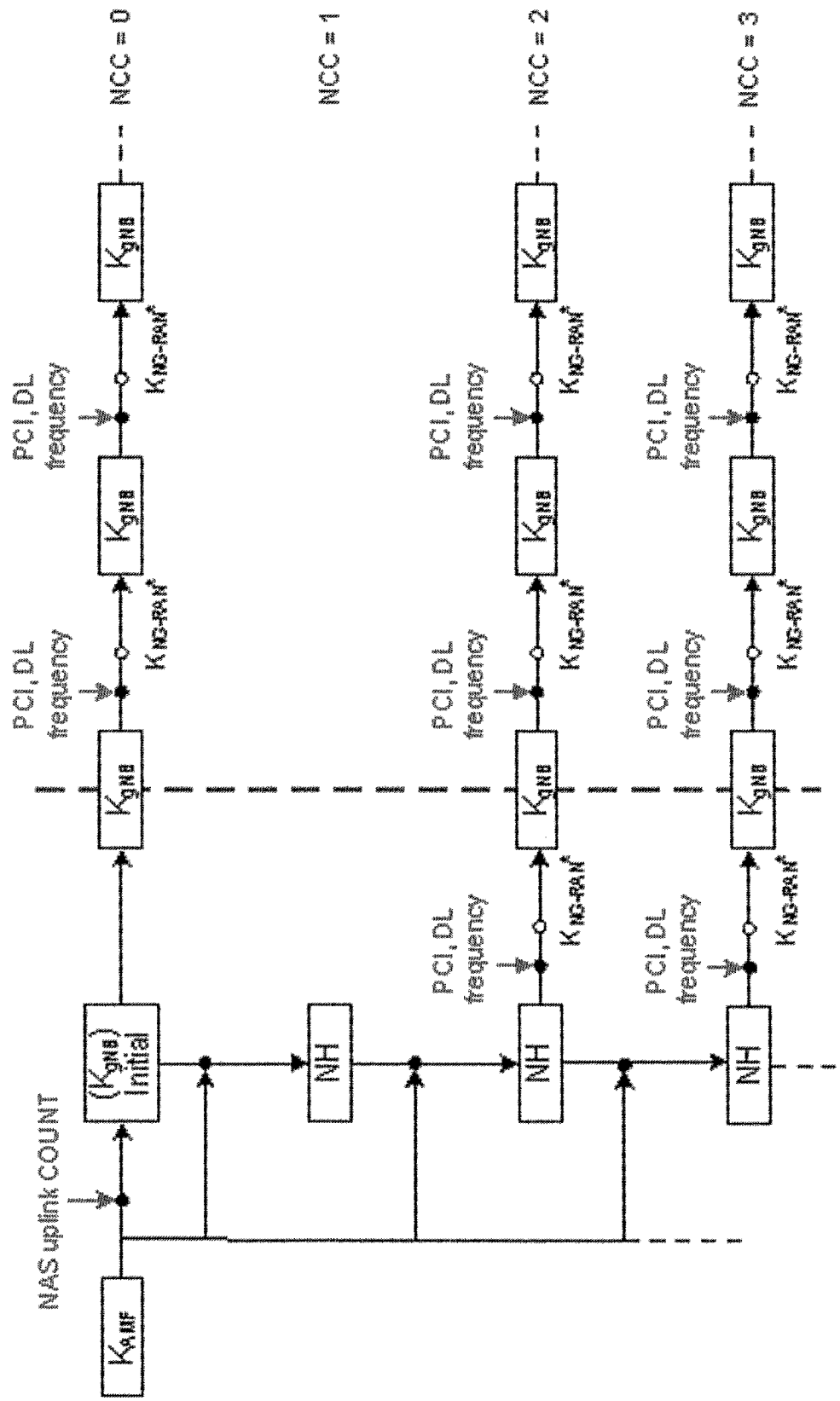
FIG. 20 is a diagrammatic view showing example, basic, representative acts performed by a wireless terminal to derive a master key, $K_{gNB}$, used for the AS security context.

If indicated by the handover command (e.g., by the presence of the first security configuration), the UE may be requested to update the security context. For an intra-gNB or an inter-gNB handover, the updated security context may be used for the target cell upon/after the handover procedure execution. For example, the UE may derive $K_{gNB}$, a master key used for the AS security context, using parameters including $K_{AMF}$, one of the keys used for NAS security context, nextHopChainingCount (NCC), received in RRCReconfiguration, as shown in FIG. 20, per 3GPP TS 33.501, which is incorporated herein by reference. The derived $K_{gNB}$ may be used to further generate subsequent keys (such as $K_{RRCint}$ and $K_{RRCenc}$ per TS 33.501). An example procedure of the key derivation, according to 3GPP TS 33.501, is described at least in part in Listing 11.

LISTING 11

Whenever an initial AS security context needs to be established between UE and gNB/ng-eNB, AMF and the UE shall derive a $K_{gNB}$ and a Next Hop parameter (NH). The $K_{gNB}$ and the NH are derived from the $K_{AMF}$. A NH Chaining Counter (NCC) is associated with each $K_{gNB}$ and NH parameter. Every $K_{gNB}$ is associated with the NCC corresponding to the NH value from which it was derived. At initial setup, the $K_{gNB}$ is derived directly from $K_{AMF}$, and is then considered to be associated with a virtual NH parameter with NCC value equal to zero. At initial setup, the derived NH value is associated with the NCC value one.
  NOTE 1:  At the UE, the NH derivation associated with NCC = 1 could be delayed
           until the first handover performing vertical key derivation.
  NOTE 1a: In N2 handover, when the $K_{gNB}$ is updated either due to $K_{AMF}$ change or
           synchronising the AS security context with the NAS security context, the
           $K_{gNB}$ is derived as specified in clauses 6.9.2.3.3 and 6.9.2.3.4 of the present
           document. In inter-RAT handover, the $K_{gNB}$ is derived as specified in clause
           8.4 of the present document. In UE context modification, the $K_{gNB}$ is derived
           as specified in clause 6.9.2.2.
Whether the AMF sends the $K_{gNB}$ key or the {NH, NCC} pair to the serving gNB/ng-eNB is described in detail in sub-clauses 6.9.2.2 and 6.9.2.3. The AMF shall not send the NH value to gNB/ng-eNB at the initial connection setup. The gNB/ng-eNB shall initialize the NCC value to zero after receiving NGAP Initial Context Setup Request message.
  NOTE 2:  Since the AMF does not send the NH value to gNB/ng-eNB at the initial
           connection setup, the NH value associated with the NCC value one cannot be
           used in the next Xn handover or the next intra-gNB/intra-ng-eNB-CU
           handover, for the next Xn handover or the next intra-gNB-CU/intra-ng-eNB
           handover the horizontal key derivation (see FIG. 6.9.2.1.1-1) will apply.
  NOTE 3:  One of the rules specified for the AMF in sub-clause 6.9.2.3.3 of the
           present document states that the AMF always computes a fresh {NH, NCC}
           pair that is given to the target gNB/ng-eNB. An implication of this is that the
           first {NH, NCC} pair will never be used to derive a $K_{gNB}$. It only serves as an
           initial value for the NH chain.

LISTING 11

The UE and the gNB/ng-eNB use the $K_{gNB}$ to secure the communication between each
other. On handovers, the basis for the $K_{gNB}$ that will be used between the UE and the
target gNB/ng-eNB, called $K_{NG\text{-}RAN}^*$, is derived from either the currently active $K_{gNB}$ or
from the NH parameter. If $K_{NG\text{-}RAN}^*$ is derived from the currently active $K_{gNB}$ this is
referred to as a horizontal key derivation (see FIG. 6.9.2.1.1-1) and if the $K_{NG\text{-}RAN}^*$ is
derived from the NH parameter the derivation is referred to as a vertical key derivation
(see FIG. 6.9.2.1.1-1).
As NH parameters are only computable by the UE and the AMF, it is arranged so that NH
parameters are provided to gNB/ng-eNBs from the AMF in such a way that forward
security can be achieved.
On handovers with vertical key derivation the NH is further bound to the target PCI and
its frequency ARFCN-DL before it is taken into use as the $K_{gNB}$ in the target
gNB/ng-eNB. On handovers with horizontal key derivation the currently active $K_{gNB}$ is
further bound to the target PCI and its frequency ARFCN-DL before it is taken into use as
the $K_{gNB}$ in the target gNB/ng-eNB.

In addition, in some configurations, an intra-cell handover may be instructed to the UE just to update the AS security context. This act may be referred as "Key change on the fly", which may be categorized in one of the following two cases: Key re-keying and Key refresh.

The case of Key re-keying is initiated by the AMF. The AMF may create a new $K_{gNB}$ from the current $K_{AMF}$ using a fresh uplink NAS COUNT, a counter handled by the Non-Access Stratum (NAS) layer, which is shared by the UE and the AMF. The derived $K_{gNB}$ may be sent to the gNB. The gNB may then send an RRC message (e.g., RRCReconfiguration) with the first security configuration comprising (1) an indication indicating a need to generate a fresh $K_{AMF}$ and/or (2) indication indicating a need to generate a fresh $K_{gNB}$ based on the $K_{AMF}$ (e.g. KeySetChangeIndicator=TRUE).

The case of Key refresh is initiated by the currently serving gNB. The gNB may generate a new $K_{gNB}$ from the Next Hop parameter, NH), if an unused {NH, NCC} pair is available, given by the AMF, known as "vertical derivation". Otherwise the gNB may generate a new $K_{gNB}$ from the currently used $K_{gNB}$ (known as "horizontal derivation"). The vertical derivation is performed in the vertical direction in FIG. 20, whereas the horizontal derivation is performed in the horizontal direction in FIG. 20. The gNB may then send an RRC message (e.g. RRCReconfiguration) including the first security configuration (e.g., nextHopChainingCount used for the key derivation and KeySetChangeIndicator=FALSE). The UE receiving the RRC message may generate a new $K_{gNB}$ with either the vertical or horizontal derivation, based on the received NCC value and the saved NCC value. That is, the vertical derivation may be performed if the received NCC value is different from the saved NCC value, otherwise, the horizontal derivation may be performed.

If the handover command does not comprise the first security configuration, the UE is supposed to continue using the current AS security context, i.e., the current AS keys, after the handover. In some systems, such as the 5G system, the AS key update may not be required for an intra-gNB handover. In such a case, for example, the UE may determine if the AS key update is needed by the presence of MasterKeyUpdate, and possibly also securityAlgorithmConfig, in RRCReconfiguration.

Figure 21:
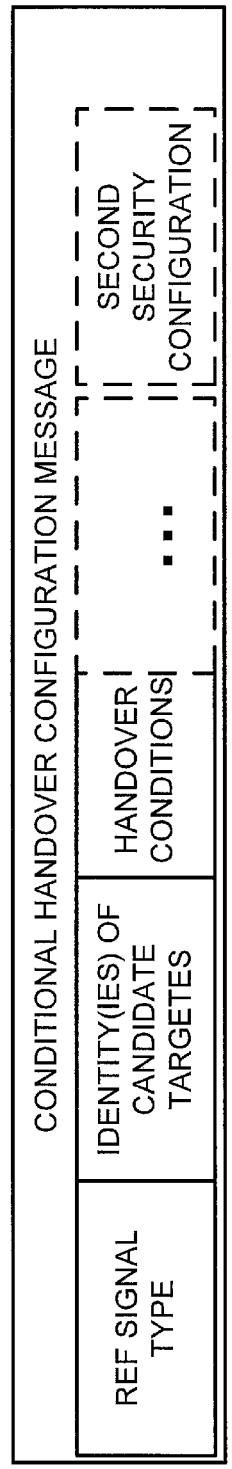
FIG. 21 is a diagrammatic views showing example generic contents of an example conditional handover configuration message including security configurations for the example embodiment of FIG. 19.

As mentioned before, "a first security configuration" was described as a set of parameters or information used for generating the security keys used for a non-conditional handover. On the other hand, and as used herein, a "second security configuration(s)" comprises a set of parameters or information which will be used for generating a security context to be established upon or after performing a conditional handover to one of the candidate target cells configured in the CHO configurations. In an example first implementation of the example embodiment and mode of FIG. 19, the CHO configurations disclosed in the previous embodiments, e.g., the example embodiments and modes described with reference to one or more of FIG. 6, FIG. 11, and/or FIG. 15, may further comprise second security configuration(s), which will be used for generating a security context to be established upon or after performing a conditional handover to one of the candidate target cells configured in the CHO configurations. In other example implementations of the example embodiment and mode of FIG. 19, the second security configuration may be a part of a message comprising the CHO configurations but not a part of the CHO configuration information element per se (e.g., in a different information element included in the message). For example, FIG. 21 shows an example format of at least portions of a representative conditional handover configuration message which includes second security configuration information. In either case, and as shown by way of example in FIG. 22, the second security configuration may comprise:

Security algorithm to be used (e.g. securityAlgorithmConfig)
Next hop chaining count (e.g. nextHopChainingCount)
An indication indicating a need to generate a fresh AS key set (e.g., KeySetChangeIndicator)

Similar to the first security configuration, the second security configuration for a candidate target cell may be optionally included in the CHO configurations. If the second security configuration is absent, then the UE may continue using the master key and the subsequent keys being used in the currently serving cell after performing a CHO to the candidate target cell.

Figure 23A:
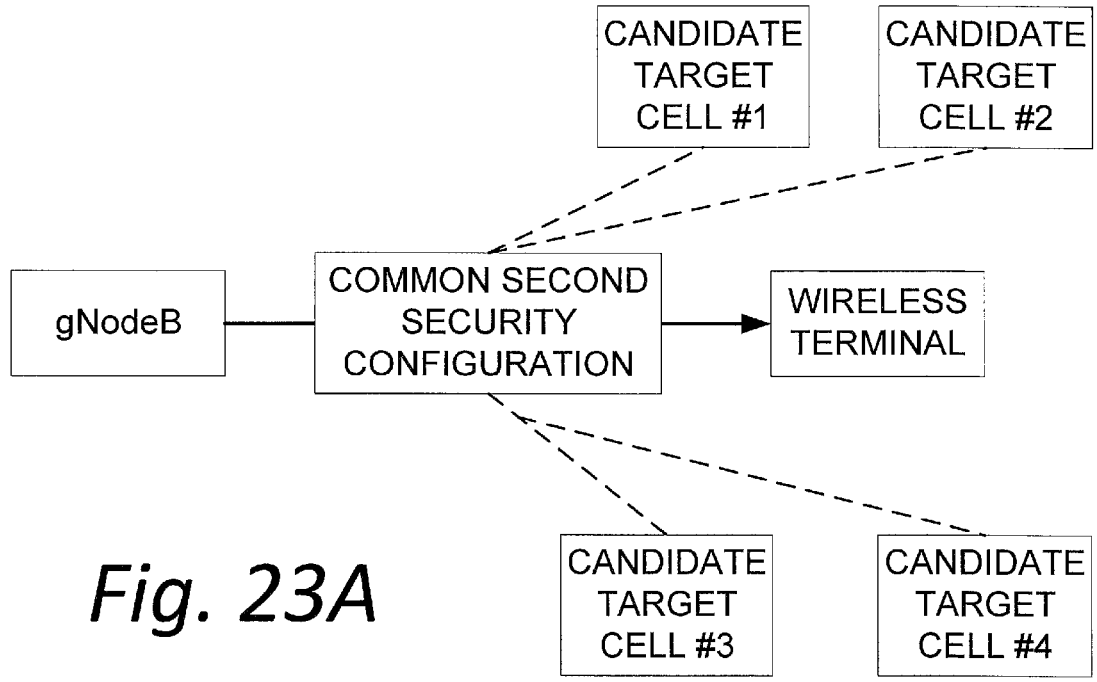
FIG. 23A is a diagrammatic view showing a common second security configuration information element which may be associated with plural candidate target cells for the example embodiment of FIG. 19.

In one example configuration, illustrated by way of example in FIG. 23A, a common second security configuration may be used for all of the candidate target cell(s) in the CHO configurations.

Figure 23B:
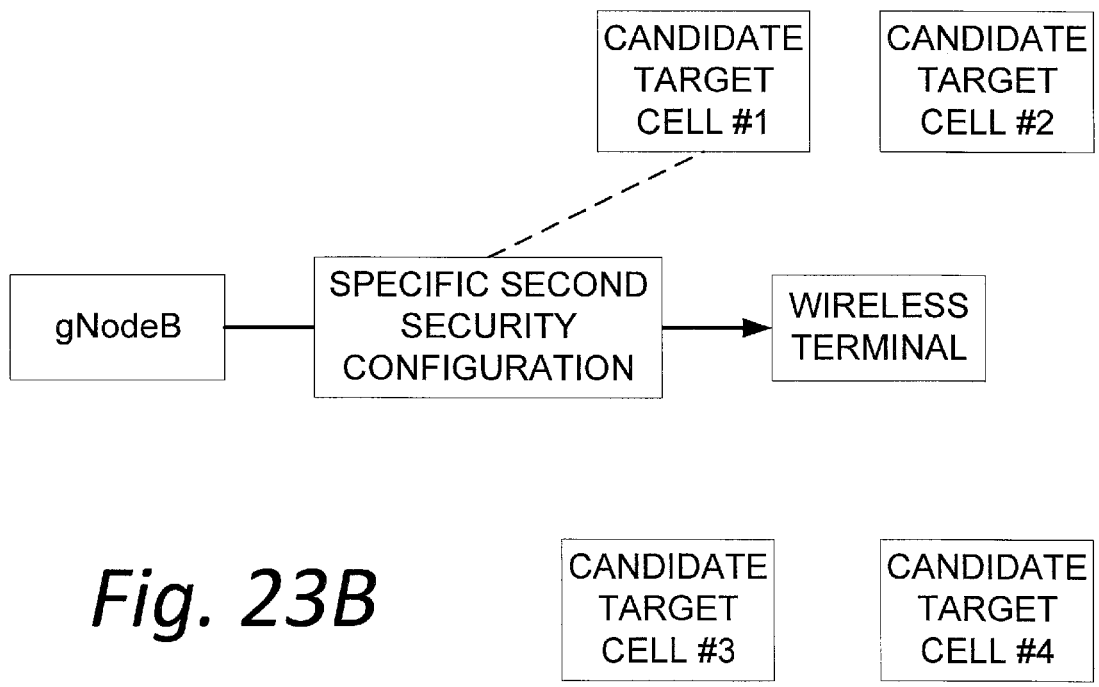
FIG. 23B is a diagrammatic view showing a specific second security configuration information element which may be associated with a unique candidate target cells for the example embodiment of FIG. 19.

In another example configuration, illustrated by way of example in FIG. 23B, a cell-specific second security configuration may be configured for each of the candidate target cell(s).

Figure 23C:
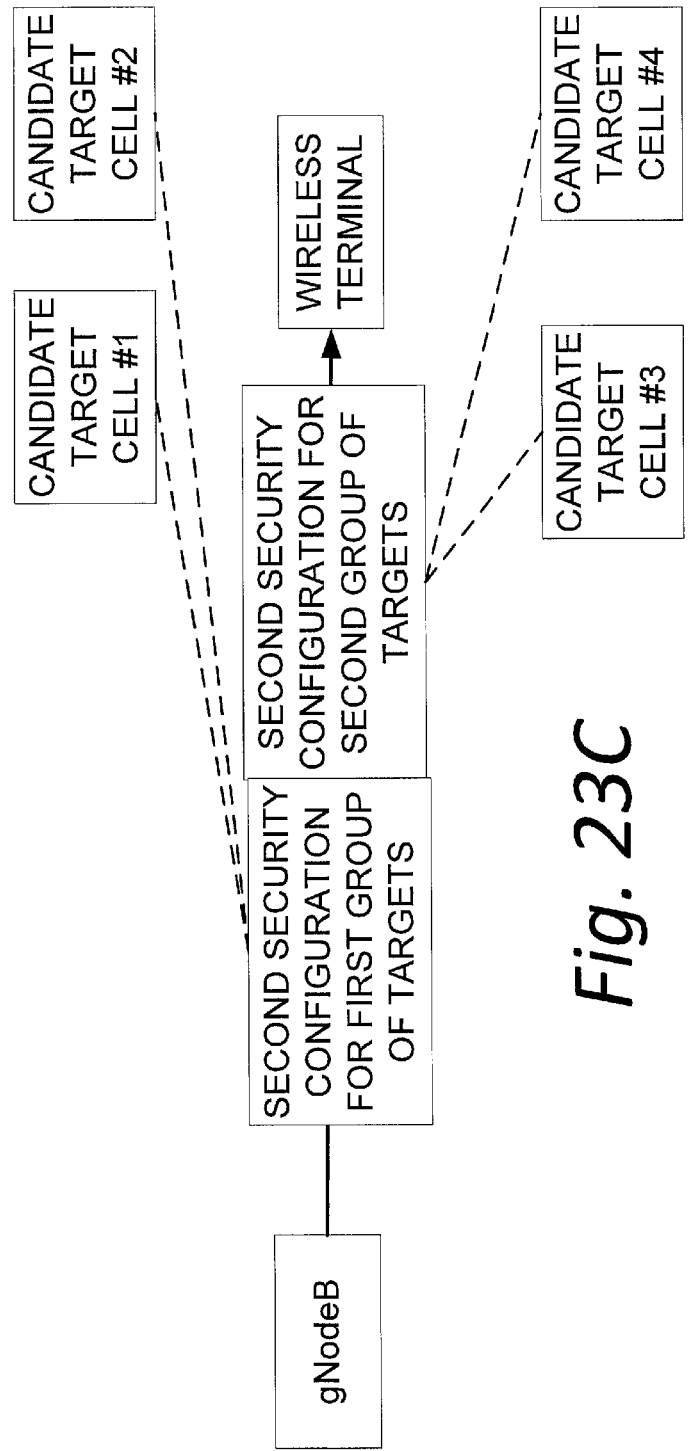
FIG. 23C is a diagrammatic view showing a message with plural second security configuration information elements, different second security configuration information elements of the message being associated with different groups of one or more candidate target cells for the example embodiment of FIG. 19.

In yet another example configuration, illustrated by way of example in FIG. 23C, a plurality of second security configurations is configured, wherein each of the second security configurations may be used for one or a group of candidate target cells.

Listing 12-1 shows an example format of the CHO configurations comprising a cell-specific second security configuration for each of the candidate target cells.

Listing 12-1

```
CHOConfig ::=                   SEQUENCE {
  CHOConfigToRemoveList         CHOConfigToRemoveList            OPTIONAL,  -- Need N
  CHOConfigToAddModList         CHOConfigToAddModList            OPTIONAL,  -- Need N
}                                                                OPTIONAL,  -- Need M
CHOConfigToRemoveList ::= SEQUENCE (SIZE (1..maxNrofCHOConfigId)) OF CHOConfigId
ReportConfigToAddModList ::= SEQUENCE (SIZE (1..maxCHOConfigId)) OF CHOConfigToAddMod
CHOConfigToAddMod ::=           SEQUENCE {
  choConfigId                   CHOConfigId,
  reportConfig                  CHOICE {
    choConfigNR                 CHOConfigNR,
    ...,
    choConfigInterRAT           choConfigInterRAT
  }
}
CHOConfigNR ::=                 SEQUENCE {
  radioBearerConfig             RadioBearerConfig                OPTIONAL, -- Need M
  secondaryCellGroup            OCTET STRING (CONTAINING CellGroupConfig)  OPTIONAL, -- Need M
  masterCellGroup               OCTET STRING (CONTAINING CellGroupConfig)  OPTIONAL, -- Need M
  fullConfig                    ENUMERATED {true}                OPTIONAL, -- Cond FullConfig
  masterKeyUpdate               MasterKeyUpdate                  OPTIONAL, -- Cond MasterKeyChange
  CHOConditionList SEQUENCE (SIZE (1..maxCHOConditionList)) OF CHOCondition
}
CHOCondition                    SEQUENCE {
  eventTriggered                EventTriggerConfigCHO,
  ...,
}
EventTriggerConfigCHO::=        SEQUENCE {
  eventId                       CHOICE {
    eventA1                     SEQUENCE {
      a1-Threshold              MeasTriggerQuantity,
      a1-LeavingOffset          MeasTriggerQuantityOffset        OPTIONAL,
      reportOnLeave             BOOLEAN                          OPTIONAL,
    },
    eventA2                     SEQUENCE {
      a2-Threshold              MeasTriggerQuantity,
      a2-LeavingOffset          MeasTriggerQuantityOffset        OPTIONAL,
      reportOnLeave             BOOLEAN                          OPTIONAL,
    },
    eventA3                     SEQUENCE {
      a3-Offset                 MeasTriggerQuantityOffset,
      a3-LeavingOffset          MeasTriggerQuantityOffset        OPTIONAL,
      reportOnLeave             BOOLEAN                          OPTIONAL,
    },
    eventA4                     SEQUENCE {
      a4-Threshold              MeasTriggerQuantity,
      a4-LeavingOffset          MeasTriggerQuantityOffset        OPTIONAL,
      reportOnLeave             BOOLEAN                          OPTIONAL,
    },
    eventA5                     SEQUENCE {
      a5-Threshold1             MeasTriggerQuantity,
      a5-Threshold2             MeasTriggerQuantity,
      a5-LeavingOffset1         MeasTriggerQuantityOffset        OPTIONAL,
      a5-LeavingOffset2         MeasTriggerQuantityOffset        OPTIONAL,
      reportOnLeave             BOOLEAN                          OPTIONAL,
    },
    eventA6                     SEQUENCE {
      a6-Offset                 MeasTriggerQuantityOffset,
      a6-LeavingOffset          MeasTriggerQuantityOffset        OPTIONAL,
      reportOnLeave             BOOLEAN                          OPTIONAL,
    },
    ...
  },
...
```

Listing 12-2 is an alternative format for the cell-specific second security configuration, wherein the CHO configurations, CHOConfig, may comprise one common second security configuration, masterKeyUpdate, each of the CHO configurations, e.g., CHOConfigNR, comprising a flag to indicate whether or not it is associated with the second common security configuration.

Listing 12-2

```
CHOConfig ::=                    SEQUENCE {
    CHOConfigToRemoveList        CHOConfigToRemoveList
OPTIONAL,  -- Need N
    CHOConfigToAddModList        CHOConfigToAddModList
OPTIONAL,  -- Need N
    masterKeyUpdate              MasterKeyUpdate
OPTIONAL, -- Cond MasterKeyChange
}
OPTIONAL,  -- Need M
CHOConfigNR ::=                  SEQUENCE {
    radioBearerConfig            RadioBearerConfig
OPTIONAL, -- Need M
    secondaryCellGroup                  OCTET STRING (CONTAINING CellGroupConfig)
OPTIONAL, -- Need M
    masterCellGroup                     OCTET STRING (CONTAINING CellGroupConfig)
OPTIONAL, -- Need M
    fullConfig                   ENUMERATED {true}
OPTIONAL, -- Cond FullConfig
    masterKeyUpdateAssociated       ENUMERATED {true}
OPTIONAL, -- Need M
    CHOConditionList             SEQUENCE (SIZE (1..maxCHOConditionList)) OF
CHOCondition
}
...
```

In the example embodiment and mode of FIG. 19, the source gNodeB 22 comprises node processor 30 and node transmitter 34. The node processor 30, and particularly first security context generator 91, is configured to establish, using a first key set, a first security context with the wireless terminal 26. The node processor 30, e.g., conditional handover configuration information generator 66(19), is configured to generate a configuration message comprising (1) one or more conditional handover configurations and (2) an indication, by whether or not each of the one or more conditional handover configurations is configured with a security configuration, of a key set to be used by a wireless terminal to establish a second security context upon or after a handover configured by the each of the one or more conditional handover configurations. Each of the one or more conditional handover configurations comprises at least one identity of a candidate target cell, and at least one triggering condition. The key set to be used by a wireless terminal to establish a second security context upon or after a handover configured by the each of the one or more conditional handover configurations may be generated by key set generator 92 for target cell(s).

Figure 24:
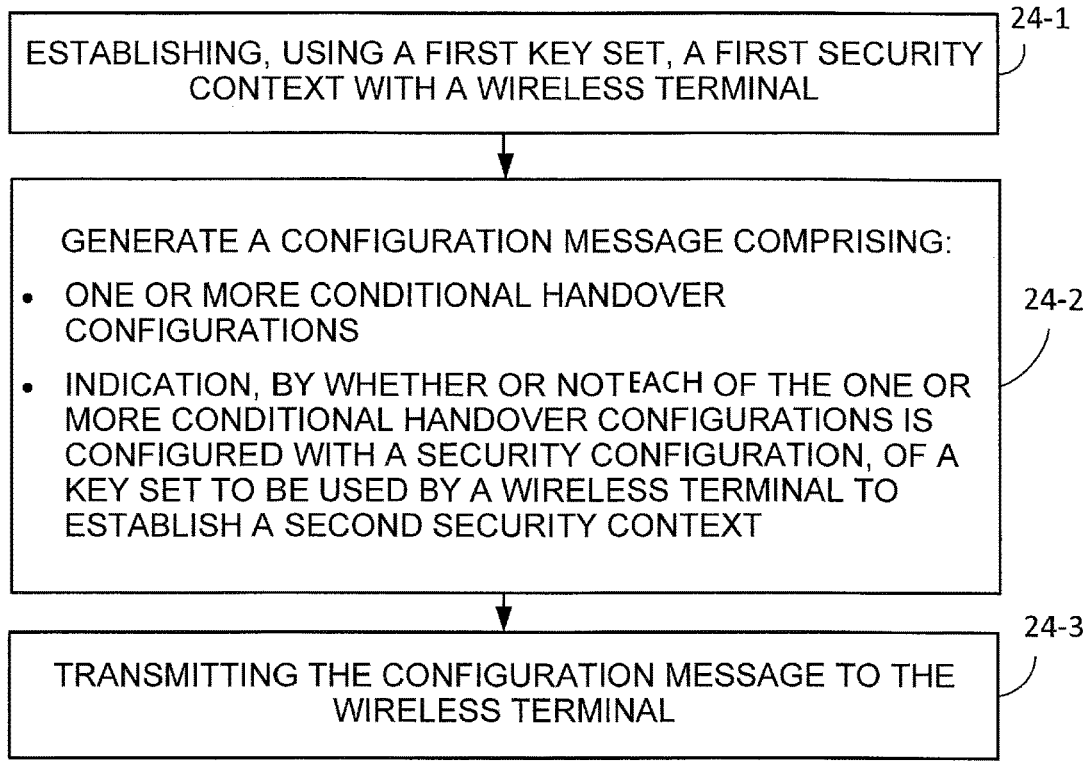
FIG. 24 is a flowchart showing example, basic, representative acts performed by a source gNodeB of the example embodiment and mode of FIG. 19.

Thus, the source gNodeB 22 of FIG. 19 performs example, basic, representative acts of steps as shown in FIG. 24. Act 24-1 comprises establishing, using a first key set, a first security context with a wireless terminal. Act 24-1 may be performed at least in part by first security context generator 91. Act 24-2 comprises configuration message. The configuration message of act 24-2, which may be generated by key set generator 92 for target cell(s), may comprise (1) the one or more conditional handover configurations and (2) the indication, by whether or not each of the one or more conditional handover configurations is configured with a security configuration, of a key set to be used by a wireless terminal to establish a second security context upon or after a handover configured by the each of the one or more conditional handover configurations.

In the example embodiment and mode of FIG. 19, the wireless terminal 26, sometimes referred to as the UE, comprises terminal processor 40 and terminal receiver 46. The terminal processor 40 of the wireless terminal 26, and particularly terminal security context manager 94, is configured to establish, using a first key set, a first security context with a first wireless access node. The terminal processor 40, particularly handover unit 72, is configured to perform a conditional handover to a candidate target cell configured by one of the one or more conditional handover configurations, in a case that the at least one triggering condition associated with the candidate target cell is met The terminal processor 40, and particularly terminal second context generator 96 for target cell(s), is further configured to establish a second security context with a second wireless access node that serves the candidate target cell, based on whether or not a security configuration associated with the candidate target cell is configured by the configuration message.

Figure 25:
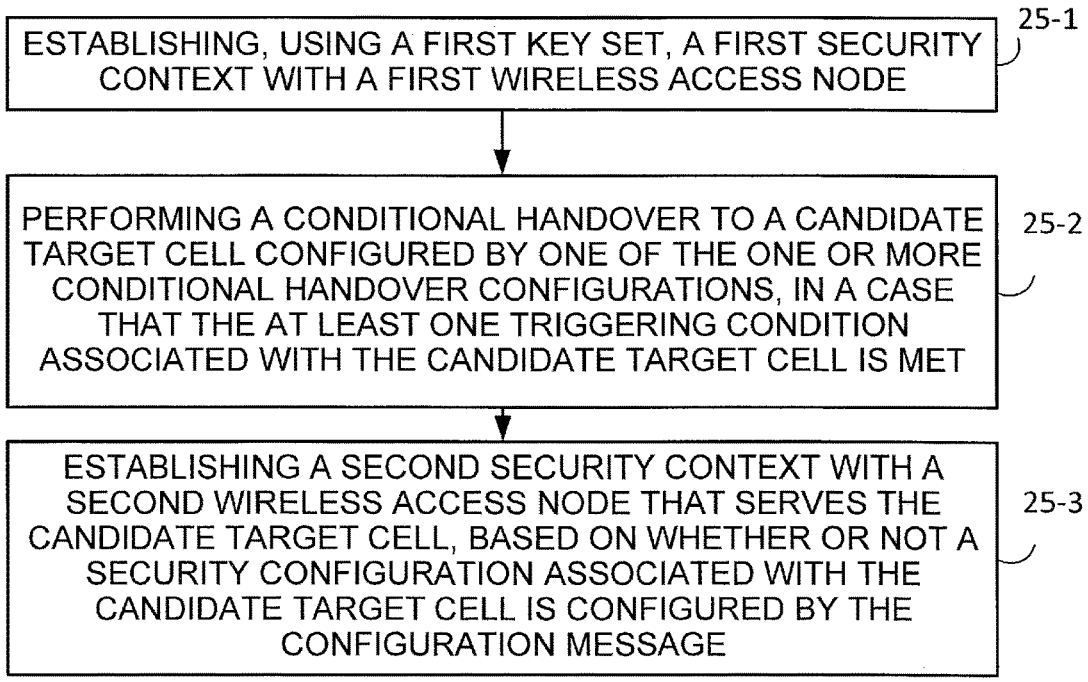
FIG. 25 is a flowchart showing example, basic, representative acts performed by a wireless terminal of the example embodiment and mode of FIG. 19.

Thus, the wireless terminal 26 of FIG. 19 performs example, basic, representative acts of steps as shown in FIG. 25. Act 25-1 comprises establishing, using a first key set, a first security context with a first wireless access node. Act 25-2 comprises performing a conditional handover to a candidate target cell configured by one of the one or more conditional handover configurations, in a case that the at least one triggering condition associated with the candidate target cell is met. Act 25-3 comprises establishing a second security context with a second wireless access node that serves the candidate target cell, based on whether or not a security configuration associated with the candidate target cell is configured by the configuration message.

Figure 26:
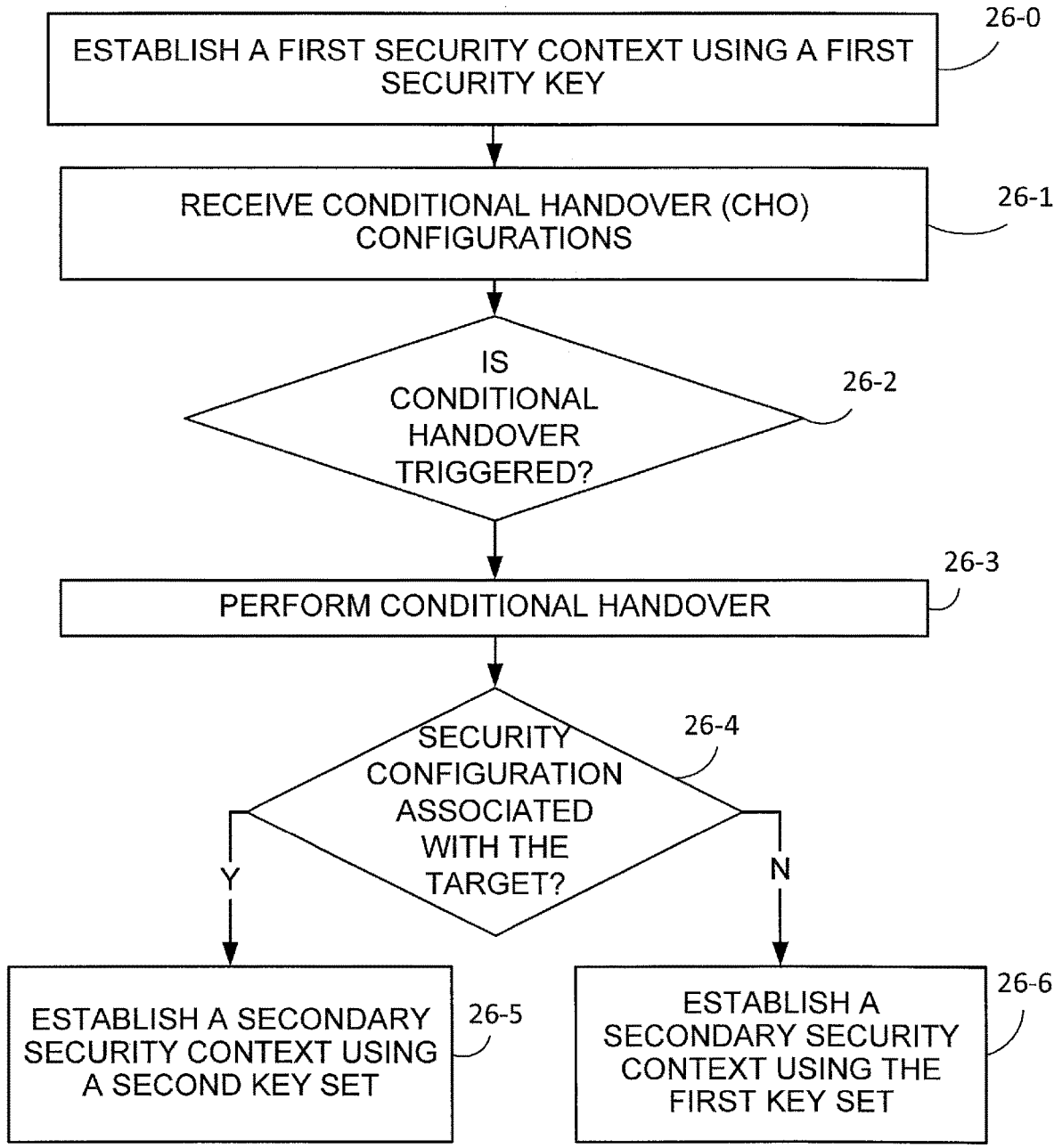
FIG. 26 is a flowchart showing example, basic, representative acts performed by a wireless terminal which receives a first security context and thereafter, if a conditional handover is triggered, determines whether a security configuration is established for a target.

FIG. 26 shows an example procedure for the UE for which security configurations are provided for handover. Accordingly, as act 26-0 the UE may establish a first security context with a first (source) gNB. The first security context may comprise a first key set used for encryptions and integrity protection. As act 26-1 the UE may receive a configuration message from the first gNB, the configuration message comprising one or more conditional handover configurations. Each of the conditional handover configurations may comprise at least one identity of a candidate target cell and at least one triggering condition. The configuration message of act 26-1 may further comprise optional security configuration(s). Each of the security configuration(s), if present, may be associated with at least one of the conditional handover configurations. Act 26-2 comprises making a determination if the at least one triggering condition associated with the candidate target cell is met. If it is determined at act 26-2 that the at least one triggering condition associated with the candidate cell is met, as act 26-3 the UE may perform a conditional handover to a candidate target cell. Upon or after executing the conditional handover of act 26-3, as act 26-4 the UE may check the presence of the security configuration associated with the candidate target cell. If the check of act 26-4 is positive, as act 26-5 the UE may establish a second security context with a node, e.g., a target gNB, that controls the candidate target cell using a second key set derived from the associated security configuration. If the check of act 26-4 is negative, as act 26-6 the UE may continue using the first key set to establish a second security context with the second gNB.

Figure 27:
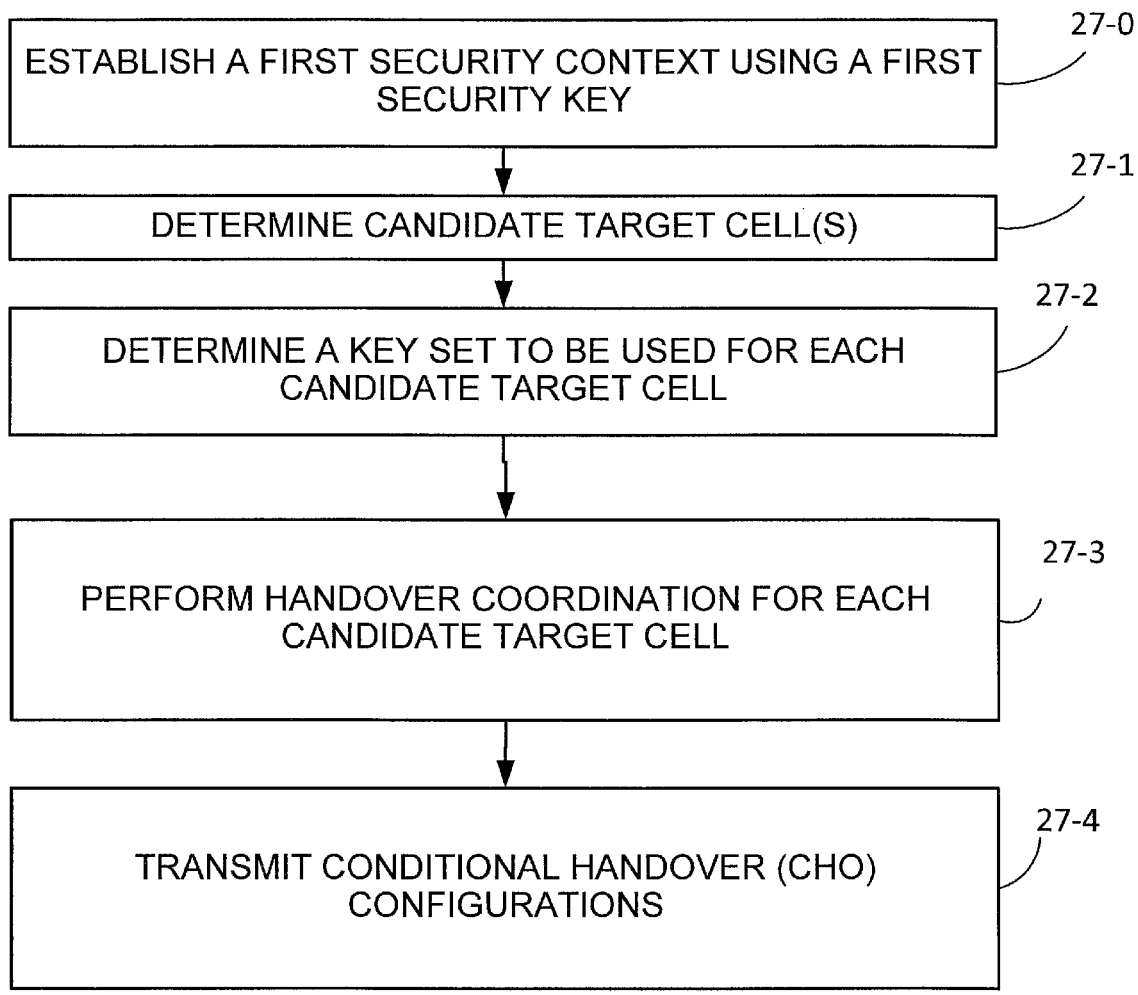
FIG. 27 is a flowchart showing example, basic, representative acts performed by an access node, e.g., gNB, which establishes a first security context, determines a key set to be used for candidate target cells, and after handover coordination transmits conditional handover configurations to a wireless terminal.

FIG. 27 shows an example procedure for the gNB of this embodiment. Act 27-1 shows that the gNB may establish a first security context with the UE. The first security context may comprise a first key set used for encryptions and integrity protection. As act 27-1 the gNB may determine candidate target cell(s) for CHO to be configured to the UE. As act 27-2 the gNB may further determine, for each of the candidate target cell(s), a key set to be used, either the first key set or an updated key set. As act 27-3, for each of the candidate target cell(s), the gNB may prospectively perform a handover coordination with a node that controls the each of the candidate target cell(s). During the handover coordination for each of the candidate target cell(s), if an updated key set is to be used, the gNB may generate a second key set and provide the second key set to the node. As act 27-4 the gNB may then generate and transmit a configuration message comprising CHO configurations and optional second security configuration(s). Each of the conditional handover configurations may comprise at least one identity of a candidate target cell and at least one triggering condition. Each of the second security configuration(s), if present, may be associated with at least one of the conditional handover configurations. For each of the CHO configurations, if associated with one of the optional security configuration(s), the gNB may instruct the UE to derive the second key set upon or after a conditional handover, otherwise the gNB may instruct the UE to continue using the first key set.

5: Releasing Cho Configurations Based on Security Configuration

As described in the previous section and embodiment of FIG. 19, a series of access stratum, AS, security contexts may be generated and established in a chained process as shown by way of example in FIG. 20. In addition, a second security configuration may be for a future use; e.g., not to be consumed immediately, but to be used only after a conditional handover is triggered.

There may be situations in which, after a second security configuration has been created, for one or more reasons yet another new security configuration must be created. In such event where the yet another new security context has to be created, creation of the yet another security configuration breaks into the key chaining, as creation of a new key set for the yet another security configuration may invalidate the previously configured (unused) second security configuration. In such situation involving creation of the yet another security configuration, therefore, the previously created other CHO configurations may have to be released (de-configured).

Figure 28:
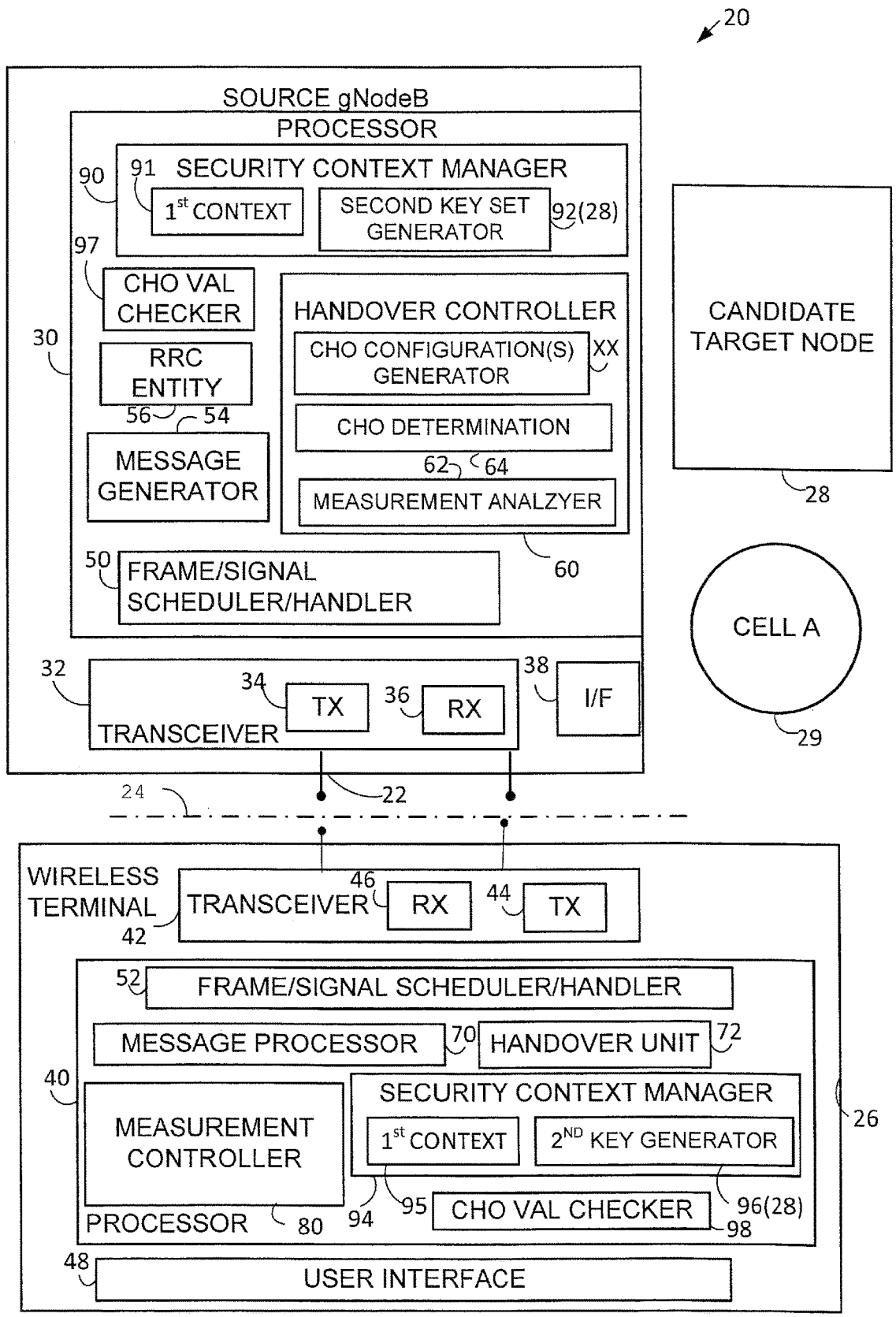
FIG. 28 is a schematic view of an example communications system comprising a source gNodeB which provides a wireless terminal with conditional handover configuration and which checks handover configurations.

FIG. 28 shows an example communications system 20 wherein security contexts may also be employed in conjunction with handovers, and wherein validity of handover configurations may be checked based on security configurations for reasons such as those basically described above. FIG. 28 shows system 20 as comprising source gNodeB 22, wireless terminal 26, and candidate target node 28. The source gNodeB 22, wireless terminal 26, and node processor 30 of the communications system 20 of FIG. 19 are similar to those of FIG. 6, FIG. 11, FIG. 15, and FIG. 19, with like units and functionalities having like reference numbers. As shown in FIG. 28, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, handover controller 60, security context manager 90. As in previous example embodiment and modes, the handover controller 60 may comprise measurement analyzer 62, conditional handover (CHO) determination unit 64, and conditional handover configuration information generator 66(28). A difference between the previous example embodiments and the example embodiment and mode of FIG. 28 is that node processor 30 further comprises node conditional handover validity checker 97. The node conditional handover validity checker 97 may comprises or be included in handover controller 60, and may communicate and/or interact with security context manager 90. The security context manager 90 comprises first security context generator 91 and second key set generator 92(28) which derives a second key set for establishing a second security context between the wireless terminal and a second wireless access node that serves the target cell.

As in the preceding example embodiments and modes, the wireless terminal 26 of the example embodiment and mode of FIG. 28 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80. Although not specifically shown in FIG. 28, it should be understood that, in like manner with FIG. 15 and FIG. 19, measurement controller 80 may in turn comprises a measurement initiation unit, a measurement results unit, and a measurement report control unit. In addition, the terminal processor 40 of FIG. 28 is shown as comprising terminal conditional handover validity checker 98. The terminal security context manager 94 comprises terminal first context generator 95 and terminal second key generator 96(28). The terminal second key generator 96(28) uses a security configuration to derive a second key set for establishing a second security context with a second wireless access node that serves the target cell.

The example embodiment and mode of FIG. 28 takes into consideration various aspects of context generation and handling in conjunction with handovers, and particularly checks for validity of conditional handover configurations as described herein. For example, the example embodiment and mode of FIG. 19 takes into consideration various examples and scenarios, as the example scenarios 5-1 through 5-4 below and corresponding FIGS. 29 through 33 illustrate example situations in which CHO configurations need to be released or can be preserved. The acts of FIG. 34 and FIG. 35 may also be performed by the system of the example embodiment and mode of FIG. 28.

Example Scenario 5-1: Re-Establishment after RLF

Figure 29:
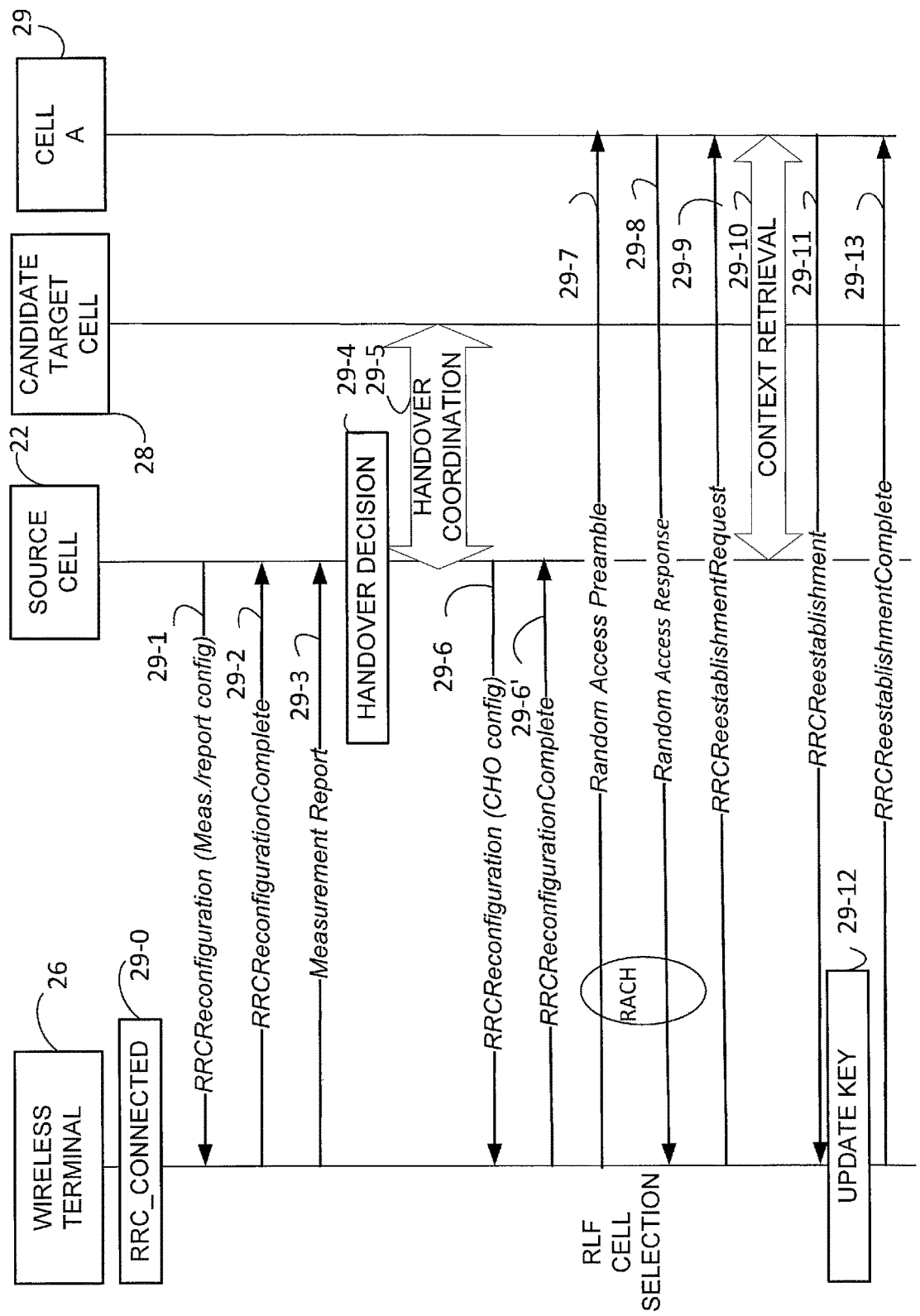
FIG. 29 shows differing scenario of in which conditional handover configurations need to be released or can be preserved.

FIG. 29 shows an example scenario where the UE experiences a radio link failure (RLF) with the currently serving cell (Source Cell) after a CHO is configured with a candidate target cell by the currently serving cell. How the CHO is configured for the UE with respect to the candidate target cell is reflected by acts 29-0 through 29-6', which are similar to acts 7-0 through 7-6' of FIG. 7, respectively, and hence not described further herein.

In the scenario of FIG. 29, after detecting an RLF the UE may perform a cell selection procedure, which results in finding Cell A, also referred to herein as cell 29. As shown by acts 29-7 and 29-8, the UE may perform a RACH procedure, e.g., Random Access Preamble/Response procedure, and thereafter as act 29-9 may send a RRCReestablishmentRequest message to Cell A. Cell A may then, as act 29-10, communicate with the Source Cell to retrieve the connection context for the UE, e.g., the UE context. Upon a successful retrieval of the UE context, as act 29-11 Cell A may respond to the UE with a RRCReestablishment message. The RRCReestablishment message of act 29-11 may comprise a nextHopChainingCount information element that the UE will use for Cell A. Using the nextHopChainingCount information element, as shown by act 29-12 the UE may then update $K_{gNB}$ by either the vertical or horizontal key derivation and the subsequent keys. Act 29-13 shows the UE then sending a RRCReestablishment-Complete message to cell A.

In some systems, such as LTE and 5G RAN, the key update such as shown by act 29-13 always has to occur after a connection re-establishment, e.g., after act 29-12. In such a case, the second security configuration for each of the candidate target cells configured by the CHO configurations may have to be invalidated. Thus, in the scenario of FIG. 29, the UE may release all of the CHO configurations, e.g., for all candidate target cells. In parallel, the gNB serving the Source Cell may also need to cancel the CHO coordination, e.g., the resource allocations, made to the candidate target cell(s). In one example configuration, upon receiving a context retrieval request from Cell A, as act 29-15 the gNB serving the Source Cell may send a CHO/HO cancellation command to each of the gNBs that control the candidate target cell(s).

Upon or after receiving the RRCReestablishment message, as act 29-13 the UE may perform the horizontal or vertical key derivation to create a fresh AS master key, i.e., $K_{gNB}$, and the subsequent keys based on comparing the received and saved (currently used) NCC values, as described in the previous embodiment.

Cell A may be a cell different from the Source Cell or may be the same cell as the Source Cell. In the latter case, the UE context retrieval may take place as internal signalling. In addition, if Cell A is one of the candidate target cells configured in the CHO configuration, the UE may perform a conditional handover (CHO), as shown by way of example in FIG. 7, instead of a connection re-establishment.

Example Scenario 5-2: Inter-gNB Handover

Figure 30:
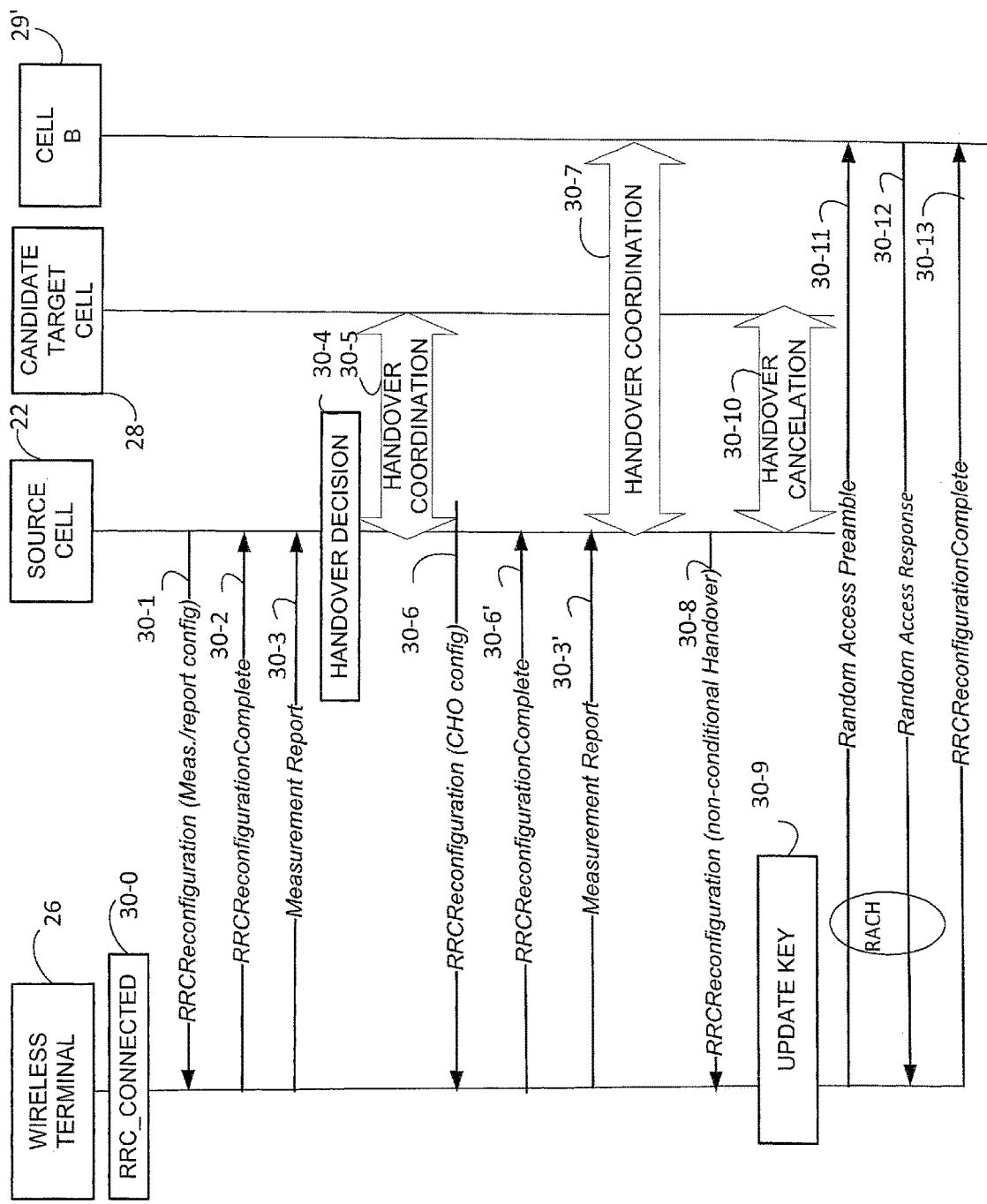
FIG. 30 shows differing scenario of in which conditional handover configurations need to be released or can be preserved.

The scenario FIG. 30 has similar initial acts 30-0 through 30-6' as the scenario of FIG. 29. But in the scenario of FIG. 30, after receiving in act 30-6 the CHO configurations from the currently serving cell (Source Cell), the UE is instructed by the currently serving cell to perform a non-conditional handover to a target cell, Cell B, also known as cell 29', that is not included in the CHO configurations. The case of FIG. 30 may happen when a measurement report sent by the UE, such as that depicted by act 30-3' in FIG. 30, indicates that the signal from a cell not listed as a candidate target cell becomes strong. The coordination of the non-conditional handover to the target cell (Cell B) that is not included in the CHO configurations is reflected by act 30-7. If Cell B is under control of another gNB, Cell B and the UE may have to use a fresh AS master key, and thus a RRCReconfiguration procedure as indicated by act 30-8 is performed to instruct that the non-conditional handover may include a first security configuration and thus to force the UE to update the key, e.g., to generate a new AS master key and the subsequent keys. Generation of the new AS master key, which is a form of key update, is reflected by act 30-9. As described in the previous example scenario of FIG. 29, the UE may generate the AS master key by either the horizontal key derivation or the vertical key derivation based on the value of NCC included in RRCReconfiguration, and the saved (currently used) NCC.

Similar to Example Scenario 5-1, in a case that as act 30-9 the UE derives a new master key due to the non-conditional inter-gNB handover, any second security configuration that the UE received in the CHO configurations may become invalid, which may result in invalidating the CHO configurations for all of the candidate target cell(s). The UE may release the saved CHO configurations. Likewise, as shown by act 30-10, the Source Cell may send the CHO/HO cancellation command to each of the each of the gNBs that control the candidate target cell(s). Thereafter the UE may engage in a random access procedure to cell B, as shown by the Random Access Preamble, the Random Access Response, and the RRCReconfigurationComplete message of respective acts 30-11 through 30-13, respectively.

Example Scenario 5-3: Key Change-On-the-Fly

In some cases, the network, e.g., the gNB or a core network entity, such as AMF, may initiate a key update. This procedure may be also known as an intra-cell handover without mobility, or key change/update-on-the-fly procedure. There are two types of network-initiated key update-on-the-fly procedures:

A Key re-keying procedure may be initiated by the currently serving AMF. The AMF may create a new $K_{gNB}$ from the current $K_{AMF}$ using a fresh uplink NAS COUNT (a counter handled by the Non-Access Stratum (NAS) layer, shared by the UE and the AMF). The derived $K_{gNB}$ may be sent to the currently serving gNB, which may then send an RRC message (e.g. RRCReconfiguration) comprising (1) an indication indicating a need to generate a fresh $K_{AMF}$ (e.g. a field K_AMF_change_flag included in nas-Container) and/or (2) indication indicating a need to generate a fresh $K_{gNB}$ based on the $K_{AMF}$ (e.g. KeySetChangeIndicator=TRUE).

A Key refresh procedure may be initiated by the currently serving gNB. The gNB may generate a new $K_{gNB}$ from NH if an unused {NH, NCC} pair is available, given by the AMF, i.e. vertical derivation. Otherwise the currently serving gNB may generate a new $K_{gNB}$ from the currently used $K_{gNB}$, i.e., horizontal derivation. The gNB may then send an RRC message, e.g. RRCReconfiguration, including NCC and KeySetChangeIndicator=FALSE. The UE receiving the RRC message may generate a new $K_{gNB}$ with either the vertical or horizontal derivation, based on the received NCC value and the saved NCC value.

Figure 31:
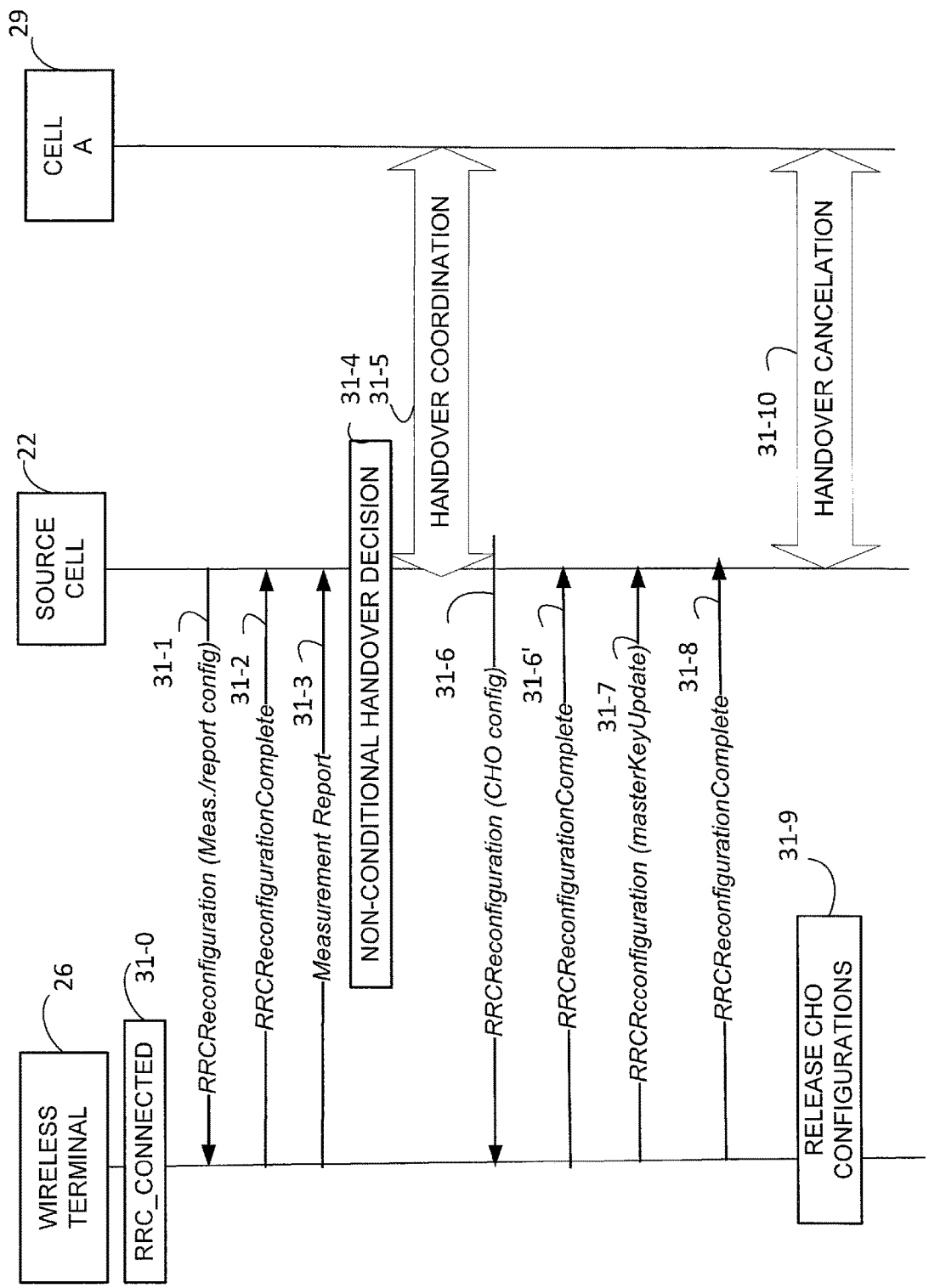
FIG. 31 shows differing scenario of in which conditional handover configurations need to be released or can be preserved.

FIG. 31 illustrates an example scenario, wherein after configuring the CHO to a candidate target cell (Cell A), as act 31-7 the currently serving cell (Source Cell) may send a RRCReconfiguration message including a masterKeyUpdate information element comprising at least a value for the NCC and KeySetChangeIndicator. The US then then may respond with a RRCReconfigurationComplete message as shown by act 31-8. As act 31-9 the UE may then release all of the CHO configurations, e.g., CHO configuration for Cell A and others, if any. In parallel, as act 31-10 the Source Cell may initiate a HO cancellation procedure to release the reserved CHO coordination in the candidate target cell(s), e.g., Cell A. In the example scenario of FIG. 31, act 31-0 through 31-6 are essentially the same as comparable acts of other scenarios, such as act 29-0 through 29-6'.

Example Scenario 5-4: Intra-gNB Handover

Figure 32:
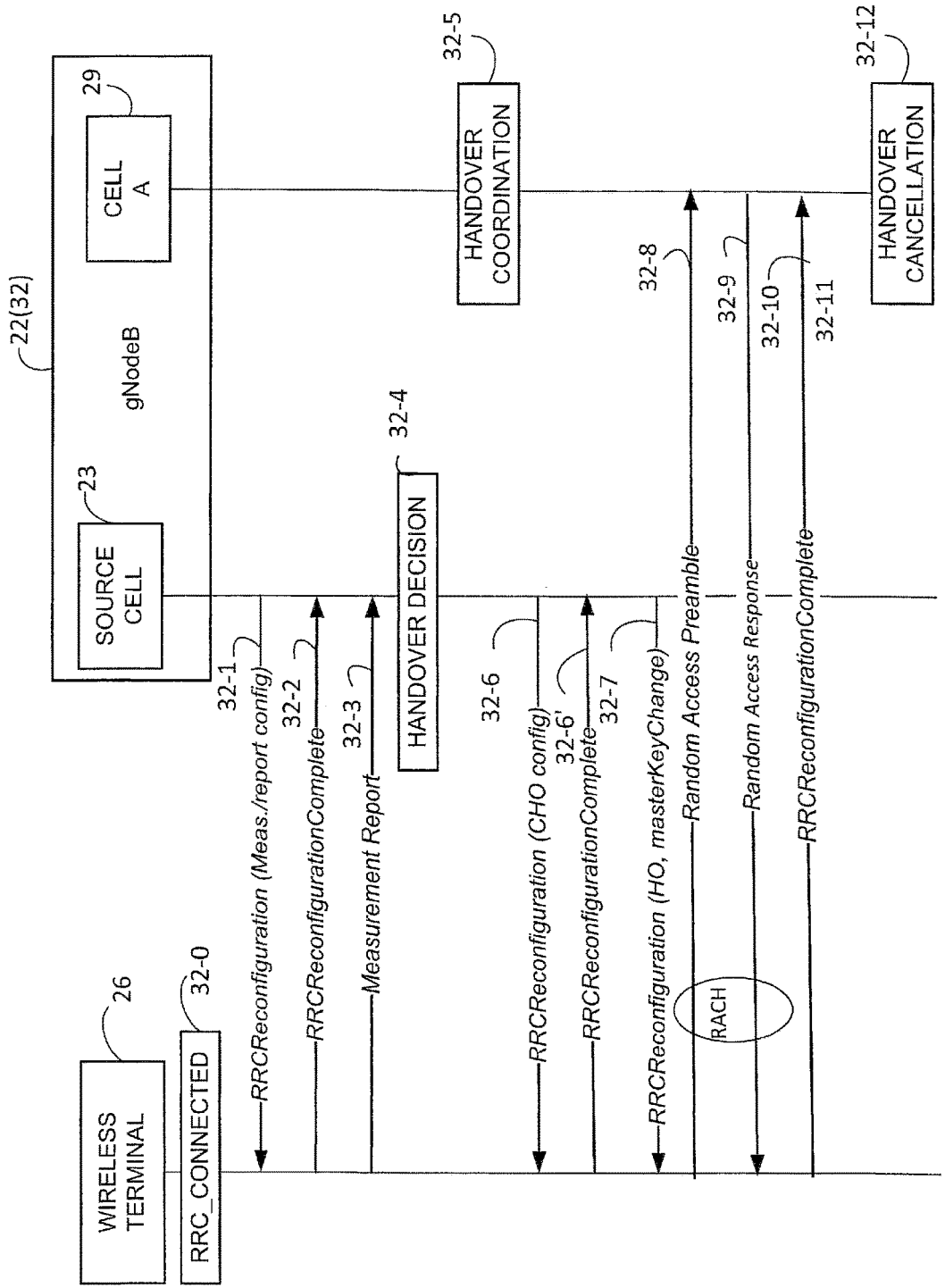
FIG. 32 shows differing scenario of in which conditional handover configurations need to be released or can be preserved.

An intra-gNB/eNB handover is a handover between two cells controlled by one gNB 22(32). As shown in FIG. 32, the handover may be between source cell 23 and cell A, also known as cell 29. In the example scenario of FIG. 32, it is assumed that the UE has already been configured with the CHO configurations with one or more candidate target cells. In other words, act 32-0 through 32-6, which are essentially the same as act 29-0 through 29-6', respectively, have already been executed. Act 32-4 shows that the gNB 22(32) had made a handover decision for a handover to cell A 29. As a result, cell A performs handover coordination as shown by act 32-5. In the example scenario of FIG. 32, however, a key update on $K_{gNB}$ may take place upon the intra-gNB handover. In other words, act 32-7 shows that in a message advising of handover that an information element such as masterKeyChange is included and provides the key update on $K_{gNB}$. After receipt of the message advising of handover, a RACH procedure is performed as reflected by the RandomAccess Preamble message of act 32-8 and the RandomAccessResponse message of act 32-9. Thereafter, after the UE sends the RRCReconfigurationComplete message of act 32-11, the cell A 29 may cancel the conditional handover coordination, if previously configured, by engaging in handover cancellation act 32-12.

In other deployment scenarios, the network operation policy may allow to keep using the same $K_{gNB}$ and the subsequent keys after the intra-gNodeB handover.

In the example intra-gNB scenarios described herein it is assumed that the UE has already been configured with the CHO configurations with one or more candidate target cells. In other words, act 32-0 through 32-7, which are essentially the same as act 29-0 through 29-7, respectively, have already been executed. Upon successfully performing a handover to a target cell, which may be one of the candidate target cells (for a conditional handover) or may be another cell (for a non-conditional handover), if the UE is allowed to use the current $K_{gNB}$ and the subsequent keys, the UE of this embodiment and mode may preserve (not release) the CHO configurations. In this case, the gNB may also keep the CHO configurations as valid configurations. Although the UE/gNB may just release the CHO configuration for the target cell to which the UE successfully performed a conditional handover, and may preserve the remaining CHO configurations. On the other hand, if a key update is required, the UE/gNB may release all the CHO configurations upon performing the handover in the same manner as previously disclosed for the inter-gNB handover.

For example, consider that the CHO configurations contain Cell A and Cell B as candidate target cells, both of Cell A and Cell B being under control of one gNB, and no key update is required for Cell A or Cell B. If the UE successfully performs a conditional handover to Cell A, the UE/gNB may keep the CHO configuration for Cell B while releasing the CHO configuration for Cell A. The CHO configuration for Cell A may be released because the prospectively allocated radio resource(s) for the UE at Cell A may be no longer reserved after the conditional handover. Furthermore, if the UE, before executing a conditional handover to Cell A or Cell B, successfully performs a non-conditional handover to Cell C, which is also under control of the gNB but not a candidate target cell, the UE/gNB may keep the CHO configurations for Cell A and Cell B after the non-conditional handover.

In one configuration, the UE may determine if the current $K_{gNB}$ is to be used after a handover (and therefore the CHO configurations can be preserved) by the presence of the first or second security configuration. Accordingly, if a candidate target cell configured in the CHO configurations is associated with a second security configuration, the UE may consider that a key update is needed for a handover to the candidate target cell. On the other hand, if a second security configuration is not associated with the candidate target cell, the UE may perform no key update after a handover to the cell. Furthermore, in a case that the UE receives a handover command (e.g. RRCReconfiguration) from the currently serving gNB (i.e. a regular handover, or a non-CHO handover), if the handover command comprises a first security configuration, the UE may perform a key update to generate a fresh $K_{gNB}$, otherwise, the UE will continue using the current key after the handover.

Figure 33:
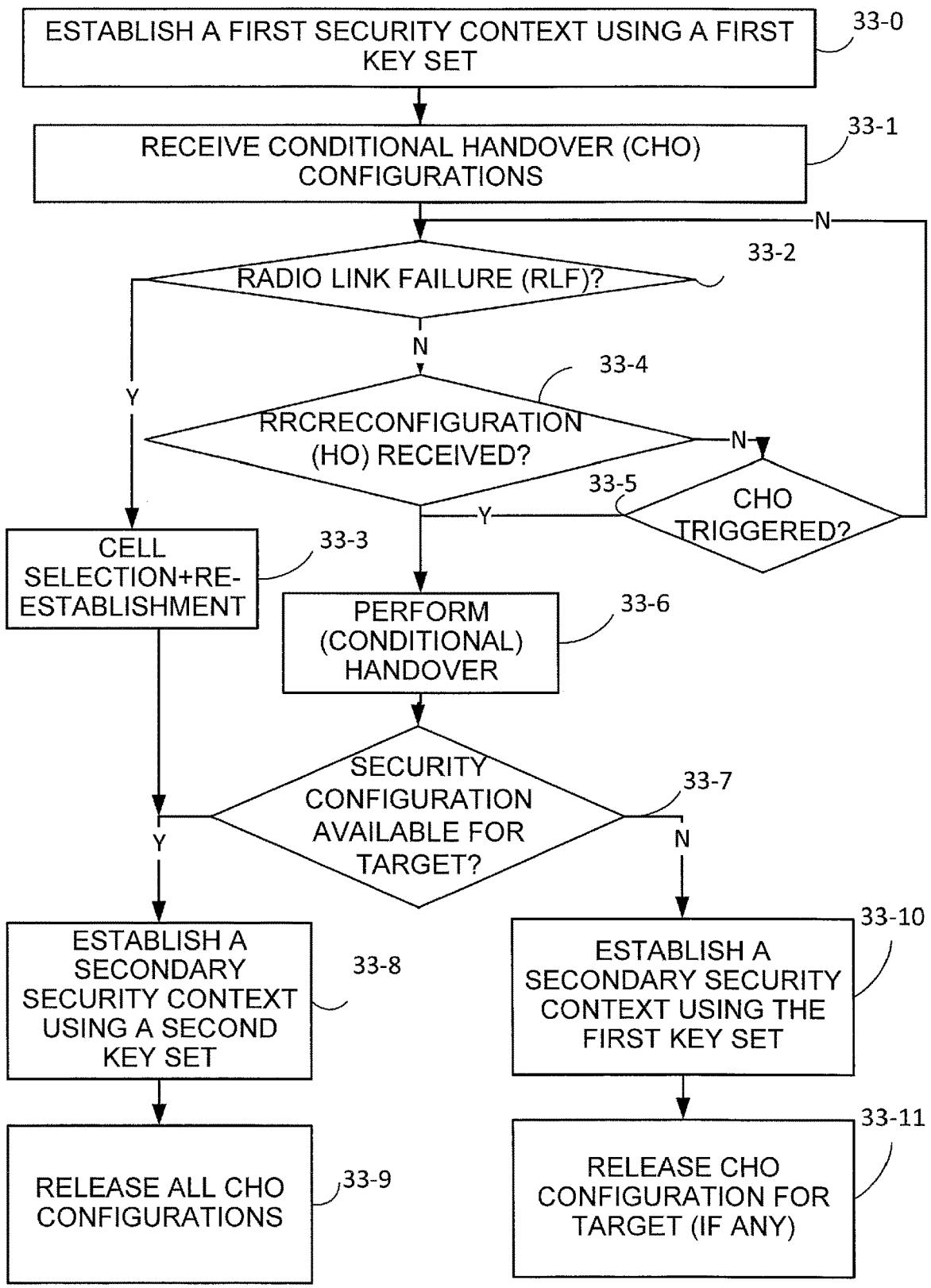
FIG. 33 shows differing scenario of in which conditional handover configurations need to be released or can be preserved.

FIG. 33 illustrates an example UE procedure, e.g., a procedure performed by terminal processor 40 of FIG. 28, Act 33-0 comprises the UE establishing a first security context with a first (source) gNB, using a first key set.

Act 33-1 comprises the UE receiving the CHO configurations from the first gNB.

Act 33-2 comprises the UE checking if it is experiencing a radio link failure (RLF).

Act 33-3 comprises the UE performing a cell selection procedure. After a successful selection, the UE performs the re-establishment procedure, which will result in receiving from a target cell RRCReestablishment comprising security configuration for the target cell.

Act 33-4 comprises the UE checking if it received RRCReconfiguration from the currently serving gNB, which may trigger an intra-cell, intra-gNB or inter-gNB handover.

Act 33-5 comprises the UE checking if one of the triggering conditions configured in the CHO configurations is met.

Act 33-6 comprises the UE performing a non-conditional or conditional handover.

For the non-conditional handover, the UE follows the configuration of the target cell given by the received RRCReconfiguration. For the conditional handover, the UE follows the configuration of the candidate target cell for which the triggering condition is met.

Act 33-7 comprises the UE checking if security configuration is available, which forces the UE to generate a fresh $K_{gNB}$ (or $K_{eNB}$) and the subsequent keys (a second key set). In the case of the regular handover, the security configuration may be optionally present in the received RRCReconfiguration. In the case of the conditional handover, the security configuration for the target cell may be optionally present in the CHO configurations.

Act 33-8 comprises the UE establishing a second security context using the second key set.

Act 33-9 comprises the UE releasing all the CHO configurations.

Act 33-10 comprises the UE establishing a second security context using the first key set.

Act 33-11 comprises the UE releasing CHO configuration only for the target cell and preserve the CHO configurations for other candidate target cells.

Figure 34:
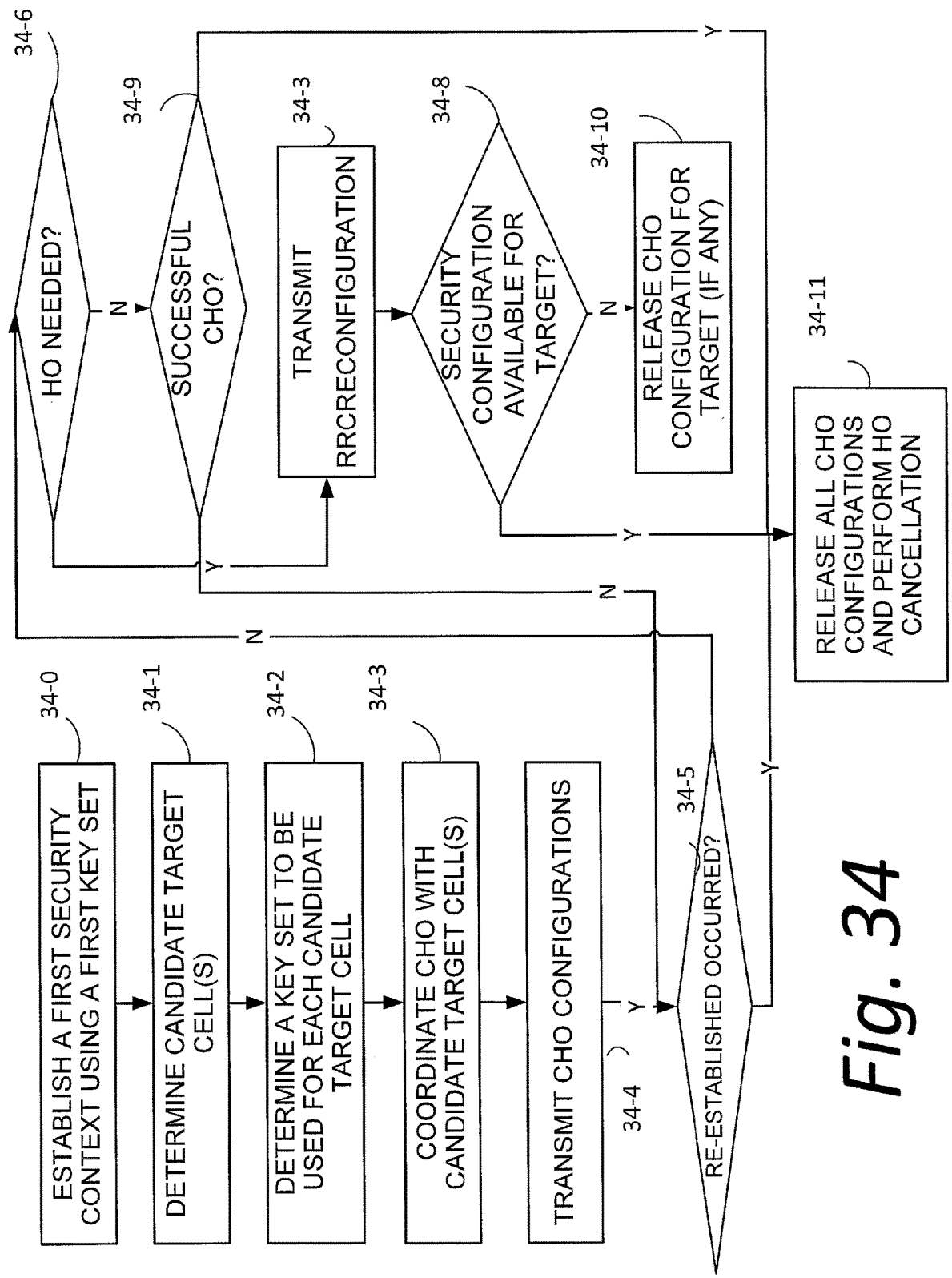
FIG. 34 shows differing scenario of in which conditional handover configurations need to be released or can be preserved.

FIG. 34 shows an example procedure performed by a source gNodeB 22, e.g., a currently serving gNB, for the example embodiment and mode of FIG. 28.

Act 34-0 comprises the gNB establishing a first security context with a UE, using a first key set.

Act 34-1 comprises the gNB determining candidate target cell(s) for CHO to be configured to the UE.

Act 34-2 comprises the gNB determining, for each of the candidate target cell(s), a key set to be used, either the first key set or a new key set.

Act 34-3 comprises, for each of the candidate target cell(s), the gNB prospectively performing a handover coordination with a node that controls the each of the candidate target cell(s).

Act 34-4 comprises the gNB transmitting CHO configurations to the UE. The CHO configurations comprise resource configuration, triggering condition(s) and optional security configuration for each of the candidate target cell(s).

Act 34-5 comprises the gNB checking if the UE has performed the re-establishment procedure (due to an RLF). The gNB can recognize the presence of the re-establishment procedure initiated by the UE when it receives a UE context retrieval request received from another node (inter-gNB re-establishment), or RRCReestablishmentRequest from the UE (intra-gNB re-establishment).

Act 34-6 comprises the gNB determining if a (non-conditional) handover is needed. This handover may be either an intra-cell, intra-gNB or inter-gNB handover.

Act 34-7 comprises the gNB transmitting RRCReconfiguration to trigger the (non-conditional) handover for the UE.

Act 34-8 comprises the gNB checking if the (non-conditional) handover is associated with a security configuration.

Act 33-9 comprises the gNB checking if the UE has successfully performed a conditional handover to one of the candidate target cell(s). The gNB can recognize a successful conditional handover if it receives a CHO success notification from one of the other gNBs (inter-gNB CHO) or it receives RRCReconfigurationComplete from one of the candidate target cell(s) under control of the (currently serving) gNB.

Act 34-10 comprises the gNB releasing all the CHO configurations configured to the UE, and performs handover cancellation for all the other gNBs.

Act 34-11 comprises the gNB releasing the CHO configuration for the target cell of the (non-conditional) handover, if the target cell is one of the candidate target cell(s).

In the example embodiment and mode of FIG. 28, the source gNodeB 22 comprises node processor 30 and node transmitter 34. The node processor 30, and particularly first security context generator 91, is configured to establish, using a first key set, a first security context with the wireless terminal 26. The node transmitter 34 is configured to transmit a configuration message comprising one or more conditional handover configurations. Each of the one or more conditional handover configurations may comprise at least one identity of a candidate target cell, and at least one triggering condition. The node processor 30, for example node conditional handover validity checker 97, is configured to determine, upon the wireless terminal performing a handover to a target cell, validity of the conditional handover configurations, based on whether or not the handover to the target cell is configured with a security configuration. The node processor 30, for example second key set generator 92(28), is further configured to use the security configuration to derive a second key set for establishing a second security context between the wireless terminal and a second wireless access node that serves the target cell.

Figure 35:
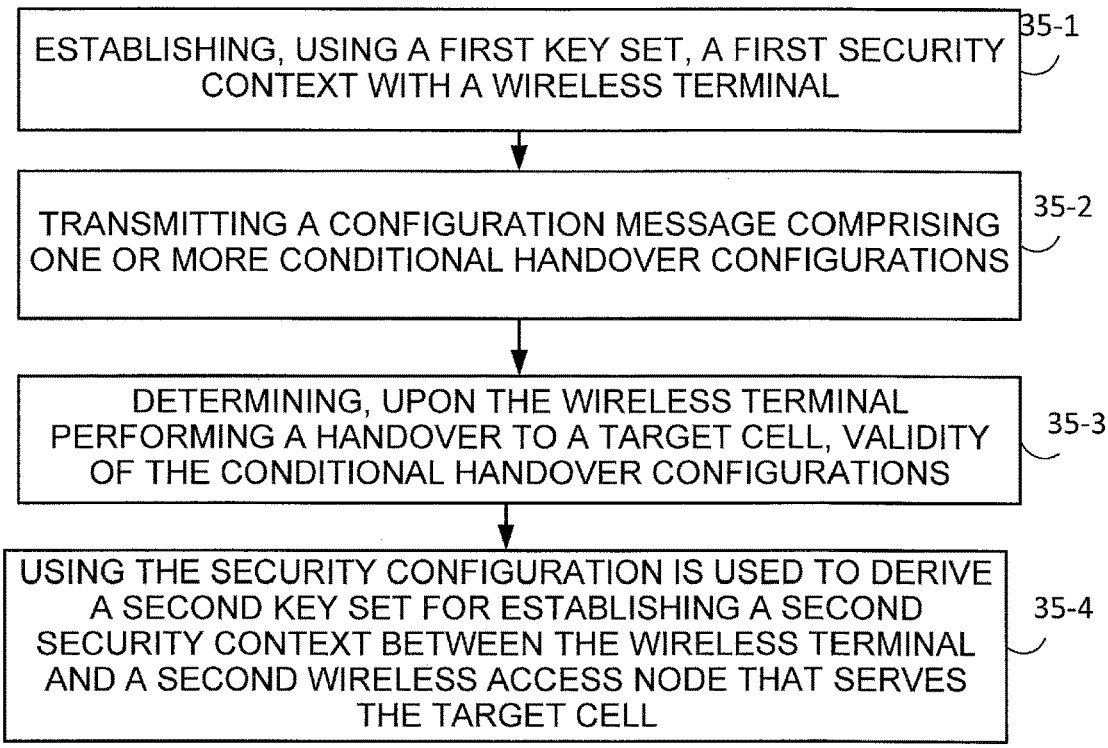
FIG. 35 is a flowchart showing example, basic, representative acts performed by a source gNodeB of the example embodiment and mode of FIG. 28.

Thus, the source gNodeB 22 of FIG. 28 performs example, basic, representative acts of steps as shown in FIG. 35. Act 35-1 comprises establishing a first security context with a wireless terminal using a first key set. Act 35-2 comprises transmitting a configuration message comprising one or more conditional handover configurations. Each of the one or more conditional handover configurations may comprise at least one identity of a candidate target cell, and at least one triggering condition. Act 35-3 comprises determining, upon the wireless terminal performing a handover to a target cell, validity of the conditional handover configurations, based on whether or not the handover to the target cell is configured with a security configuration. Act 35-4 comprises using the security configuration to derive a second key set for establishing a second security context between the wireless terminal and a second wireless access node that serves the target cell.

In the example embodiment and mode of FIG. 28, the wireless terminal 26, sometimes referred to as the UE, comprises terminal processor 40 and terminal receiver 46. The terminal processor 40 of terminal processor 40, and particularly terminal security context manager 94, is configured to establish, using a first key set, a first security context with a first wireless access node. The terminal receiver 46 is configured to receive the configuration message comprising one or more conditional handover configurations. The terminal processor 40, e.g., handover unit 72, is configured to perform a handover to a target cell. The terminal processor 40, for example, terminal conditional handover validity checker 98, is configured to determine validity of the conditional handover configurations, based on whether or not the handover to the target cell is configured with a security configuration. The terminal processor 40 is further configured, e.g., using terminal second key generator 96(28), to use the security configuration to derive a second key set for establishing a second security context with a second wireless access node that serves the target cell.

Figure 36:
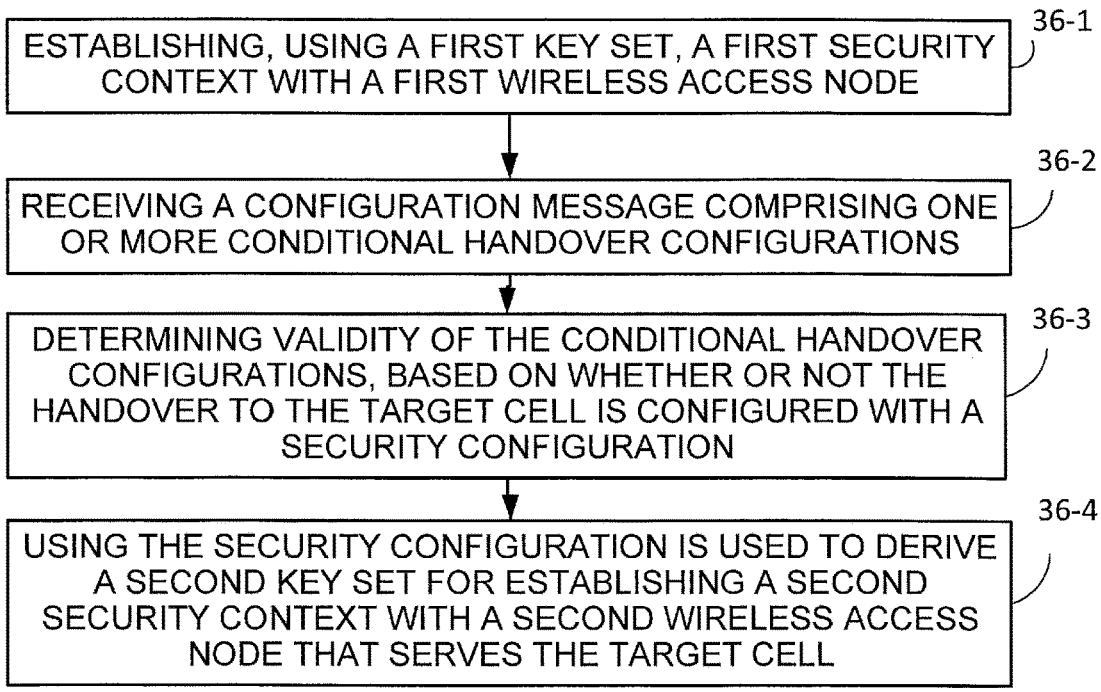
FIG. 36 is a flowchart showing example, basic, representative acts performed by a wireless terminal of the example embodiment and mode of FIG. 28.

Thus, the wireless terminal 26 of FIG. 28 performs example, basic, representative acts of steps as shown in FIG. 36. Act 36-1 comprises establishing, using a first key set, a first security context with a first wireless access node. Act 36-2 comprises receiving a configuration message comprising one or more conditional handover configurations. Each of the one or more conditional handover configurations may comprise at least one identity of a candidate target cell, and at least one triggering condition. Act 36-3 comprises determining validity of the conditional handover configurations, based on whether or not the handover to the target cell is configured with a security configuration. Act 36-4 comprises using the security configuration to derive a second key set for establishing a second security context with a second wireless access node that serves the target cell.

The technology disclosed herein thus proposes, e.g., methods and apparatus for a UE to handle measurement reports associated with conditional handover configurations. Specifically:

- The UE may suppress measurement reports for cells configured as candidate target cells for conditional handovers. The suppression may be configured by the gNB of the serving cell.
- The UE may continue measurement reports in a periodic manner for cells configured as candidate target cells for conditional handovers. The periodicity may be configured by the gNB of the serving cell.
- The gNB may configure the UE with leaving condition(s) associated with conditional handover configurations. The UE may discard the conditional handover configurations when some of the leaving condition(s) is/are met.
- The conditional handover configurations may be associated with a second security configuration(s). The security configuration(s) may be used for establishing a security context after performing a conditional handover.
- The conditional handover configurations may be released upon a mobility event, such as a handover and re-establishment, based on the second security configurations, and a first security configuration configured for the mobility event.

Figure 37:
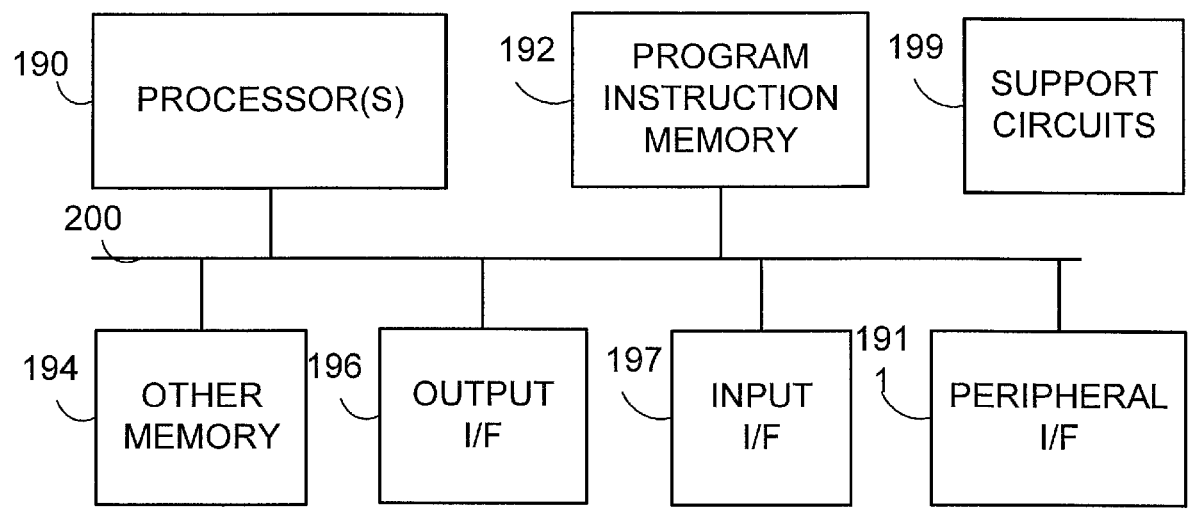
FIG. 37 is a diagrammatic view showing example elements comprising electronic machinery which may comprise a wireless terminal, a radio access node, and a core network node according to an example embodiment and mode.

Certain units and functionalities of the systems 20 may be implemented by electronic machinery. For example, electronic machinery may refer to the processor circuitry described herein, such as node processor(s) 30, and terminal processor(s) 40. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 37 shows an example of electronic machinery, e.g., processor circuitry, as comprising one or more processors 190, program instruction memory 192; other memory 194 (e.g., RAM, cache, etc.); input/output interfaces 196 and 197, peripheral interfaces 198; support circuits 199; and busses 200 for communication between the aforementioned units. The processor(s) 190 may comprise the processor circuitries described herein, for example, node processor(s) 30 and terminal processor(s) 40.

An memory or register described herein may be depicted by memory 194, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 199 are coupled to the processors 190 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the node processor 30 and terminal processor 40 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alter-natively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The technologies of the various example embodiments and modes described herein may be implemented either singly or in combination with one another. For example, one or more features of the example embodiment and mode of FIG. 6, one or more features of the example embodiment and mode of FIG. 11, one or more features of the example embodiment and mode of FIG. 15, one or more features of the example embodiment and mode of FIG. 19, and one or more features of the example embodiment and mode of FIG. 28 may be combined for use with one or more of each other.

It will be appreciated that the technology disclosed herein is directed to solving radio communications-centric issues and is necessarily rooted in computer technology and overcomes problems specifically arising in radio communications. Moreover, the technology disclosed herein improves basic function of a measurement reporting in a situation of a conditional handover, e.g., methods and procedures to deal with problematic issues such as governing or controlling for which candidate target gNodeB(s) measurement results should be reported, in order to operate the network 20 effectively and to reduce congestion in such operation.

The technology disclosed herein encompasses one or more of the following non-limiting, non-exclusive example embodiments and modes:

Example Embodiment 1: A wireless terminal comprising: receiver circuitry configured to receive a configuration message comprising one or more conditional handover configurations, each of the one or more conditional handover configurations comprising at least one identity of a candidate target cell, and at least one triggering condition; processor circuitry configured: to establish, using a first key set, a first security context with a first wireless access node; to perform a conditional handover to a candidate target cell configured by one of the one or more conditional handover configurations, in a case that the at least one triggering condition associated with the candidate target cell is met; to establish a second security context with a second wireless access node that serves the candidate target cell, based on whether or not a security configuration associated with the candidate target cell is configured by the configuration message.

Example Embodiment 2: The wireless terminal of Example Embodiment 1, wherein, in a case that the security configuration is configured, the second security context is established using a second key set derived from the security configuration.

Example Embodiment 3: The wireless terminal of Example Embodiment 1, wherein, in a case that the security configuration is not configured, the second security context is established using the first key set.

Example Embodiment 4: The wireless terminal of Example Embodiment 1, wherein the security configuration is associated with more than one conditional handover configuration.

Example Embodiment 5: A wireless access node comprising processor circuitry configured: to establish, using a first key set, a first security context with a wireless terminal; to generate a configuration message comprising: one or more conditional handover configurations, each of the one or more conditional handover configurations comprising at least one identity of a candidate target cell, and at least one triggering condition, wherein; an indication, by whether or not each of the one or more conditional handover configurations is configured with a security configuration, of a key set to be used by a wireless terminal to establish a second security context upon or after a handover configured by the each of the one or more conditional handover configurations; transmitter circuitry configured to transmit the configuration message to the wireless terminal.

Example Embodiment 6: The wireless access node of Example Embodiment 5, wherein, in a case that the security configuration is configured, the second security context is established using a second key set derived from the security configuration.

Example Embodiment 7: The wireless terminal of Example Embodiment 5, wherein, in a case that the security configuration is not configured, the second security context is established using the first key set.

Example Embodiment 8: The wireless terminal of Example Embodiment 5, wherein the security configuration is associated with more than one conditional handover configuration.

Example Embodiment 9: A method for a wireless terminal comprising: establishing, using a first key set, a first security context with a first wireless access node; receiving a configuration message comprising one or more conditional handover configurations, each of the one or more conditional handover configurations comprising at least one identity of a candidate target cell, and at least one triggering condition; performing a conditional handover to a candidate target cell configured by one of the one or more conditional handover configurations, in a case that the at least one triggering condition associated with the candidate target cell is met; establishing a second security context with a second wireless access node that serves the candidate target cell, based on whether or not a security configuration associated with the candidate target cell is configured by the configuration message.

Example Embodiment 10: The method of Example Embodiment 9, wherein, in a case that the security configuration is configured, the second security context is established using a second key set derived from the security configuration.

Example Embodiment 11: The method of Example Embodiment 9, wherein, in a case that the security configuration is not configured, the second security context is established using the first key set.

Example Embodiment 12: The method of Example Embodiment 9, wherein the security configuration is associated with more than one conditional handover configuration.

Example Embodiment 13: A method for a wireless access node comprising: establishing, using a first key set, a first security context with a wireless terminal; using processor circuitry to generate a configuration message comprising: one or more conditional handover configurations, each of the one or more conditional handover configurations comprising at least one identity of a candidate target cell, and at least one triggering condition, wherein; an indication, by whether or not one of the one or more conditional handover configurations is configured with a security configuration, of a key set to be used by a wireless terminal to establish a second security context upon or after a handover configured by the each of the one or more conditional handover configurations; transmitting the configuration message to the wireless terminal.

Example Embodiment 14: The method of Example Embodiment 13, wherein, in a case that the security configuration is configured, the second security context is established using a second key set derived from the security configuration.

Example Embodiment 14: The method of Example Embodiment 13, wherein, in a case that the security configuration is not configured, the second security context is established using the first key set.

Example Embodiment 16: The method of Example Embodiment 13, wherein the security configuration is associated with more than one conditional handover configuration.

Example Embodiment 17: A wireless terminal comprising: processor circuitry configured to establish, using a first key set, a first security context with a first wireless access node; receiver circuitry configured to receive a configuration message comprising one or more conditional handover configurations, each of the one or more conditional handover configurations comprising at least one identity of a candidate target cell, and at least one triggering condition; wherein the processor circuitry is further configured: to perform a handover to a target cell; to determine validity of the conditional handover configurations, based on whether or not the handover to the target cell is configured with a security configuration, and to use the security configuration to derive a second key set for establishing a second security context with a second wireless access node that serves the target cell.

Example Embodiment 18: The wireless terminal of Example Embodiment 17, wherein, in a case that the handover to the target cell is configured with the security configuration, the conditional handover configurations are invalid and are released upon or after the handover to the target cell.

Example Embodiment 19: The wireless terminal of Example Embodiment 18, wherein the handover to the target cell is triggered by receiving a handover command from the first wireless access node, and the security configuration is configured by the handover command.

Example Embodiment 20: The wireless terminal of Example Embodiment 18, wherein the handover to the target cell is a conditional handover configured by one of the conditional handover configurations, and the security configuration is configured for the one of the conditional handover configurations.

Example Embodiment 21: The wireless terminal of Example Embodiment 17, wherein, in a case that the handover to the target cell is not configured with the security configuration, the conditional handover configurations are valid and are to be used after the handover to the target cell.

Example Embodiment 22: The wireless terminal of Example Embodiment 21, wherein the handover to the target cell is triggered by receiving a handover command from the first wireless access node, and the security configuration is not configured by the handover command.

Example Embodiment 23: The wireless terminal of Example Embodiment 22, wherein the conditional handover configuration for the target cell is released.

Example Embodiment 24: The wireless terminal of Example Embodiment 21, wherein the handover to the target cell is a conditional handover configured by one of the conditional handover configurations, and the security configuration is configured for the one of the conditional handover configurations.

Example Embodiment 25: The wireless terminal of Example Embodiment 21, wherein the first key set is used for the second security context.

Example Embodiment 26: A wireless access node comprising processor circuitry configured to establish a first security context with a wireless terminal using a first key set; transmitter circuitry configured to transmit a configuration message comprising one or more conditional handover configurations, each of the one or more conditional handover configurations comprising at least one identity of a candidate target cell, and at least one triggering condition; wherein the processor circuitry is further configured: to determine, upon the wireless terminal performing a handover to a target cell, validity of the conditional handover configurations, based on whether or not the handover to the target cell is configured with a security configuration, and to use the security configuration to derive a second key set for establishing a second security context between the wireless terminal and a second wireless access node that serves the target cell.

Example Embodiment 27: The wireless access node of Example Embodiment 26, wherein, in a case that the handover to the target cell is configured with the security configuration, the conditional handover configurations are invalid and are released upon or after detecting the handover to the target cell, and a handover cancellation process is initiated for the candidate target cell of each of the conditional handover configurations.

Example Embodiment 28: The wireless access node of Example Embodiment 27, wherein the handover to the target cell is triggered by transmitting a handover command, and the security configuration is configured by the handover command.

Example Embodiment 29: The wireless access node of Example Embodiment 27, wherein the handover to the target cell is a conditional handover configured by one of the conditional handover configurations, and the security configuration is configured for the one of the conditional handover configurations.

Example Embodiment 30: The wireless access node of Example Embodiment 26, wherein, in a case that the handover to the target cell is not configured with the security configuration, the conditional handover configurations are valid and are to be used after the handover to the target cell.

Example Embodiment 31: The wireless access node of Example Embodiment 30, wherein the handover to the target cell is triggered by transmitting a handover command, and the security configuration is not configured by the handover command.

Example Embodiment 32: The wireless access node of Example Embodiment 31, wherein the conditional handover configuration for the target cell is released.

Example Embodiment 33: The wireless access node of Example Embodiment 30, wherein the handover to the target cell is a conditional handover configured by one of the conditional handover configurations, and the security configuration is configured for the one of the conditional handover configurations.

Example Embodiment 34: The wireless access node of Example Embodiment 30, wherein the first key set is used for the second security context.

Example Embodiment 35: A method for a wireless terminal comprising: establishing, using a first key set, a first security context with a first wireless access node; receiving a configuration message comprising one or more conditional handover configurations, each of the one or more conditional handover configurations comprising at least one identity of a candidate target cell, and at least one triggering condition; performing a handover to a target cell; determining validity of the conditional handover configurations, based on whether or not the handover to the target cell is configured with a security configuration, and; using the security configuration to derive a second key set for establishing a second security context with a second wireless access node that serves the target cell.

Example Embodiment 36: The method of Example Embodiment 35, wherein, in a case that the handover to the target cell is configured with the security configuration, the conditional handover configurations are invalid and are released upon or after the handover to the target cell.

Example Embodiment 37: The method of Example Embodiment 35, wherein, in a case that the handover to the target cell is not configured with the security configuration, the conditional handover configurations are valid and are to be used after the handover to the target cell.

Example Embodiment 38: The method of Example Embodiment 36, wherein the handover to the target cell is triggered by receiving a handover command from the first wireless access node, and the security configuration is configured by the handover command.

Example Embodiment 39: The method of Example Embodiment 36, wherein the handover to the target cell is a conditional handover configured by one of the conditional handover configurations, and the security configuration is configured for the one of the conditional handover configurations.

Example Embodiment 40: The method of Example Embodiment 36, wherein the handover to the target cell is triggered by receiving a handover command from the first wireless access node, and the security configuration is not configured by the handover command.

Example Embodiment 41: The method of Example Embodiment 36, wherein the handover to the target cell is a conditional handover configured by one of the conditional handover configurations, and the security configuration is configured for the one of the conditional handover configurations.

Example Embodiment 42: The method of Example Embodiment 36, wherein the first key set is used for the second security context.

Example Embodiment 43: The method of Example Embodiment 40, wherein the conditional handover configuration for the target cell is released.

Example Embodiment 44: A method for a wireless access node comprising: establishing a first security context with a wireless terminal using a first key set; transmitting a configuration message comprising one or more conditional handover configurations, each of the one or more conditional handover configurations comprising at least one identity of a candidate target cell, and at least one triggering condition; determining, upon the wireless terminal performing a handover to a target cell, validity of the conditional handover configurations, based on whether or not the handover to the target cell is configured with a security configuration, and; using the security configuration to derive a second key set for establishing a second security context between the wireless terminal and a second wireless access node that serves the target cell.

Example Embodiment 45: The method of Example Embodiment 44, wherein, in a case that the handover to the target cell is configured with the security configuration, the conditional handover configurations are invalid and are released upon or after detecting the handover to the target cell, and a handover cancellation process is initiated for the candidate target cell of each of the conditional handover configurations.

Example Embodiment 46: The method of Example Embodiment 44, wherein, in a case that the handover to the target cell is not configured with the security configuration, the conditional handover configurations are valid and are to be used after the handover to the target cell.

Example Embodiment 47: The method of Example Embodiment 45, wherein the handover to the target cell is triggered by transmitting a handover command, and the security configuration is configured by the handover command.

Example Embodiment 48: The method of Example Embodiment 45, wherein the handover to the target cell is a conditional handover configured by one of the conditional handover configurations, and the security configuration is configured for the one of the conditional handover configurations.

Example Embodiment 49: The method of Example Embodiment 46, wherein the handover to the target cell is triggered by transmitting a handover command, and the security configuration is not configured by the handover command.

Example Embodiment 50: The method of Example Embodiment 46, wherein the handover to the target cell is a conditional handover configured by one of the conditional handover configurations, and the security configuration is configured for the one of the conditional handover configurations.

Example Embodiment 51: The method of Example Embodiment 46, wherein the first key set is used for the second security context.

Example Embodiment 52: The method of Example Embodiment 49, wherein the conditional handover configuration for the target cell is released.

Example Embodiment 53: A wireless terminal comprising: receiver circuitry configured to receive a reconfiguration message comprising one or more conditional handover configurations, each of the one or more conditional handover configurations comprising an identity of a candidate target cell, and at least one triggering condition; processor circuitry configured: to detect a radio link failure, and; to initiate, based on the radio link failure, a cell selection to select a cell; transmitter circuitry configured to transmit, upon selecting the cell, a re-establishment request message; wherein in a case that the identity of the cell is not included in the one or more conditional handover configurations, the one or more conditional handover configurations are released.

Example Embodiment 54: The wireless terminal of Example Embodiment 53, wherein, in a case that the identity of the cell is included in one of the one or more conditional handover configurations, the one of the one or more conditional handover configurations is used to execute a handover to the cell.

Example Embodiment 55: A wireless access node comprising: processor circuitry configured to generate a reconfiguration message comprising one or more conditional handover configurations, each of the one or more conditional handover configurations comprising an identity of a candidate target cell, and at least one triggering condition, and; transmitter circuitry configured to transmit, to a wireless terminal, the reconfiguration message; wherein in a case that a cell selection to select a cell, whose identity is not included in the one or more conditional handover configurations, is performed by the wireless terminal after detecting a radio link failure, the one or more conditional handover configurations are released by the wireless terminal.

Example Embodiment 56: The wireless access node of Example Embodiment 55, wherein, in a case that the identity of the cell is included in one of the one or more conditional handover configurations, the one of the one or more conditional handover configurations is used by the wireless terminal to execute a handover to the cell.

Example Embodiment 57: A method for a wireless terminal comprising: receiving a reconfiguration message comprising one or more conditional handover configurations, each of the one or more conditional handover configurations comprising an identity of a candidate target cell, and at least one triggering condition; detecting a radio link failure; initiating, based on the radio link failure, a cell selection to select a cell; transmitting, upon selecting the cell, a re-establishment request message; wherein in a case that the identity of the cell is not included in the one or more conditional handover configurations, the one or more conditional handover configurations are released.

Example Embodiment 58: The method of Example Embodiment 57, wherein, in a case that the identity of the cell is included in one of the one or more conditional handover configurations, the one of the one or more conditional handover configurations is used to execute a handover to the cell.

Example Embodiment 59: A method for a wireless access node comprising: generating a reconfiguration message comprising one or more conditional handover configurations, each of the one or more conditional handover configurations comprising at least one identity of a candidate target cell, and at least one triggering condition; transmitting, to a wireless terminal, the reconfiguration message; wherein in a case that a cell selection to select a cell, whose identity is not included in the one or more conditional handover configurations, is performed by the wireless terminal after detecting a radio link failure, the one or more conditional handover configurations are released by the wireless terminal.

Example Embodiment 60: The method of Example Embodiment 59, wherein, in a case that the identity of the cell is included in one of the one or more conditional handover configurations, the one of the one or more conditional handover configurations is used by the wireless terminal to execute a handover to the cell.

One or more of the following documents may be pertinent to the technology disclosed herein (all of which are incorporated herein by reference in their entirety):

3GPP RAN2 #106 bis Contributions:

| | | |
|---|---|---|
| R2-1905633 | Discussion on failure handling of handover for LTE mobility | OPPO |
| R2-1905635 | Discussion on single/dual active protocol stack | OPPO |
| R2-1905636 | Further details on CHO execution for LTE mobility enhancements | OPPO |
| R2-1905639 | Further details on eMBB-based handover for LTE mobility | OPPO |
| R2-1905641 | Further details on CHO configuration for LTE mobility enhancements | OPPO |
| R2-1905875 | Discussion on conditional handover | SHARP Corporation |
| R2-1905894 | [Draft] LS on data forwarding enhancements to minimize user data interruption during HO | Mediatek Inc. |
| R2-1905948 | Ramaining Issues for LTE Conditional Handover | CMCC |
| R2-1905965 | Signaling procedures of conditional handover | vivo |
| R2-1905966 | Discussion on the number of prepared cells for CHO | vivo |
| R2-1905968 | Discussion on the RLF and HOF for CHO | vivo |
| R2-1905970 | Handover command for conditional handover | vivo |
| R2-1905971 | Conditional handover fall back to normal handover | vivo |
| R2-1905975 | Discussion on the RLF and HOF during non-split bearer handover | vivo |
| R2-1905976 | ROHC procedure for both single and dual active protocol solutions | vivo |
| R2-1905977 | Capability coordination between the source and the target | vivo |
| R2-1905978 | Consideration on the SRB of the non-split bearer handover | vivo |
| R2-1905981 | Solution analysis on the intra-ffequency async scenario | vivo |
| R2-1906126 | Remaining issues for cell level triggers for conditional handover | vivo |
| R2-1906184 | Improved Uplink Power Boosting During Handover | Nokia, Nokia shanghai Bell |
| R2-1906194 | Stage-2 aspects of conditional handover in LTE | Ericsson |
| R2-1906195 | Configuration of conditional handover in LTE | Ericsson |
| R2-1906196 | Triggering of conditional handover in LTE | Ericsson |
| R2-1906197 | Conditional handover execution in LTE | Ericsson |
| R2-1906198 | Deconfiguration of conditional handover in LTE | Ericsson |
| R2-1906199 | Conditional handover failures in LTE | Ericsson |
| R2-1906200 | Suspend while monitoring CHO in LTE | Ericsson |
| R2-1906201 | On Validity Timer for Conditional Handover in LTE | Ericsson |
| R2-1906202 | Security implications of CHO | Ericsson |
| R2-1906203 | Fast RLF triggering based on timer T312 | Ericsson |
| R2-1906204 | Repetition of RRC messages at handover | Ericsson |
| R2-1906205 | RRC connection re-establishment for handover failure recovery | Ericsson |
| R2-1906206 | Measurement reporting overhead reduction based on enhanced event triggering | Ericsson |
| R2-1906207 | RACH-less handover robustness | Ericsson |
| R2-1906237 | LTE conditional handover | Lenovo, Motorola Mobility |
| R2-1906289 | User plane handling for non-split bearer solution | Intel Corporation |
| R2-1906290 | Control plane consideration on simultaneous connectivity | Intel Corporation |
| R2-1906291 | Further consideration on conditional handover | Intel Corporation |
| R2-1906292 | Failure handling on CHO | Intel Corporation |
| R2-1906293 | CHO execution condition | Intel Corporation |
| R2-1906294 | Exit condition for conditional handover | Intel Corporation |
| R2-1906375 | LTE Conditional HO design considerations | Qualcomm Incorporated |
| R2-1906377 | Lossless enhanced Make-Before-Break (MBB) HO support for low latency, high reliability services | Qualcomm Incorporated |
| R2-1906378 | LTE mobility enhancements for eMBB HO using dual active protocol stack | Qualcomm India Pvt Ltd |
| R2-1906379 | LTE Mobility Robustness Enhancements | Qualcomm Incorporated |
| R2-1906380 | UE RF chain requirements to reduce LTE eMBB HO interruption time close to 0 ms | Qualcomm Incorporated |
| R2-1906381 | RRM, RLM and RLF handling during LTE enhanced MBB HO | Qualcomm Incorporated |
| R2-1906382 | On Maximum Number of CHO Candidate Targets | Charter Communications, Inc |
| R2-1906392 | Reducing User Data Interruption during Handover in LTE | InterDigital |

| | | |
|---|---|---|
| R2-1906393 | Triggers for Conditional Handover in LTE | InterDigital |
| R2-1906396 | Details of Conditional Handover Procedure for LTE | InterDigital |
| R2-1906399 | LS on Maximum Number of Candidate Target Cells for Conditional Handover in E-UTRAN | Charter Communications, Inc |
| R2-1906400 | CHO "Bye" Indication on the source link | Charter Communications, Inc |
| R2-1906558 | Data Forwarding Options and Interruption Time | ETRI |
| R2-1906560 | Common Single and Dual Active eMBB Solution | ETRI |
| R2-1906562 | Data Forwarding and Service Interruption in CHO | ETRI |
| R2-1906564 | FFS in Preparation Phase of CHO | ETRI |
| R2-1906566 | FFS in Execution Phase of CHO | ETRI |
| R2-1906640 | Further Consideration of Non-split Bearer Option | CATT |
| R2-1906641 | Consideration on UL New Data Transmission for Single PDCP Entity | CATT |
| R2-1906642 | Further Consideration on CHO Execution and Setting of CHO Execution Condition | CATT |
| R2-1906643 | FFS Issues While Executing CHO Command | CATT |
| R2-1906644 | Handling of Conditional Handover Failure | CATT |
| R2-1906645 | Discussion on UE Behavior When More than One Candidate Cell Meets the Condition | CATT |
| R2-1906662 | LTE Conditional HO failure handling | Qualcomm Incorporated |
| R2-1906752 | Further considerations on conditions and CHO command | NEC |
| R2-1906753 | Source cell signalling during CHO execution | NEC |
| R2-1907105 | Way forward on minimization of HO interruption time | ZTE Corporation, Ericsson, Nokia, Nokia Shanghai Bell, Sanechips |
| R2-1907106 | Discussion on the configuration of CHO candidates | ZTE Corporation, Sanechips |
| R2-1907107 | Discussion on the deconfiguration of CHO candidates | ZTE Corporation, Sanechips |
| R2-1907108 | Discussion on the configuration of CHO execution conditions | ZTE Corporation, Sanechips |
| R2-1907109 | Discussion on the RRC handling during CHO execution | ZTE Corporation, Sanechips |
| R2-1907110 | Stage-3 signalling for CHO | ZTE Corporation, Sanechips |
| R2-1907132 | UP issue on conditional handover | ITRI |
| R2-1907137 | Running 36.300 CR for Conditional Handover | China Telecom |
| R2-1907138 | User plane for non-split dual active protocol stack solution | China Telecom |
| R2-1907139 | Reconfiguration and deconfiguration of CHO | China Telecom |
| R2-1907140 | Remaining Stage-2 details of CHO | China Telecom |
| R2-1907177 | Detail of Conditional Handover | Apple |
| R2-1907178 | Enhancement for Single UL capable UE | Apple |
| R2-1907271 | Mobility robustness for two active protocol stacks solution | Nokia, Nokia Shanghai Bell |
| R2-1907272 | Considerations for failure recovery in LTE | Nokia, Nokia Shanghai Bell |
| R2-1907273 | Simultaneous connectivity handover with single uplink operation | Nokia, Nokia Shanghai Bell |
| R2-1907274 | Conditional Handover in E-UTRAN - simple answers to important questions | Nokia, Nokia Shanghai Bell |
| R2-1907275 | Conditional Handover in E-UTRAN - simultaneous expiry, timers and RRC configuration | Nokia, Nokia Shanghai Bell |
| R2-1907276 | Conditional Handover in E-UTRAN - other aspects | Nokia, Nokia Shanghai Bell |
| R2-1907277 | Enhanced signalling for single active protocol stack solution | Nokia, Nokia Shanghai Bell |
| R2-1907278 | Mobility robustness for single active protocol stack solution | Nokia, Nokia Shanghai Bell |
| R2-1907305 | User plane aspects of Make-Before-Break for dual active protocol stacks | Ericsson |
| R2-1907306 | Enhancements to Make-Before-Break for single active protocol stack | Ericsson |
| R2-1907307 | User plane aspects of Make-Before-Break for single active protocol stack | Ericsson |
| R2-1907308 | Comparison of interruption time in single and dual active protocol stack solution | Ericsson |
| R2-1907309 | Data forwarding at reduced handover interruption | Ericsson |
| R2-1907310 | Enhancements to Make-Before-Break for dual active protocol stacks | Ericsson |
| R2-1907556 | Discussion on PDCP impact for feMOB | LG Electronics Inc. |
| R2-1907645 | Considerations on data forwarding aspect. | Huawei, HiSilicon |
| R2-1907646 | Considerations on detaching aspect | Huawei, HiSilicon |
| R2-1907647 | Considerations on single and dual active protocol stacks. | Huawei, HiSilicon |
| R2-1907648 | Further consideration on reply LSs from RAN1 and RAN4 | Huawei, HiSilicon |
| R2-1907649 | Preamble gap design for one uplink path | Huawei, HiSilicon |
| R2-1907650 | single uplink feedback for dual downlink data transmission | Huawei, HiSilicon |
| R2-1907651 | [DRAFT] LS on data forwarding procedure of non-split bearer solution | Huawei, HiSilicon |
| R2-1907652 | Draft CR for 36.323 on supporting non-split bearer solution | Huawei, HiSilicon |
| R2-1907653 | Considerations on UL data handling in receiver side | Huawei, HiSilicon |
| R2-1907666 | Considerations on signaling flow of CHO | Huawei, HiSilicon |
| R2-1907667 | Considerations on triggering and HO execution of CHO | Huawei, HiSilicon |
| R2-1907668 | Considerations on configurations of CHO target cells | Huawei, HiSilicon |
| R2-1907669 | Considerations on timer based deconfiguration solution | Huawei, HiSilicon |
| R2-1907670 | Considerations on relations between CHO and legacy handover | Huawei, HiSilicon |
| R2-1907671 | Considerations on failure handling for CHO | Huawei, HiSilicon |
| R2-1907672 | Considerations on modification of CHO configurations by RRC signalling | Huawei, HiSilicon |
| R2-1907673 | Considerations the decision of the triggering conditions | Huawei, HiSilicon |
| R2-1907674 | Considerations on FFSs on UE behaviours during CHO execution phase | Huawei, HiSilicon |
| R2-1907675 | Considerations on maximum number of CHO candidate cells | Huawei, HiSilicon |
| R2-1907676 | Dual L3 filters for Conditional handover | Huawei, HiSilicon |
| R2-1907677 | Cell selection criteria for the combination of eMBB and CHO | Huawei, HiSilicon |
| R2-1907678 | Enhancements to RACH-less solution | Huawei, HiSilicon |
| R2-1907679 | Considerations on failure handlings | Huawei, HiSilicon |
| R2-1907978 | Discussion on RLM in LTE FeMOB | Samsung Electronics Polska |
| R2-1907996 | Consideration on UE Behaviour while Executing CHO | LG Electronics Inc. |

-continued

| | | |
|---|---|---|
| R2-1907997 | Aspects of CHO Configuration in LTE | LG Electronics Inc. |
| R2-1907998 | Consideration on CHO Failure | LG Electronics Inc. |
| R2-1907999 | HO Duration and RA Problem of CHO | LG Electronics Inc. |
| R2-1908000 | RLM Handling of Enhanced MBB HO | LG Electronics Inc. |
| R2-1908051 | Consideration for protocol stack and UL data handling | SHARP Corporation |
| R2-1908096 | FFS in Preparation Phase of CHO | ETRI |
| R2-1908271 | Running CR for introduction of even further mobility enhancement in E-UTRAN | China Telecom |
| R2-1905637 | Further details on CHO execution for NR mobility enhancements | OPPO |
| R2-1905640 | Further details on CHO configuration for NR mobility enhancements | OPPO |
| R2-1905876 | Discussion on conditional handover | SHARP Corporation |
| R2-1905949 | Consideration of Beamforming for NR Conditional Handover | CMCC |
| R2-1906092 | Beam level trigger for conditional handover | vivo |
| R2-1906209 | Stage-2 aspects of conditional handover in NR | Ericsson |
| R2-1906210 | Configuration of conditional handover in NR | Ericsson |
| R2-1906211 | Triggering of conditional handover in NR | Ericsson |
| R2-1906212 | Conditional handover execution in NR | Ericsson |
| R2-1906213 | Deconfiguration of conditional handover | Ericsson |
| R2-1906214 | Handling of a HO command while UE is monitoring CHO | Ericsson |
| R2-1906215 | Conditional handover failures in NR | Ericsson |
| R2-1906216 | Suspend while monitoring CHO in NR | Ericsson |
| R2-1906217 | Security implications of CHO | Ericsson |
| R2-1906218 | On FR2 impact on CHO | Ericsson |
| R2-1906219 | TP to 38.300 on Conditional Handover in NR | Ericsson |
| R2-1906220 | Conditional handover performance | Ericsson |
| R2-1906221 | On Validity Timer for Conditional Handover in NR | Ericsson |
| R2-1906238 | Conditional handover for NR | Lenovo, Motorola Mobility |
| R2-1906285 | Further consideration on conditional handover | Intel Corporation |
| R2-1906286 | Failure handling on CHO | Intel Corporation |
| R2-1906287 | CHO execution condition | Intel Corporation |
| R2-1906288 | Exit condition for conditional handover | Intel Corporation |
| R2-1906394 | Details of Conditional Handover Procedure for NR | InterDigital |
| R2-1906395 | Triggers for Conditional Handover | InterDigital |
| R2-1906561 | Data Forwarding and Service Interruption in CHO | ETRI |
| R2-1906563 | FFS in Preparation Phase of CHO | ETRI |
| R2-1906565 | FFS in Execution Phase of CHO | ETRI |
| R2-1906567 | Signalling Overhead Reduction for CHO | ETRI |
| R2-1906646 | Consideration on the UE Capability of Supporting CHO | CATT |
| R2-1906647 | Further Consideration on Conditional Handover in NR | CATT |
| R2-1906648 | FFS Issues on CHO Execution Condition in NR | CATT |
| R2-1906649 | Handling of Conditional Handover Failure in NR | CATT |
| R2-1906650 | Aspects for Multiple Candidate Cell Supports | CATT |
| R2-1907089 | Discussion on the configuration of CHO candidates | ZTE Corporation, Sanechips |
| R2-1907090 | Discussion on the deconfiguration of CHO candidates | ZTE Corporation, Sanechips |
| R2-1907091 | Discussion on the configuration of CHO execution conditions | ZTE Corporation, Sanechips |
| R2-1907092 | Discussion on the RRC handling during CHO execution | ZTE Corporation, Sanechips |
| R2-1907093 | Stage-3 signalling for CHO | ZTE Corporation, Sanechips |
| R2-1907262 | CFRA resources update for Conditional HO | Nokia, Nokia Shanghai Bell |
| R2-1907263 | Robustness through SRB duplication for split bearer solution in NR | Nokia, Nokia Shanghai Bell |
| R2-1907268 | Closing the open issues on NR Conditional Handover preparation phase | Nokia, Nokia Shanghai Bell |
| R2-1907269 | Closing the open issues on NR Conditional Handover execution phase | Nokia, Nokia Shanghai Bell |
| R2-1907431 | Discussion on CHO trigger condition | Huawei, HiSilicon |
| R2-1907432 | Discussion on deconfiguration for CHO | Huawei, HiSilicon |
| R2-1907433 | Discussion on data forwarding for CHO | Huawei, HiSilicon |
| R2-1907436 | Triggering conditions in CHO | Huawei, HiSilicon |
| R2-1907437 | Discussion on CHO Configuration | Huawei, HiSilicon |
| R2-1907995 | Aspects of CHO Configuration in NR | LG Electronics Inc. |
| R2-1908013 | Support of Conditional PSCell addition/change | NTT DOCOMO INC. |
| R2-1908015 | Draft LS on Conditional PSCell addition/change | NTT DOCOMO INC. |
| R2-1908095 | FFS in Preparation Phase of CHO | ETRI |
| R2-1908417 | Summary of mobility robustness agreements from LTE mobility | Intel Corporation |
| R2-1908431 | [Offline Discussion-081] summary of NR agreements that could be 'imported' to LTE | China Telecom |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal comprising:
   receiver circuitry configured to receive one or more reconfiguration messages, each of the one or more reconfiguration messages comprising an information element which indicates a sequence of one or more conditional handover configurations, each of the one or more conditional handover configurations comprising an identity of a candidate target cell, each of the one or more conditional handover configurations being associated with at least one triggering condition;
   processor circuitry configured:
      to detect a radio link failure on a radio link to a source cell, and;
      to initiate, based on the radio link failure, a cell selection to select a cell; and
   transmitter circuitry configured to transmit, based on selecting the cell, a re-establishment request message in a case that the selected cell is different from any one of candidate target cells configured in one or more saved conditional handover configurations based on the one or more reconfiguration messages, wherein
   in a case that the selected cell is different from any one of the candidate target cells, the processor circuitry is further configured to release the one or more saved conditional handover configurations, and
   in a case that the selected cell is one of the candidate target cells, the processor circuitry is further configured to perform a conditional handover.

2. The wireless terminal of claim 1, wherein, in a case that an identity of the cell is included in one of the one or more conditional handover configurations, the one of the one or more conditional handover configurations is used to execute a handover to the cell.

3. A wireless access node comprising:
   processor circuitry configured to generate one or more reconfiguration messages, each of the one or more reconfiguration messages comprising an information element which indicates a sequence of one or more conditional handover configurations, each of the one or more conditional handover configurations comprising an identity of a candidate target cell, each of the one or more conditional handover configurations being associated with at least one triggering condition; and
   transmitter circuitry configured to transmit, to a wireless terminal, the one or more reconfiguration messages, wherein
   in a case that a cell selection to select a cell is performed by the wireless terminal based on detecting a radio link failure on a radio link to a source cell, and the selected cell is different from any one of candidate target cells configured in one or more saved conditional handover configurations based on the one or more reconfiguration messages, the one or more saved conditional handover configurations are released by the wireless terminal, and
   in a case that the cell selection is performed by the wireless terminal, and the selected cell is one of the candidate target cells, a conditional handover is performed by the wireless terminal.

4. The wireless access node of claim 3, wherein, in a case that an identity of the cell is included in one of the one or more conditional handover configurations, the one of the one or more conditional handover configurations is used by the wireless terminal to execute a handover to the cell.

5. A method for a wireless terminal comprising:
   receiving one or more reconfiguration messages, each of the one or more reconfiguration messages comprising an information element which indicates a sequence of one or more conditional handover configurations, each of the one or more conditional handover configurations comprising an identity of a candidate target cell, each of the one or more conditional handover configurations being associated with at least one triggering condition;
   detecting a radio link failure on a radio link to a source cell;
   initiating, based on the radio link failure, a cell selection to select a cell;
   transmitting, based on selecting the cell, a re-establishment request message in a case that the selected cell is different from any one of candidate target cells configured in one or more saved conditional handover configurations based on the one or more reconfiguration messages;
   in a case that the selected cell is different from any one of the candidate target cells, releasing the one or more saved conditional handover configurations; and
   in a case that the selected cell is one of the candidate target cells, performing a conditional handover.

* * * * *